United States Patent [19]

Beretta

[11] Patent Number: 5,254,978
[45] Date of Patent: Oct. 19, 1993

[54] REFERENCE COLOR SELECTION SYSTEM

[75] Inventor: Giordano B. Beretta, Palo Alto, Calif.

[73] Assignee: Xerox Corporation, Stamford, Conn.

[21] Appl. No.: 980,148

[22] Filed: Nov. 23, 1992

Related U.S. Application Data

[63] Continuation of Ser. No. 677,706, Mar. 29, 1991, abandoned.

[51] Int. Cl.$^5$ .............................................. G09G 1/28
[52] U.S. Cl. ..................................... 345/150; 345/199
[58] Field of Search ............... 340/701, 703, 799, 798; 358/75, 80

[56] References Cited

U.S. PATENT DOCUMENTS

| | | | |
|---|---|---|---|
| 4,496,968 | 1/1985 | Pugsley | 358/75 |
| 4,524,421 | 6/1985 | Searby et al. | 358/903 |
| 4,683,466 | 7/1987 | Holtey et al. | 340/703 |
| 4,694,286 | 9/1987 | Bergstedt | 340/703 |
| 4,721,951 | 1/1988 | Holler | 340/701 |
| 4,794,382 | 12/1988 | Lai et al. | 340/703 |
| 4,907,075 | 3/1990 | Braudaway | 358/75 |

FOREIGN PATENT DOCUMENTS

0313796 9/1988 European Pat. Off. .

OTHER PUBLICATIONS

McEndarfer, Edward M., *An Interactive System for the Study and Teaching of Color Theory*, Ph.D. Dissertation, University of Kansas, 1989, available form UMI, Ann Arbor, Mich., Order No. 9024188.

Xerox Color Encoding Standard, Chapter 2, Chapter 3, Chapter 6, Sections 6-1 through 6-3, Appendices, A, B, and C, Xerox Systems Institute, Xerox Corporation, Sunnyvale, Calif., XNSS 289005, May 1990.

Meier, Barbara J., "ACE: A Color Expert System for User Interface Design", Proceedings of the ACM: SIGGRAPH Symposium on User Interface Software, Banff, Alberta, Canada, Oct. 1988, pp. 117-128.

De Corte, W., "Finding Appropriate Colors for Color Displays", *Color Research and Application*, vol. 11, No. 1, Spring 1986, pp. 56-61.

Hunt, R. W. G., *Measuring Colour*, Ellis Horwood Limited, Chichester, England, 1987 (reprinted in 1989), Chapter 3, Sections 3-1 through 3-10, pp. 53-69.

Meyer, G. W., and D. P. Greenberg, "Perceptual Color Spaces for Computer Graphics", in *Color and the Computer*, H. J. Durrett, ed., Academic Press, 1987, pp. 83-100.

Hunter, R. S., and R. W. Harold, *The Measurement of Appearance*, 2nd Ed., John Wiley & Sons, Inc., 1987, Chapters 7, 8, and 9. pp. 95-165.

(List continued on next page.)

Primary Examiner—Ulysses Weldon
Assistant Examiner—Amare Mengistu
Attorney, Agent, or Firm—Judith C. Bares

[57] ABSTRACT

A reference color selection system is provided for creating a palette of colorimetrically measured colors. Palettes of colorimetrically measured colors representing naturally occurring objects and specified using a standard device independent color specification, such as the CIE color specification, are arranged in a data base. A simple-to-use color selection user interface permits a user to retrieve, view, and modify each palette. The palette of colors is displayed in a simple arrangement on a display screen such as a color monitor. Each color is transformed into coordinates in a uniform color space, such as the CIELAB space. The user may delete colors not needed, and may create new colors for the palette by mixing two existing palette colors together. The mixing function simulates an artist's "color wash", and is a linear interpolation, or interval scale, in the uniform color space between two end colors selected by the user. A color from the range of intermediate colors may be added by the user to the selected palette, and the new palette may be stored for future use in a wide variety of color presentation systems.

6 Claims, 6 Drawing Sheets

OTHER PUBLICATIONS

Swinehart, D. C., P. T. Zellweger, R. J. Beach, and R. B. Hagmann, "A Structural View of the Cedar Programming Environment", *ACM Transactions on Programming Languages and Systems,* vol. 8, No. 4, Oct. 1986, pp. 419–490.

Teitelman, W., "A Tour Through Cedar", *IEEE Software,* Apr. 1984, vol. 1984, vol. 1, No. 2, pp. 44–73.

Beretta, G. B., "Selecting Colors for Representing VLSI Layout", Xerox Palo Alto Research Center, 1988, *Technical Report EDL-88-7, pp. 2-6.*

Boynton, R. M., and H. S. Smallman, "Segregation of Basic Colors in an Information Display", Applied Vision 1989 Technical Digest Series, Conference Edition, NASA and OSA, vol. 16, Jul. 1989, pp. 164–167.

Guitard, R. and C. Ware, "A Color Sequence Editor", *ACM Transactions on Graphics,* vol. 9, No. 3, Jul. 1990, pp. 338–341.

REFERENCE COLOR SELECTION SYSTEM

This is a continuation of application Ser. No. 07/677,706, filed Mar. 29, 1991 is now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to color selection systems for use with computer based color presentation programs, and more particularly, to a color selection system for selecting and mixing colorimetrically accurate colors for use in a color presentation system.

BACKGROUND OF THE INVENTION

Color is playing an increasingly important role in computer graphics. Broader affordability and availability of computer controlled systems with color processing capabilities will promote wider acceptance and use of color in document-intensive industries or document-intensive functional areas of enterprises. As a result, there is a steadily increasing use of computer based color presentation programs by computer users with little or no training in color science and in the aesthetic and technical uses of color. By computer based color presentation programs is meant a wide range of computer based graphics illustrators, page layout programs, graphics editors, business graphics programs and modern spreadsheet programs, publishing systems, image retouching systems, and other similar color presentation programs for using color on computers.

These users are often dissatisfied with the aesthetics of the final product produced by the color tools that are available for existing color presentation systems. There are several reasons for this disappointment. Known color selection systems typically allow users to select only one color at a time, and users seldom are able to focus on the relationship among the colors. These color selection systems ignore well-known principles of color perception theory that human perception of color is influenced by the effect of adjacent colors, the surround against which a color is viewed, and the illumination under which a color is viewed.

In addition, existing color selection systems often utilize a device dependent color classification model, providing color descriptor classifications, or dimensions, that correspond to the underlying color models that control associated physical devices. Such device dependent color classification models include the additive red, green, and blue (RGB) phosphor color model used to physically generate colors on a color monitor, and the subtractive cyan, magenta, and yellow, plus black (CYMK) color model used to put colored dyes, inks, or toners on paper. In addition, models based on mathematically transforming RGB signals to hue, saturation, and value (HSV) signals have also been used. Color selection systems based on these device dependent color models operate in color spaces that treat color differences and changes in incremental steps along dimensions which are useful to control the physical devices. For example, lookup tables give the users of these existing systems convenient access to the RBG signal values that produce the selected colors on their monitors, thereby facilitating entering the signal specifications for the selected colors into the data files for their composition.

Device dependent color space models, such as the RGB model or HSV color model, are not necessarily related to how humans visually perceive color, and in such systems it may be difficult for a user to approximate how much change in one dimension is needed to produce a desired change in the color, requiring considerable trial and error to achieve a desired color selection.

A prior art color selection system utilizing HSV color space is disclosed in Holler, U.S. Pat. No. 4,721,951, entitled, "Method and Apparatus for Color Selection and Production". An apparatus and method are disclosed wherein a color is selected on the basis of one color characteristic system for implementation in another color characteristic system. Color selection is made from the color characteristic system of hue, saturation, and value (referenced as brightness) (HSV) in the preferred embodiment, and is performed interactively with the operator individually selecting hue, saturation and brightness levels from displays which illustrate the effects of changing each of these characteristics. The displays are comprised of a display bar for each of the hue, saturation and brightness color characteristics, with the selected value or level for each characteristic being shown by a vertical black line, or slide marker, which the operator may move to a selected position. Selected hue, saturation, and brightness color characteristics and the current color selected are illustrated on the display, and are immediately updated whenever changes of the H, S, or V occur, in a manner that facilitates a rapid and interactive selection process. The selected values of H, S, and V are converted through the use of appropriate transforms to values of R, G, and B in the red, green, and blue color classification system for display in the current color display.

In another prior art color selection system, Guitard and Ware disclose, in "A Color Sequence Editor", *ACM Transactions on Graphics,* 9:3 (July 1990), at pp. 338–341, a color sequence editing tool to enable the rapid editing of the contents of a color lookup table (LUT). An editing window consists of three plotting areas containing Hue, Saturation, and Value plots and a color sequence feedback area. The horizontal coordinate in a plotting area corresponds to an entry in the LUT; the vertical coordinates give values of Hue, Saturation, and Value, respectively. Each plotting area is actually 256 pixels wide and can be considered as 256 slider bars controlling 256 LUT entries. To edit the color sequence, the user moves the cursor to the desired plotting area and draws or "plots" a curve. This replaces the plot previously drawn and causes a real-time change in the corresponding LUT entries.

Meier, B., in "ACE: A Color Expert System for User Interface Design", *Proceedings of the ACM SIGGRAPH Symposium on User Interface Software* (October 1988) discloses a production expert system designed to select colors for user interface design. Guidelines, heuristics, and rules of thumb from literature relating to the effective use of color in computer displays were synthesized into a set of strategic and tactical prescriptive rules for color selection, including tactical information for color selection and information related to the relational constraints imposed between a color selection and its function in the user interface. The set of colors selected consisted of ten perceptually different hues, fifteen "brightnesses" between black and white for each hue, and three saturations for each hue/brightness combination, yielding a total of 450 different colors available for selection, 150 of which were shades of gray.

Further complicating the color selection process is the effect of color usage on color selection. Colored images can be partitioned into two classes: (1) those that contain so-called "reference colors", and (2) those that utilize "functional colors". Reference colors are colors of naturally occurring objects in the human perceptual world, such as colors of skin, grass, and the sky. On the other hand, functional colors serve a purely symbolic function, such as coloring different areas of maps and graphs to convey information, and these colors are not intended to symbolize objects found in nature. Thus, functional color palettes preferably are composed of coordinated harmonious colors to provide color combinations that aesthetically appeal to the ordinary observer. Typically, selecting functional colors for an application requires an understanding of, or at least an appreciation of, how colors combine to form an aesthetically pleasing image.

Selecting or modifying reference colors requires a distinctly different approach. A user may either be creating a true-to-life image, or modifying the colors in a true-to-life image created elsewhere and digitally reproduced on his computer system. The goal of such color selection and modifying is to closely match each reference color to the color it represents in nature, thereby facilitating the identification of objects in the computer generated or reproduced image. In particular, when a user wishes to color a reference object, for example, a Chinese porcelain vase, a precise specification of a reference color is difficult to generate from memory. An artist, for example, mixes colors together until he or she achieves the desired matching color. Matching a color by mixing paints requires skill. Matching a reference color by selecting computer generated colors in RGB or HSV color spaces as described above is very difficult because device dependent color spaces do not permit the user to readily transfer his or her artist's skills to the computer, or to use the color space dimensions to develop intuitive judgments about mixing colors. In addition, for those cases where the highest fidelity of reproduced color to actually perceived color in nature is required, such as, for example, in the case of the Chinese porcelain vase in a photographic image, typical color selection systems provide no way to assure that a mixed or selected color is colorimetrically accurate.

A perceptually uniform color space which more closely approximates how humans perceive colors and color differences facilitates color specification tasks. In particular, standardized color notation systems for use in perceptually uniform color spaces have been developed by an international color standards group, Commission Internationale de l'Eclairage (the "CIE"). CIE color specification employs "tristimulus values" to specify colors and to establish device independent color spaces. In 1976, the CIE recommended the use of two approximately uniform color spaces, the CIE 1976 (L*u*v*) or the CIELUV color space, and the CIE 1976 (L*a*b*) or the CIELAB color space.

Generally, preference for using one or the other CIE uniform color space is based mainly on convenience of use in particular industrial applications. CIELUV space is often used to capture the color appearance of additive color mixtures, such as those on color display monitors, and as such is used as a standard color space by the television and video industries. CIELAB space is often used to capture the color appearance of subtractive color mixtures, and as such is a standard color descriptor for the paint and dye industries, and is the primary uniform color space used for printed color evaluation. CIE color spaces are widely accepted because measured colors can readily be expressed in these CIE recommended coordinate systems by means of simple mathematical transformations of the spectral power distributions.

The prior art also discloses a system for using a perceptually uniform color space model for color selection. Taylor et al., in EP 0 313 796 A3, entitled, "Computer display color control and selection system", disclose an interface system for use in selecting and controlling colors in graphics images generated by a computer system. The interface comprises a mechanism and method for displaying a graphical representation of hue, chroma, and lightness combinations available based on a color appearance type color space and associated mechanism. The interface includes a method for selecting any of the combinations of hue, chroma, and lightness which are graphically displayed as available for use. The graphical representation includes a graph of the range of hues in one dimension and a second graph of the range of chroma and value combinations in two dimensions. The preferred embodiment of the interface makes use of a specially defined HVC color space for graphically displaying, representing, and selecting hue, chroma, and value combinations for a color with a high degree of perceptual uniformity. The preferred embodiment of the system includes a mechanism for operating the interface in three different modes, providing functions corresponding to picture editing, color map editing, and continuous shading. The continuous shading mode allows a range of colors to be generated between two colors specified by the user for smooth shading applications.

De Corte, W., in "Finding Appropriate Colors for Color Displays" in *Color Research and Application*, Vol. 11, No. 1, Spring 1986, pp. 56-61, discloses a methodology and supporting algorithm to determine high-contrast sets of colors for use on a color CRT under varying conditions of illumination. The method generates colors which are highly contrasting and ergonomically optimal, given the number of colors, N, one wants to display. The color selection algorithm attempts to maximize the minimal between-color distance for a set of N points in the perceptually uniform CIELUV color space in such a way that the resulting colors remain within the gamut of colors which can be displayed by the terminal while meeting constraints derived from research in human vision and human factors.

Beretta, G. B., the named inventor herein, in *Selecting Colors for Representing VLSI Layout*, Xerox Palo Alto Research Center, Technical Report EDL-88-7, 1988, pp. 2-6, discloses a method for selecting discriminable colors for use in designing a VLSI layout using a computer-assisted design (CAD) graphics system. The method divides the layers of the VLSI circuit into functional classes and applies color theory rules to the selection of colors for each layer. Then, colors to be selected are manipulated in CIELAB space in order to more easily determine and uniformly distribute discriminable colors.

Other prior art color selection systems perform automatic color selection. Braudaway, G., in U.S. Pat. No. 4,907,075, entitled, "Method for Selecting Colors" discloses a method for selecting a limited number of presentation colors from a larger palette to provide digitization of a color image. A three-dimensional color histogram of the image is generated, having axes corresponding to red, green, and blue, and a first color is selected based upon the color occurring most frequently in the image. Subsequent colors are selected by choosing one at a time those colors having the highest weighted frequency of occurrence. Final color selection may be made according to a disclosed cluster analysis method for minimizing image entropy.

Lai et al., U.S. Pat. No. 4,794,382, entitled "Image Retouching", disclose an image retouching method and apparatus in which an operator using a color monitor may selectively alter colors of an original, scanned image displayed on the monitor prior to printing the image using a two stage process. An operator displays on a monitor a first range of colors, adjacent colors differing from each other by more than a predetermined amount, and then selects one of the displayed colors. The selection in turn causes a second range of colors centered on the selected color to be displayed, the adjacent colors of the second range differing from each other by less than the predetermined amount. The operator then selects from this second range of colors a tint which is to be the selected tint. The operator may selectively change the intensity or other property of one or both of the first and second range of colors as desired in respected predetermined steps. In the preferred embodiment, the characteristics by which each color is quantified are printing color components, cyan, magenta, yellow, and optionally black such that all colors displayed on the monitor are printable using conventional printing inks.

The ideal computer-aided color selection system should provide a general purpose, visual color selection mechanism for organizing color in a way that makes it easy to understand color elements and relationships, and which makes preliminary aesthetic determinations for subsequent review and modification by the user. For selecting reference colors in particular, a color selection system is needed that provides colorimetrically measured palettes of colors for classifications of natural objects, such as skin tones, trees, grass, and sky. In addition, there is needed a facility for mixing colors from known measured colors, approximating the artist's mixing of colors when the artist creates a color "wash", thereby making color selection and manipulation intuitively predictable and manageable even for the novice color user. Existing systems, even those based on a perceptually uniform color model, generally do not provide such assistance.

Therefore, an interactive color selection system is needed for providing increased color selection assistance to users of a wide variety of color presentation systems, in particular for the selection of reference colors which represent colors of natural objects. Moreover, it is important to have a relatively simple user interface for this color selection system so that users can apply it to the color selection tasks they are facing, without having to understand or master features of the system that are irrelevant to those tasks.

SUMMARY OF THE INVENTION

In accordance with the present invention there is provided a system for creating a palette of colorimetrically measured colors. Palettes of colorimetrically measured reference colors are defined in a memory device, each color in each of the palettes being defined by a device independent color specification. Input means, such as a keyboard or a mouse pointing device, sends signals to color palette display means and to color selection interface means to display and modify a selected one of the plurality of palettes of colorimetrically measured reference colors. Each color in the selected palette of reference colors is specified as a set of colorimetric coordinates in a uniform color space. The color palette interface means includes color mixing means for creating a plurality of intermediate colors between a first and second selected end colors selected by the user from the selected and displayed palette of reference colors. The color palette interface means further includes means for selecting at least one of the plurality of intermediate colors to be added to the selected palette of reference colors to modify the palette as needed. The color palette interface means also includes means for deleting colors from the selected palette. Memory means, cooperatively associated with the color palette interface means, stores the selected palette of reference colors and the modified palette of reference colors during the color selection process.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents failing within the spirit and scope of the invention as defined by the appended claims.

A. The Uniform CIELAB Color Space

The preferred embodiment of the reference color selection system of the present invention operates in a perceptually uniform color space which facilitates color specification tasks. In particular, the illustrated embodiment of the reference color selection system represents and permits modification of predefined palettes of colorimetrically specified colors by representing and directly manipulating these colors in the CIE 1976 (L*a*b*) (hereafter referred to as "CIELAB space" or "LAB space"). However, it is intended that the reference color selection system of the present invention may be implemented in any of the currently defined perceptually uniform color spaces, such as the CIE-LUV space, the Munsell color space, and the OSA Uniform Color Scales, or in a future newly defined perceptually uniform color space.

CIELAB space is a perceptually uniform color space in which the numerical magnitude of a color difference bears a direct relationship to a perceived color appearance difference. CIELAB space is an opponent-type color space, based on the opponent-color theory used to describe or model human color vision. In a system of this type, colors are mutually exclusive; for example, a color a cannot be red and green at the same time, or yellow and blue at the same time, but a color can be described as red and blue, as in the case, for example, of purple.

Figure 1:
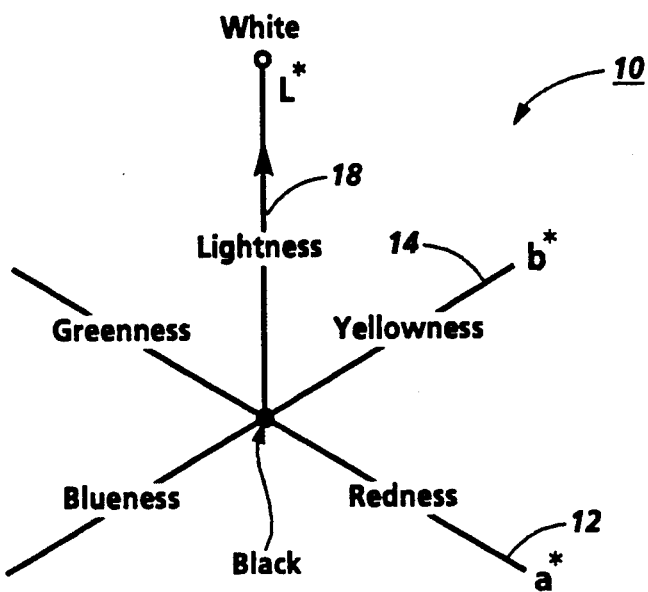
FIG. 1 illustrates the uniform CIE 1976 (L*a*b*) color space, in which functional color selection according to the present invention may be performed, in three-dimensional Euclidian coordinates.

FIG. 1 illustrates a three-dimensional Euclidian coordinate view of opponent-type CIELAB color space 10. Two opponent coordinate axes 12 and 14, represented by a* (a-star) and b* (b-star), respectively, describe the chromatic attributes of color. The a* axis 12 represents the red-green coordinate, while the b* axis 14 represents yellow-blue. Positive values of a* denote red colors, while negative values denote green colors. Similarly positive values of b* represent yellows and negative values signify blues. The a* and b* coordinates are correlated to the postulated corresponding channels in the human visual system.

The L* (L star) coordinate defines the perceptual correlate of a color's "psychometric lightness". Lightness is defined as the attribute of a visual sensation according to which the area in which the visual stimulus is presented appears to emit more or less light in proportion to that emitted by a similarly illuminated area perceived as a "white" stimulus. Lightness is thus an attribute of visual sensation that has meaning only for related visual stimuli, and may be referred to as "relative brightness". L* is in the range of 0 to 100. The central L* axis 18 of the CIELAB color space lies perpendicular to the a*, b* plane and achromatic or neutral colors (black, grey, and white) lie on the L* axis at the point where a* and b* intersect (a*=0, b*=0).

Colors specified as tristimulus values X, Y, and Z are located in Euclidian CIELAB space according to the formulas in Equations (1) through (3):

$$L^* = 116 \left( \frac{Y}{Y_n} \right)^{\frac{1}{3}} - 16 \quad (1)$$

$$a^* = 500 \left[ \left( \frac{X}{X_n} \right)^{\frac{1}{3}} - \left( \frac{Y}{Y_n} \right)^{\frac{1}{3}} \right] \quad (2)$$

$$b^* = 200 \left[ \left( \frac{Y}{Y_n} \right)^{\frac{1}{3}} - \left( \frac{Z}{Z_n} \right)^{\frac{1}{3}} \right] \quad (3)$$

with the constraint that $X/X_n$, $Y/Y_n$, $Z/Z_n > 0.01$. The terms $X_n$, $Y_n$, $Z_n$ are the tristimulus values for the reference white for a selected standard illuminant and observer, with $Y_n$ equal to 100. Those skilled in the art will appreciate that additional formulas are available for the case where $X/X_n$, $Y/Y_n$, $Z/Z_n < 0.01$; these formulas may be found in the references included below.

Colors specified in CIELAB space with their L*, a*, and b* coordinates are difficult to visualize and reference as colors that are familiar to users. In this disclosure, for purposes of referring to colors by known names and according to human perceptual correlates, colors specified in CIELAB space are also referenced by the human perceptual correlates of hue, or "hue-angle", and chroma. As those skilled in the art are aware, colors described in L*, a*, and b* Euclidian coordinate CIELAB space may also be specified in cylindrical coordinates. Cylindrical coordinates permit identification and manipulation of the perceptual correlates of "hue" and "chroma". Hue is defined as the attribute of visual sensation which has given rise to color names such as blue, green, yellow, purple, and so on. Hue is defined in cylindrical CIELAB space as "hue-angle" which designates a hue numerically by an angle ranging from 0.0 to 360.0 degrees, with hues evenly distributed around the L* axis from the positive a* axis. "Colorfulness" or "vividness" is the attribute of visual sensation according to which an area appears to exhibit more or less of its hue. Chroma is an object's colorfulness or vividness judged in proportion to the brightness of a reference white, or with reference to a similarly illuminated area. Chroma in cylindrical CIELAB space radiates out perpendicularly from the central L* axis. Thus, the chroma of a color may be viewed as the distance away from the achromatic, or gray, central L* axis for a given lightness (L* level) and hue-angle, and is orthogonal to both the hue-angle and lightness.

The formulas for computing the hue and chroma correlates are given in Equations (4) and (5), and the third coordinate, L*, is given above in Equation (1):

$$h_{ab} = \tan^{-1}\left( \frac{b^*}{a^*} \right) \quad (4)$$

$$C_{ab}^* = [(a^*)^2 + (b^*)^2]^{\frac{1}{2}} \quad (5)$$

In Equation (4), the quadrant of the resulting angle depends on the particular combination of positive or negative signs of a* and b*.

Additional information, not provided above, relevant to defining color in the CIE system, for utilizing CIE color spaces for displaying and modifying colors in graphics applications, and for defining additional standard mathematical transformations between tristimulus values and coordinates in CIE color spaces, may be found in several well-known colorimetry and color science texts and publications. Specific attention is directed to the following references: Hunt, R. W. G., *Measuring Colour*, Ellis Horwood Limited, Chichester, England, 1987 (reprinted in 1989) Chapter 3, Sections 3-1 through 3-10, pp. 53-69; Meyer, G. W., and D. P. Greenberg, "Perceptual Color Spaces for Computer Graphics", in *Color and the Computer*, H. J. Durrett, ed., Academic Press, 1987, pp. 83-100; and Hunter, R. S., Harold, R. W., eds., *The Measurement of Appearance*, 2nd Ed., John Wiley & Sons, 1987, Chapters 7, 8, and 9, pp. 95-165.

B. The Reference Color Selection System Environment

1. The Systems Environment

Figure 2:
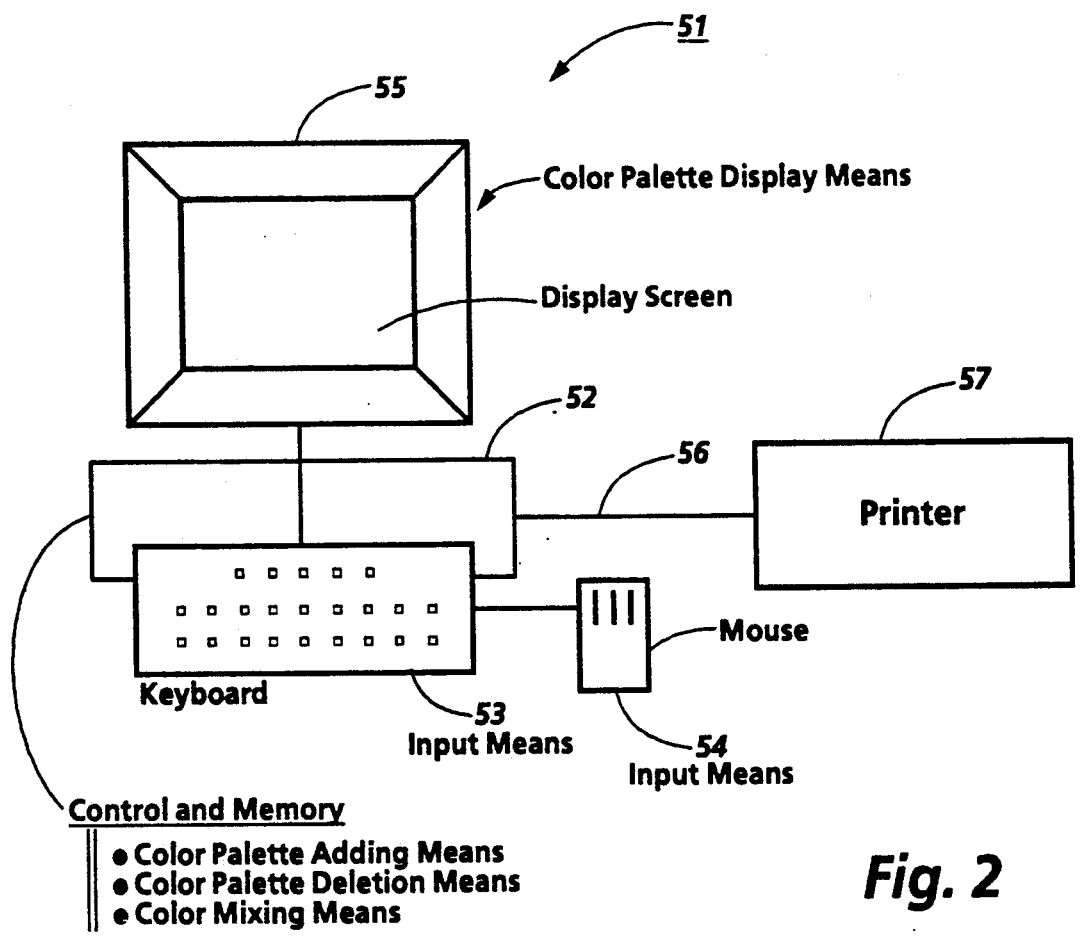
FIG. 2 is a schematic block diagram illustrating a computer system suitable for implementing the present invention.

Turning now to FIG. 2, there is a more or less conventional computer workstation 51 that has a processor 52 for processing user inputs received from a keyboard 53 and a "mouse" or similar user operated pointing device 54, together with a color monitor 55 for displaying the images that are created by such processing. In keeping with standard practices, the processor 52 has a memory system (not shown) comprising a main or primary memory for storing active programs and data files and a secondary memory for storing other programs and data files. Furthermore, the processor 52 is interfaced, as at 56, with a local or remote color printer 57.

Figure 3:
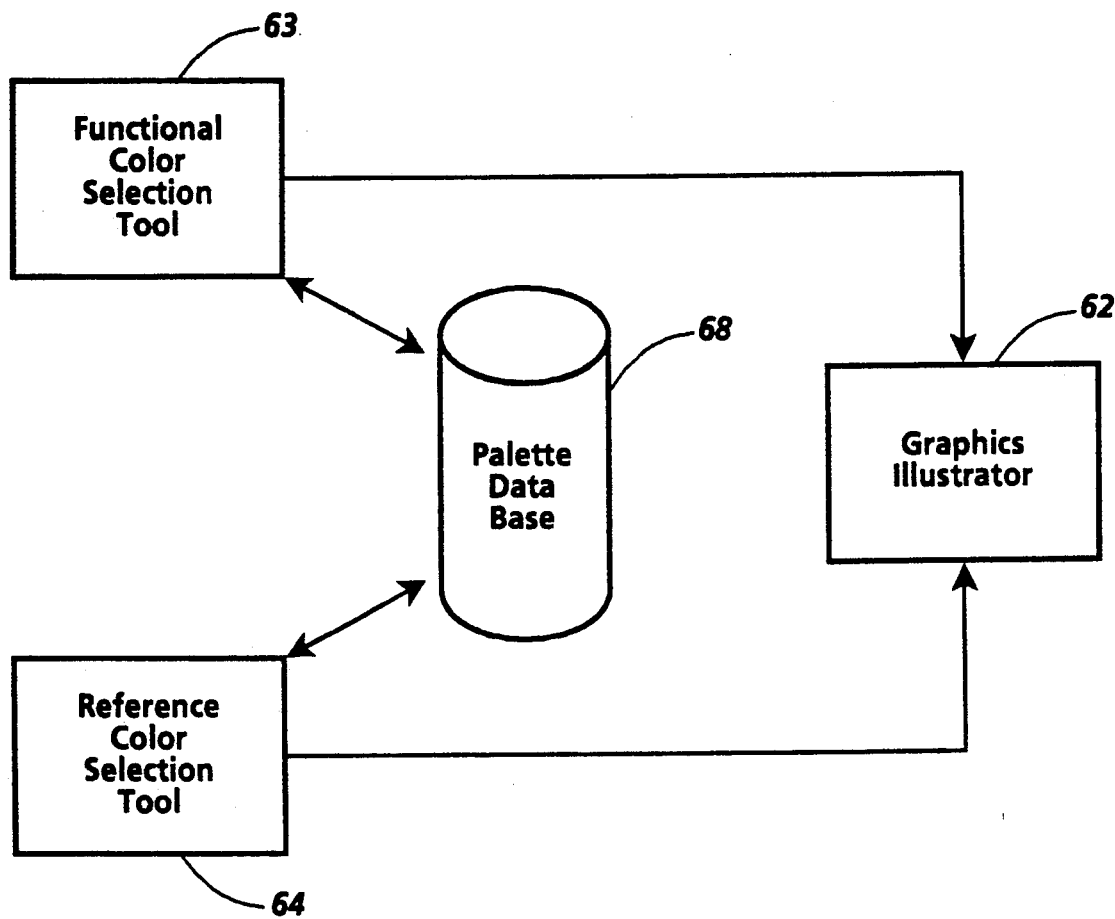
FIG. 3 is a schematic block diagram illustrating the software environment in which the functional color selection of the present invention may operate.

Turning now to FIG. 3, there is illustrated a color graphics software environment operable through workstation 51 in which the reference color selection system 63 of the present invention may operate. A color presentation program, in this case a graphics illustrator 62, enables the user to create and manipulate graphical objects to produce graphical images. The illustrator 62 is interfaced with the reference color selection system 64 and with a functional color selection system 63 for allowing the user to interactively select reference colors and functional colors, respectively, for such compositions.

In accordance with the present invention, color palette database 68 is provided for storing the predefined and colorimetrically measured color palettes (discussed in more detail below) provided with the reference color selection system. Color palette database 68 may also be used for storing user created palettes for reuse and re-editing at a later date. Thus, palettes of functional and reference colors already created may be retrieved or copied from, as well as stored in, palette data base 68.

In keeping with this invention, the color selection systems 63 and 64 are independent programs that are invoked selectively by the user, thereby reducing the complexity of the user interface through which the user interacts with these systems. Further information regarding the functional color selection system may be found in a concurrently filed, commonly assigned United States patent application entitled "Functional Color Selection System", Ser. No. 677,682.

2. The Computer Implementation of the Illustrated Embodiment

A current embodiment of the reference color selection system of the present invention has been implemented on a Sun Microsystems Sparcstation computer in a research software application program, known as Digital Palette. This implementation was written in the Cedar programming environment, a Xerox proprietary research software environment, utilizing the Cedar programming language. Appendix A ((c)1989, Unpublished Work, Xerox Corporation) provides a source code listing for this implementation. Information regarding the Cedar programming environment may be found in Swinehart D., et al., "A Structural View of the Cedar Programming Environment, *ACM Transactions on Programming Languages and Systems*, Vol. 8, No. 4, October 1986, pp. 419-490, incorporated herein by reference. Additional information about the Cedar programming environment may also be found in Teitelman, W., "A Tour Through Cedar", *IEEE Software*, Vol. 1, No. 2, April 1984, pp. 44-73, also incorporated herein by reference.

It is intended that the reference color selection system 64 of the present invention may be implemented in a variety of hardware and software environments providing suitable and equivalent window management and graphics software support functions. Those skilled in the art will recognize, for example, that reference color selection system 64. may be implemented in a wide range of computing environments. In personal computer environments, the system may be implemented by using low-level assembly language routines for window management and graphics functions, or by using appropriate window "toolboxes" which provide pre-written window management and graphics functions. Similarly, the system may be implemented in larger computing environments supporting more powerful graphics functions. Source code in the attached source code listing of Appendix A references Cedar environment applications software support tools which manage the window environment, the graphics display output, and the coordination of the user's requests and responses when selecting colors using the reference color selection system 64. A brief functional explanation of this environment will demonstrate the system's portability.

The underlying structure of the Cedar programming environment is a collection of components that are arranged in hierarchical layers according to the concept of an open operating system architecture. Cedar's open operating system concept supports a well-integrated, interactive environment because lower level modules remain directly available to higher level, or "client" programs. The reference color selection system of the present invention is a client of Cedar's "Viewers" and "Imager" applications software support tools, described in more detail below. Reference color selection system 64 is the application client program which contains the software for defining the color space, calibrated monitor gamut, and color selection processes for selecting the palette of coordinated colors.

A high-level software window management environment known as "Viewers" provides the necessary window management control for the reference color selection system. Viewers allows programmers and programs to create, destroy, move, and realize individual rectangular viewing areas on workstation display 55 (FIG. 2) called "viewers" which correspond to "windows" in other systems. Each viewer is a rectangular region whose position and size is managed by the Viewers software tool, but whose contents are determined by the color selection client application which creates the viewer. Cedar viewers are implemented by a client program as a set of viewer classes defined by the interface specification known as "ViewerClasses.Viewer" of the Viewers software. Client application programs, such as the reference color selection system, create new viewer instances in a particular class by calling the "ViewerOps.CreateViewer[className]" specification. A viewer class implementation provides operations to initialize a viewer, to save its contents, to destroy a viewer, to paint its contents on the display, and so on, and each member of a specific viewer class shares these same behaviors. The ViewerClasses.Viewer record also defines data fields, such as size information and display coordinates, that are common to all viewer classes. A client program uses a "clientData" field in the ViewerClasses.Viewer record to store implementation-dependent instance data.

User input devices include certain standard supported devices in the Cedar environment, including a mouse 54 and a keyboard 53 (FIG. 2). User input is managed and coordinated by Viewers through terminal processor support software which produces a single serial buffer of time-stamped input events from supported input devices, or interprets users' actions through Terminal Input Processor (TIP) tables. For each event, or event sequence, a TIP table entry specifies a sequence of action tokens that represent the semantics of the event.

The Cedar programming environment also provides a high-level, device independent graphics software environment known as Imager for producing and displaying high-quality, two-dimensional imaging of text, line art, and scanned images. The Imager handles all display output for the Viewers window manager software tool, as well as for other graphical illustrator programs implemented in the Cedar environment. The Imager supports the presentation of a variety of image material: text in various fonts, lines and curves of various thicknesses, strokes or enclosed outlines, sampled images, and various color models, including the Xerox Color Encoding Standard color model (described in more detail below). Image transformations can scale rotate, translate, and clip images through simple specifications. The device independent design permits images to be rendered on a variety of devices, some of which include full-color displays, color-mapped displays, and black-and-white displays.

C. The Operation of the Reference Color Selection System

1. Creating Predefined, Colorimetrically Measured Palettes of Reference Colors

Turning now to a more detailed description of the operation of the reference color selection system 64, there is first described the predefined and colorimetrically measured color palettes provided with the reference color selection system.

a. Color Measurement of Palettes of Reference Colors

Each of the colors in each palette are specified in the device independent CIE color specification system. As noted earlier the CIE color specification system employs "tristimulus values" to specify colors and to establish device independent color spaces. Device independent color specification conforms to internationally recognized color standards based on the interaction of light with the human visual system. The CIE standardized color notation system defines a standard of color measurement which may be applied to color reproduction to both characterize color devices and to describe transformations that must be applied to image colors to accommodate the characteristics of output devices.

Based on the premise that the spectral reflectance of an object is the percentage of the incident light energy reflected at each wavelength and that the color of an object may be precisely defined as this spectral reflectance, the CIE standard assigns numeric values to colors according to their appearance under standard sources of illumination as viewed by a standard observer, such as the "CIE 1931 Standard Colorimetric Observer" (also known as the "2° Observer", hereafter referred to as the "standard observer"), using three values, X, Y, and Z, to describe colors. While X, Y, and Z could be considered a set of primaries, they do not individually correspond to an actual color. Instead, each set of X, Y, and Z values represents a color according to its spectral power distribution rather than its perceived appearance. The X, Y, and Z values, called the tristimulus values of a color, represent a summation of the color contributions of all wavelengths within the spectral distribution of a color sample, corrected for the light source used to illuminate the colored sample and for the color sensitivity of the standard observer.

A spectroradiometer or spectrophotometer may be used to sample a stimulus at a number of different wavelengths. The tristimulus values X, Y, and Z of a color are then computed from certain color-matching functions for a particular source of illumination. Alternatively, tristimulus values of a color also may be directly measured by a tristimulus-filter colorimeter. If two color stimuli have the same tristimulus values, they will look alike under the same viewing conditions by an observer whose color vision is not significantly different from that of the standard observer, and these color stimuli will produce what is called a "metameric" match between colors. Thus, colors with identical tristimulus values viewed under identical conditions provide the common and device independent link between differing color reproduction technologies.

Research has shown that differences among various human perceptual color attributes can be related to differences between the tristimulus values of two different color stimuli. Thus, tristimulus values representing colors have been mathematically manipulated in order to more closely approximate these human perceptual color attributes, and to visually represent these attributes in different color spaces. Normalization, one such mathematical manipulation of tristimulus values, is the derivation of a color's "chromaticity" which recognizes that important color attributes are related to the relative magnitudes of the tristimulus values. Thus, the "chromaticity coordinates" of a color, x, y, and z are derived by taking the ratios of the respective X, Y and Z tristimulus values to the sum of all three tristimulus values X, Y, and Z, according to equations (6), (7) (8) and (9) below. Chromaticities may be represented in a two-dimensional Cartesian x, y plane coordinate system of colors known as the "1931 CIE Chromaticity Diagram".

$$x + y + z = 1 \tag{6}$$

$$x = \frac{X}{(X + Y + Z)} \tag{7}$$

$$y = \frac{Y}{(X + Y + Z)} \tag{8}$$

$$z = \frac{Z}{(X + Y + Z)} \tag{9}$$

b. Specifying Palettes of Reference Colors

The data base of predefined and colorimetrically measured palettes of colors are simply device independent color specifications for natural objects, grouped in useful but arbitrarily defined palettes. In the illustrated embodiment of the reference color selection system there is provided a typical watercolor palette. Table 1 provides a list of the colors included in the watercolor palette, each specified by its luminance value, Y, and chromaticities, x and y. In the context of the reference color selection system, each watercolor is considered to be a natural object, and, as such, a reference color of the kind suitable for inclusion in the palette data base 68. The colors selected were painted in 75 mm ×55 mm rectangles on watercolor paper in typical dilution and well dried. The painted rectangles were measured with a Minolta CR 235 colorimeter. The reference white color used is a combination of the luminance of Chinese White and the chromaticity of the white paper used.

TABLE 1

| COLOR NAME | Y | x | y |
|---|---|---|---|
| Cadmium Yellow Deep | 81.13 | 0.3868 | 0.4348 |
| Cadmium Yellow Pale | 72.84 | 0.4239 | 0.4516 |

TABLE 1-continued

| COLOR NAME | Y | x | y |
| --- | --- | --- | --- |
| Cadmium Red Light | 25.65 | 0.5261 | 0.3391 |
| Alizarin Crimson | 21.69 | 0.4438 | 0.3162 |
| Ultramarine Blue | 13.92 | 0.1943 | 0.1570 |
| Thalo Blue | 32.86 | 0.2280 | 0.2667 |
| Hooker's Green Deep | 43.89 | 0.3294 | 0.4034 |
| Sap Green | 38.68 | 0.3535 | 0.4241 |
| Viridian | 42.90 | 0.2663 | 0.3633 |
| Yellow Ochre | 60.14 | 0.4036 | 0.4047 |
| Burnt Sienna | 25.17 | 0.4544 | 0.3843 |
| Burnt Umber | 18.07 | 0.3953 | 0.3801 |
| Ivory Black | 14.40 | 0.3318 | 0.3459 |
| Payne's Gray | 18.33 | 0.2864 | 0.3172 |
| Chinese White | 84.66 | 0.3232 | 0.3401 |

The variety and utility of predefined palettes that may be included with the reference color selection system of the present invention is limited only by imagination. For example, the artist mentioned earlier who was producing computer color reproductions of images containing Chinese porcelain would most likely use shades of the color celadon, including a range of greens from yellowish green to gray-blue green. In addition, ivory, white, and a specially applied blue color would most likely appear in most Chinese porcelain pieces. It would be useful to start with a palette of these colors, customarily used by Chinese artisans, to achieve the most faithful computer reproduction of the original art pieces. By measuring the colors from actual objects or from high quality offset color pictures of Chinese porcelain pieces, such a palette may be created and added to palette data base 68 (FIG. 3) for use by a user of reference color selection system 64. Table 2 includes a selection of typical Chinese porcelain colors, specified in L*, a*, and b* coordinates.

TABLE 2

| COLOR NAME | L* | a* | b* |
| --- | --- | --- | --- |
| Minty Green Blue | 55.07 | −15.14 | 28.16 |
| Minty Green Blue Pale | 77.42 | −16.57 | 26.87 |
| Ivory White | 91.71 | 1.00 | −0.19 |
| Very Light Greenish Blue | 74.19 | −10.44 | −9.07 |
| Minty Blue Green Deep | 51.70 | −18.84 | 19.40 |
| Red | 53.24 | 53.51 | 41.87 |

In some instances, measured colors, while providing accurate representations of the colors of natural objects, may not provide aesthetically pleasing colors. For certain reference colors, color researchers may determine that an alternative color should be used in place of the actually measured object color. Such colors are called "preferred colors" and may also be included in the set of predefined palettes.

The reference color selection system 64 of the present invention employs a conventional array or table data structure for representing the device independent color specifications for each color palette.

2. The Calibrated Monitor Gamut

The user of the reference color selection tool 64 of the present invention may work on any number of color monitor displays, with color reproduction quality generally directly related to the cost of the display. The predefined palettes of colors each having device independent colorimetric color specification will be transformed to device dependent color specifications for display on the monitor, but to preserve the accuracy of the color, all manipulation of the palette colors is performed in the device independent CIELAB space.

In particular, in the preferred embodiment of the present invention, the device independent color specifications of the colors in the predefined palettes and of the colors mixed by the user are defined using the Xerox Color Encoding Standard (XCES), although it is to be understood that any recognized device independent color specification may be used, such as the ISO ODA Color Addendum. Xerox Corporation has defined and specified a device independent color specification, derived from CIE color specifications and color science principles, for providing uniform and consistent color specifications to allow accurate color reproduction in the interchange between document processing applications. The XCES specifies standard color models that devices which subscribe to the XCES should use for representing color in interchange applications, thus providing a common color language description between color computer display and printing applications. One of the standard XCES color models, the XEROX/CIELAB model, hereinafter called the "CIELAB model", specifies color in terms of the red, green, and blue tristimulus values of the standard primaries, calibrated so that equal tristimulus values define a stimulus with the same chromaticity as standard white, which is selected to be the $D_{50}$ illuminant. This process in effect provides a "color correction" mechanism from the user's device to a so-called "standard" device. The mapping from a device independent colorimetric color specification to a specific color device's ink or phosphor quantities is called "color correction". "Calibration" is the process of measuring a color rendering device and computing the parameters for color correction. Color manipulation internal to the reference color selection system is performed in the standard calibrated monitor gamut.

Further information regarding the Xerox Color Encoding Standard, the CIELAB color model, and the transformation of device dependent color specifications into the CIELAB color model may be found in the publication, *Xerox Color Encoding Standard*, Chapter 2, Chapter 3, Chapter 6, Sections 6-1 through 6-3, and the Appendices A, B, and C, published by Xerox Corporation, Xerox Systems Institute, Sunnyvale, Calif. (XNSS 289005, May 1990) (hereafter referred to as "Xerox CES"), and incorporated by reference herein.

The gamut of the monitor on which the user is working must be colorimetrically measured and those measurements defined for the reference color selection software. Device dependent color specifications of the form needed to display selected colors on the particular monitor being used, generally RGB signals, are then mathematically calculated as needed, according to well known formulas, such as those provided in the aforementioned Xerox CES, in Section 2, and Appendix C. Those skilled in the art will appreciate that any device independent perceptually uniform color space, such as, for example, the CIELUV color space, may be used as the model in which to manipulate the color selection methodology to be described below in more detail.

3. Selecting and Mixing Colors From a Palette

Figure 4:
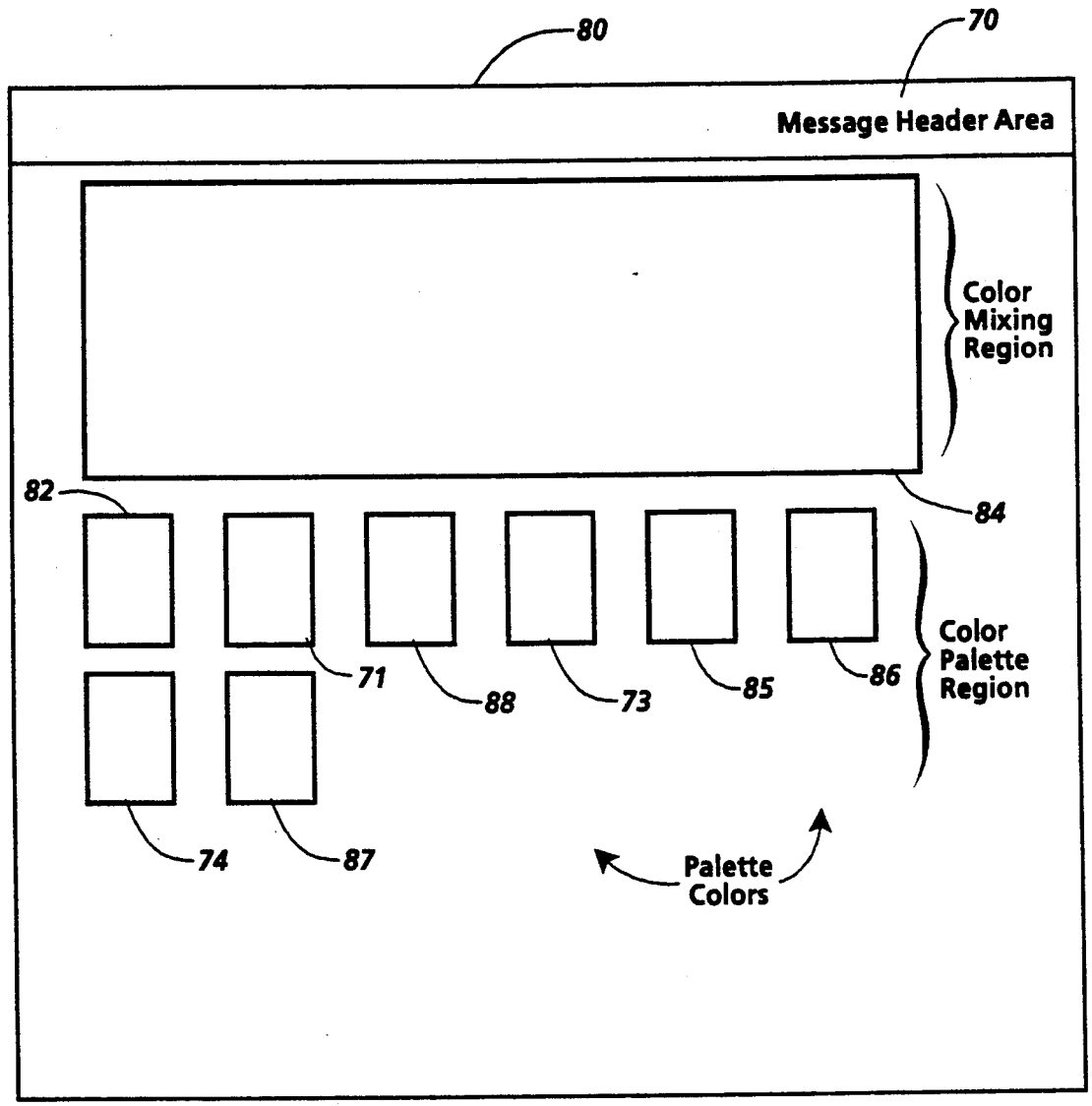
FIGS. 4, 5, 6, and 7 illustrate a sequence of display screens according to an illustrated embodiment of the present invention.

FIGS. 4 5, 6, and 7 illustrate a representative sequence of screen displays, 80, 90, 100, 110, respectively that a user would see in response to selecting colors according to the functions provided in the reference color selection system. With reference to FIG. 4, after instructing system 51 (FIG. 2) to begin executing reference color selection system 64 (FIG. 3), the user first specifies in message header area 70 the name of the palette of colors he wishes to examine. Alternatively, a menu command could be provided in message header area 70 which, when selected by mouse 54 FIG. 2), displayed a pull-down menu displaying the color palettes available in palette data base 68 and the user could simply select a palette by pointing to the palette name with mouse 54.

Selection of a palette also results in a copy of the selected palette of colors being brought into the memory of system 51 (FIG. 2) from palette data base 68 (FIG. 3). A "rename" function permits the user to change the name of the selected palette to a working or familiar name for future reference, before storing the palette back in palette data base 68 with the "save" function provided at the completion of his color mixing session.

Selection of a palette also results in screen 80 of FIG. 4 being displayed. The individual colors of the selected palette are displayed on a medium gray background in rectangular color patches, as shown. The colors may be displayed in a predetermined order according to color space coordinates, such as in descending order by lightness, L* values, or in ascending order by chroma values, but need not appear in any particular order. In the illustrated embodiment, the colors appear in the order they are entered in the palette array, with color 82 being the first color in the palette, followed left to right by colors 71, 88, 73, 85, and 86, respectively, on the top row of colors on screen 80. The colors are simply displayed in rows, and wrap around to a second row if needed, as shown. Colors 74 and 87 appear from left to right in the second row. Color 87 is the last color of this selected palette.

Some of the colors in predefined palettes may be highly saturated or very vivid colors. Such colors may not fall within the calibrated monitor gamut and their coordinates may need to be modified to bring them within the boundary of the calibrated monitor gamut. Any suitable known gamut mapping or clipping algorithm may be applied to accomplish this result.

Figure 5:
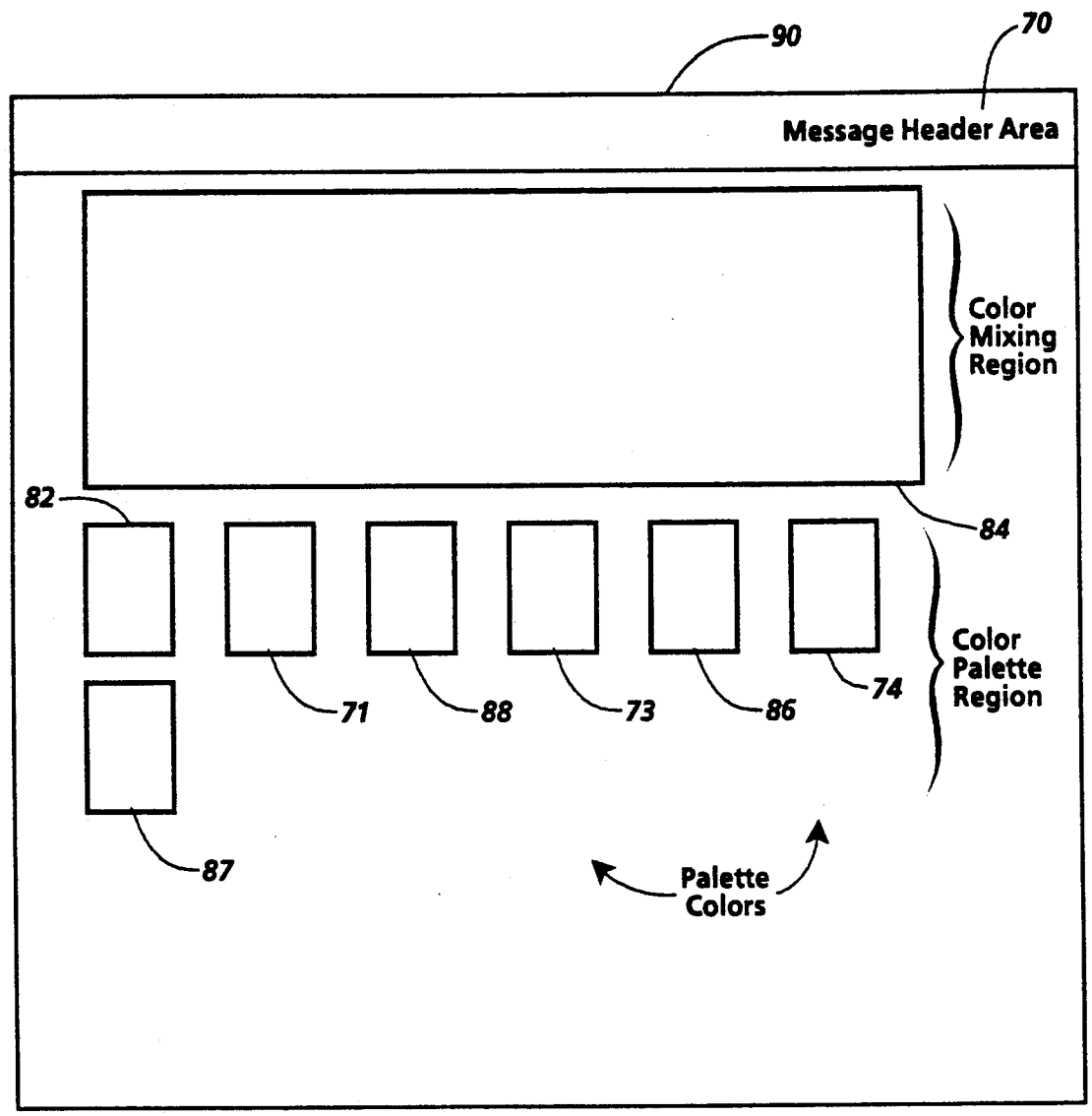

The user may decide, upon viewing the colors in the displayed palette, that one or more of the colors is not required for his illustration or image. The color may be deleted from the palette by simply pointing to the color with mouse 54 and clicking the combination of the "control" key on keyboard 53 and middle mouse button of mouse 54. For example, if color 85 is deleted from the color palette displayed on screen 80, the palette array is updated to remove color 85, and as shown in FIG. 5 on screen 90, the remaining colors are reordered from left to right on the screen. Because additional space is now available in the top row, color 74 moves from the second row to the top row of colors, following color 86.

The user may also decide, upon viewing the colors in the displayed palette, that additional colors are needed to complete the palette. In a sophisticated illustration, for example, the user may need fine variations on the basic, colors provided with a particular palette. Two alternatives are available to add additional colors to the displayed palette.

First, the user may mix or blend his own color from colors already existing in the palette and displayed on screen 90. When the user wishes to mix a color, the color "wash" function is available. Rectangular "color wash" area 84 on screen 90 is where color mixing is performed. Blending or mixing a new color can be performed for any two colors of the displayed palette, creating in effect a digital wash much like the wash of colors performed by an artist using a paint palette.

To perform a color wash, the user first selects from the displayed palette two colors using mouse 54, by selecting the first color 87 using the left mouse button on mouse 54 and selecting the second color 88 using right mouse button on mouse 54.

Figure 6:
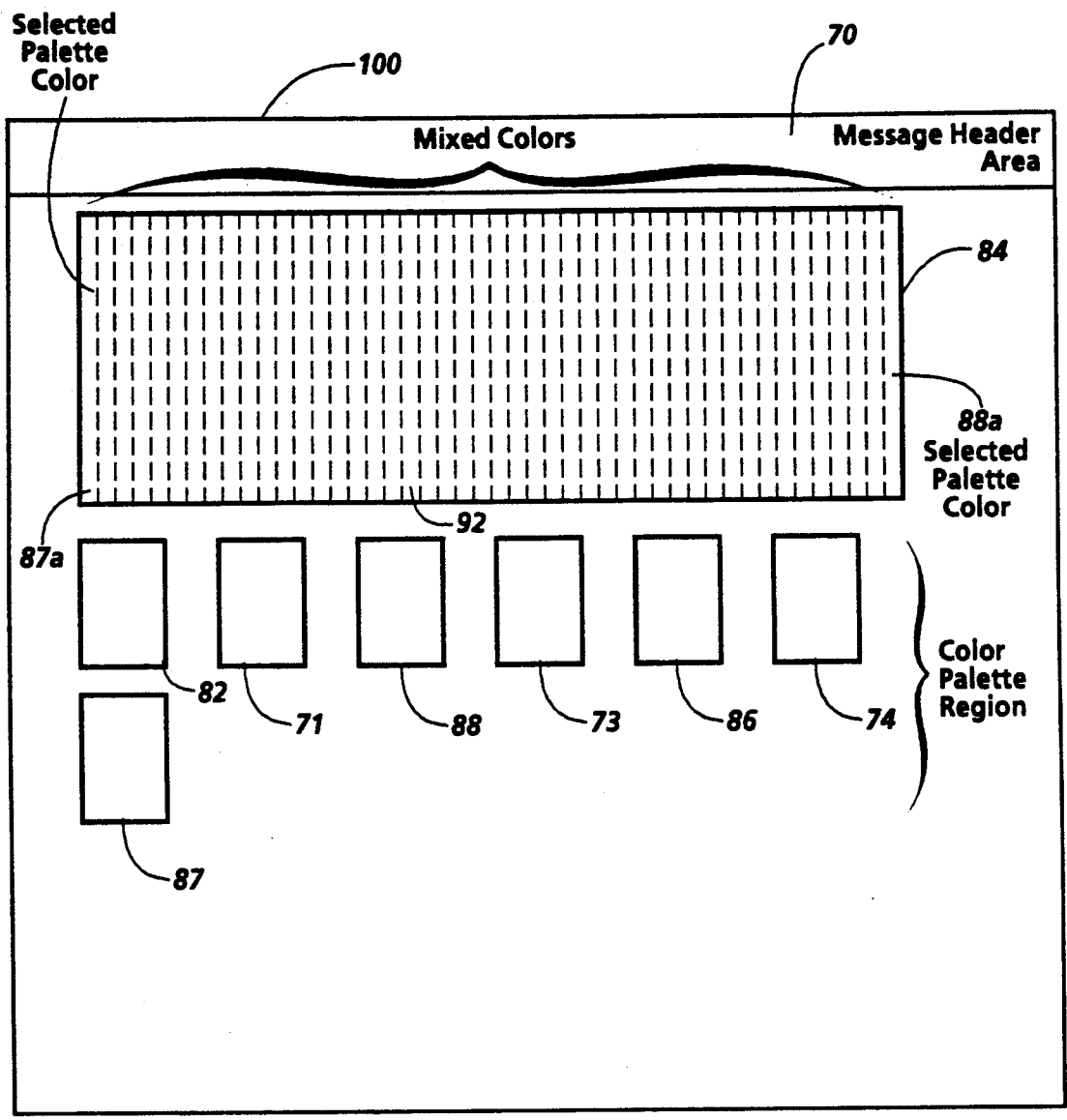

Referring now to FIG. 6, there is displayed in screen 100 the results of the color wash function. Color 87a, identical to color 87, is displayed at the far left of rectangular wash area 84, and color 88a, identical to color 88, is displayed at the far right. In the illustrated embodiment, a predefined number of colors are computed the uniform CIELAB space at equal intervals between the coordinates of colors 87 and 88, and these colors are then displayed between colors 87a and 88a in rectangular wash area 84, shown by the dotted vertical lines. Because the range of colors displays very fine discriminable differences between each one, no actual lines appear in the wash; the color wash is a smooth, continuous range of colors between end colors 87a and 88a.

The wash function is a simple linear interpolation between the three L*, a*, and b* coordinates of the two selected end colors, producing what is known in the art as an "interval scale". A predefined range for the interpolation may be provided in the code, or the range may be left as a user modifiable parameter. Alternatively, an interval scale of colors based on unit differences of perceived colors in the CIELAB color space may also be specified, such that for every two colors selected as end colors, only colors perceived as different will occur in color wash rectangle 84, based on the concept of the "just noticeable difference" unit of perceived colors in CIELAB space. In the illustrated embodiment, a range of 100 colors is provided in color wash rectangle 84, depending upon the end colors selected. The code representing the wash function is provided in TABLE 3.

TABLE 3

```
IF doWash AND (data.selection.left # NIL) AND
(data.selection.right # NIL)
THEN BEGIN
    delta: CIELAB; sel:SelectionDigital ~ data.selection;
    IF(data.wash = NIL) THEN data.wash ← NEW [WashRep];
    delta.lStar ← sel.right.lStar − sel.left.lStar;
    delta.aStar ← sel.right.aStar − sel.left.aStar;
    delta.bStar ← sel.right.bStar − sel.left.bStar;
    FOR i:INTEGER IN [0.. washItems] DO
        t:REAL ~ Float[i]/Float [washItems−1];
        data.wash[i] ← NEW [CIELAB];
        data.wash[i].lStar ← sel.left.lStar + t * delta.lStar;
        data.wash[i].aStar ← sel.left.aStar + t * delta.aStar;
        data.wash[i].bStar ← sel.left.bStar + t * delta.bStar;
        data.washCache[i] ← ColorFromLAB [data.wash[i]]
    ENDLOOP
    END;
```

The user may now select any color from the color wash rectangle 84 and add the color to his palette by simply clicking the middle mouse button of mouse 54 at the location of the color in the rectangle. If the user selects wash color 92, the selected wash color 92 is added to the palette array in the memory of system 51 (FIG. 2).

Figure 7:
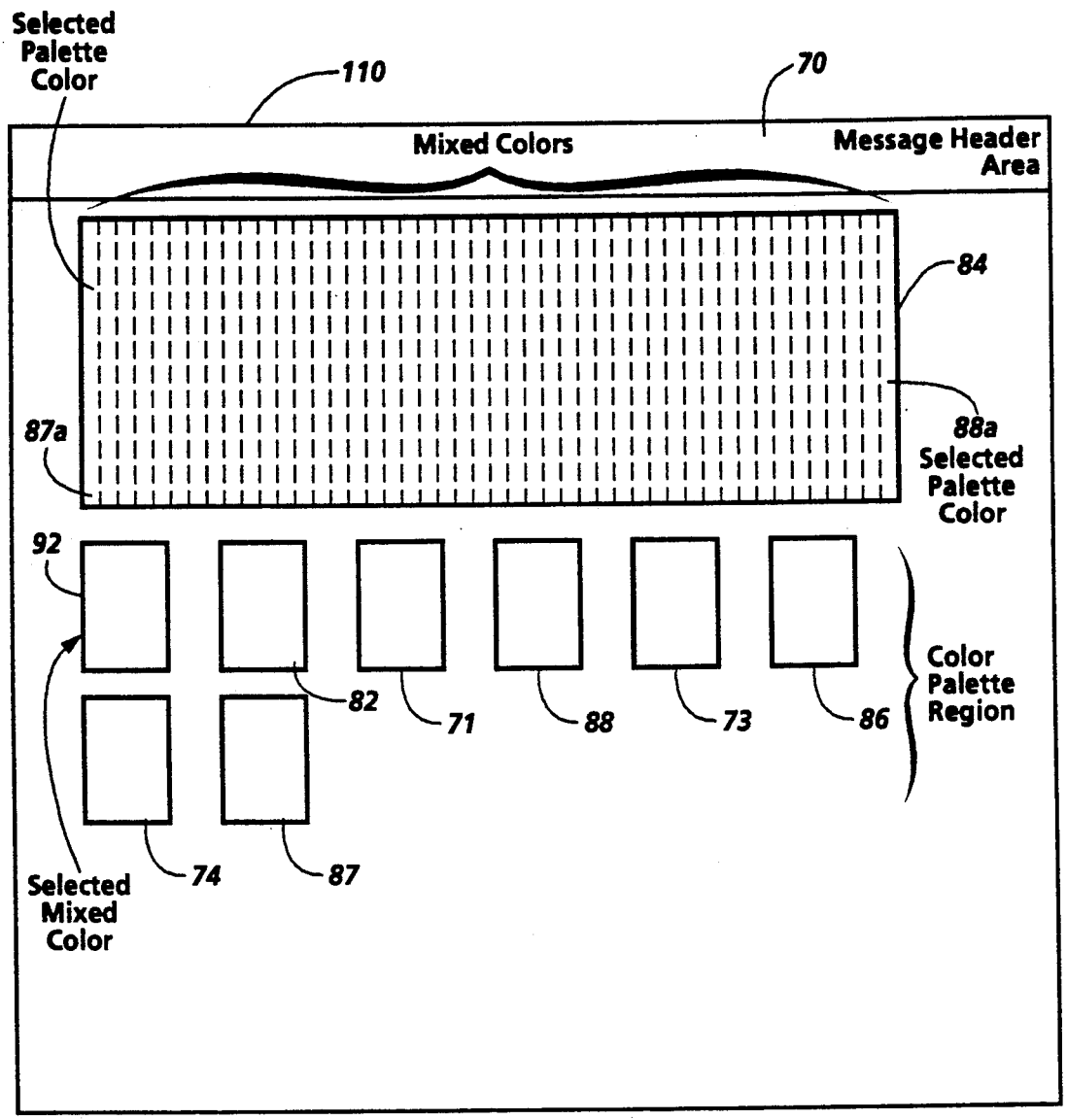

Turning now to FIG. 7, screen 110 illustrates the selected wash color 92 added in the leftmost position of the top row of the displayed palette of colors. The most recently added selected wash color is always added at the same location on screen 110 so that the user may easily recognize it; this is especially important if the user is working with very fine variations of colors which may, upon a quick glance, look very similar. Screen 110 shows that the remaining palette colors 82, 71, 88, 73, and 86, respectively, have been redisplayed to the right of the added selected wash color 92, with the color 86, formerly one position to the left (see FIG. 6) now appearing in the last position of the top row of palette colors. The user may add as many colors as he chooses from the color wash rectangle 84. Each color will be added in the leftmost position of the displayed palette on screen 110, as just described.

If the user determines, upon viewing selected wash color 92 against the gray background and adjacent to other colors in the palette, that it is not the correct color, he can simply delete it from the palette, as described above with reference to FIGS. 4 and 5. The selected wash of colors between colors 87a and 88a remains displayed in color wash rectangle wash 84, and the user may simply make another selection.

Successive interpolation or mixing can be used to generate difficult-to-determine colors. To do this, the user selects two end colors as hereinbefore described, and selects the best interpolated wash color 92 for his purposes. After color 92 is added to the palette and displayed as the first, leftmost color in the top row of colors as described above, the user may select color 92 as the left or right end color in the next successive interpolation or wash. The color wash process as just described may be iterated as many times as needed by making a new interval scale using the newest selected color as one of the end points.

In addition, the reference color selection system may be used in conjunction with the functional color selection system referenced earlier, to create a color wash between two of the functional colors selected for a palette of colors using that system. By selecting and displaying a functional color palette according to the steps described above, the key color, and the analogous and complementary harmony colors, with their lightness and chroma variations, will be displayed. For any two of the lightness or chroma variations displayed as part of the palette, all lightness or chroma variations between those two colors may be created using the color wash function of the reference color selection system, by selecting the lightest and darkest, or the grayest and most vivid, colors as end colors for the color wash. Thus, the reference color selection system may be used to enhance the functionality of the palettes created with the functional color selection system.

When color mixing has been completed and the palette of colors is satisfactory for the user's purposes, the palette may be copied to palette data base 68 using the "save" command.

It is of course clear from the foregoing descriptions for the reference color selection system that many variations of color palettes may be constructed in this manner.

CONCLUSION

In view of the foregoing, it now will be seen that the present invention provides means for facilitating the selection and mixing of colorimetrically measured colors to be used for computer based color presentation systems, and provides the ability to blend colors using the metaphor of the artist's color wash. The color selection system of this invention is sufficiently straightforward to enable users who have little, if any, background knowledge or skill in color coordination to create a sophisticated and complete palette of colorimetrically accurate colors for use in computer graphics images.

APPENDIX A

*ProtoPalette.Mesa*
  *Copyright © 1989 by Xerox Corporation. All rights reserved.*
  *Written by Giordano Bruno Beretta. May 9, 1989 1:17:56 pm PDT*
  *Beretta:PARC:Xerox (8°923-4484) November 6, 1989 5:06:04 pm PST*

*The procedures to build color palettes.*

DIRECTORY
    ImagerColorES USING [CIELAB];

ProtoPalette: CEDAR DEFINITIONS ~ BEGIN

CIELAB: TYPE ~ ImagerColorES.CIELAB;    -- RECORD [lStar, aStar, bStar: REAL];
    LCH: TYPE ~ RECORD [lStar, c, h: REAL];    -- Lab in cylindrical coordinates
    LAB: TYPE ~ REF CIELAB ← NIL;

values: INTEGER ~ 2;    chromata: INTEGER ~ 2;    -- in each direction of the color
    ValueAndChroma: TYPE ~ [-(values + chromata) .. chromata + values];
    IsoHueVariation: TYPE ~ ARRAY ValueAndChroma OF LAB.
    Hue: TYPE ~ [-3 .. 4];
        centerHue: INTEGER ~ 0;
        analoguousHarmonies: TYPE ~ [-2 .. 2];
        leftTriadicComplement: INTEGER ~ -3;
        rightTriadicComplement: INTEGER ~ 3;
        directComplement: INTEGER ~ 4;
    Harmony: TYPE ~ ARRAY Hue OF IsoHueVariation;

```
Palette: TYPE = REF PaletteRep;
PaletteRep: TYPE = RECORD [keyColor: ATOM, colors: Harmony, lock: BOOL ← FALSE];

notInitialized: SIGNAL;

CreatePalette: PROC [keyColor: ATOM ← $default] RETURNS [p: Palette];

ValidKeyColor: PROC [keyColor: ATOM] RETURNS [BOOL];

CopyPalette: PUBLIC PROC [p: Palette] RETURNS [pp: Palette];
    Make full physical copy.

RotateNegative: PROC [p: Palette] RETURNS [pp: Palette];
    The whole palette is rotated. Returns new element for undo.

RotatePositive: PROC [p: Palette] RETURNS [pp: Palette];
    The whole palette is rotated. Returns new element for undo.

MakeAnaloguousHarmony: PROC [p: Palette] RETURNS [pp: Palette];
    Returns new element for undo.

DeleteAnaloguousHarmony: PROC [p: Palette] RETURNS [pp: Palette];
    Returns new element for undo.

MakeDirectComplement: PROC [p: Palette] RETURNS [pp: Palette];
    Returns new element for undo.

DeleteDirectComplement: PROC [p: Palette] RETURNS [pp: Palette];
    Returns new element for undo.

MakeTriadicComplements: PROC [p: Palette] RETURNS [pp: Palette];
    Returns new element for undo.

DeleteTriadicComplements: PROC [p: Palette] RETURNS [pp: Palette];
    Returns new element for undo.

VaryValue: PROC [p: Palette, v: IsoHueVariation] RETURNS [vv: IsoHueVariation];
    Chroma and hue are kept constant, while the lightness is changed.
    Returns new element for undo RestrictValue: PROC [p: Palette, v: IsoHueVariation] RETURNS [vv: IsoHueVariation];

VaryChroma: PROC [p: Palette, v: IsoHueVariation] RETURNS [vv: IsoHueVariation];
    Value and hue are kept constant, while the chroma is changed.
    Returns new element for undo RestrictChroma: PROC [p: Palette, v: IsoHueVariation] RETURNS [vv: IsoHueVariation];

Cartesian: PROC [lch: LCH] RETURNS [LAB];
    Transforms from cylindrical to carthesian CIELAB coordinates.

Cylindrical: PROC [lab: LAB] RETURNS [LCH];
    Transforms from carthesian to cylindrical CIELAB coordinates.
```

ClipLightness: PROC [color: CIELAB] RETURNS [CIELAB]
*Clips a color by constraining only the lightness.*

END. -- *ProtoPalette*

*ProtoPaletteImpl.Mesa*
  *Copyright ■ 1989 by Xerox Corporation. All rights reserved.*
  *Written by Giordano Bruno Beretta May 9, 1989 1:17:56 pm PDT*
  *Beretta:PARC:Xerox (8*923-4484) November 6, 1989 5:05:08 pm PST*

*The procedures to build color palettes.*

DIRECTORY
  ProtoPalette,
  Imager USING [VEC],
  ImagerColorES USING [ABChroma, CIELABFromXYZ, CIELUV, HSVFromRGB,
      IlluminantChange, RGB, RGBFromHSV, Tristimulus, XeroxRGBFromXYZ, XYZ,
      XYZFromCIELAB, XYZFromCIELUV, XYZFromXeroxRGB],
  IntChainedHashTable USING [Create, Fetch, Insert, Key, Replace, Table],
  Real USING [Ceiling, Float, Floor, Round],
  RealFns USING [ArcTanDeg, CosDeg, SinDeg, SqRt],
  RefTab USING [Create, Fetch, Ref, Store]:

ProtoPaletteImpl: CEDAR PROGRAM

IMPORTS ImagerColorES, IntChainedHashTable, Real, RealFns, RefTab

EXPORTS ProtoPalette ~ BEGIN    OPEN ProtoPalette, Real, RealFns;

VEC: TYPE ~ Imager.VEC; VEC3: TYPE ~ RECORD [x, y, z: REAL];
  XYZ: TYPE ~ ImagerColorES.XYZ;

break: SIGNAL ~ CODE;           -- *for debugging*
  notInitialized: PUBLIC SIGNAL ~ CODE;
  debug: BOOL ← FALSE;   published: BOOL ← FALSE;       -- *which gamut*
  precision: ATOM ← Slow;  centerChroma: ATOM ← Smiddle;

Value: TYPE ~ [-values .. values];  Chroma: TYPE ~ [-chromata .. chromata];
  KeyColor: TYPE ~ REF KeyColorRep;
  KeyColorRep: TYPE ~ RECORD [name: ATOM, lch: LCH, lab: LAB, pivot: REAL];
  keyColorTable: RefTab.Ref ← RefTab.Create [];
  hues: REAL ← 12;          hueStep: REAL ← 360.0 / hues;

Basic Operations

CreatePalette: PUBLIC PROC [keyColor: ATOM ← $default] RETURNS [p: Palette] ~ BEGIN
    *The key hue is an angle.*
    reference: KeyColor ~ KeyColorData [keyColor];
    color: LCH ~ CenterColor [reference.lch.h, reference];
    p ← NEW [PaletteRep];     p.lock ← TRUE;
    p.keyColor ← keyColor;   p.colors[centerHue][0] ← Cartesian [color];
    p.lock ← FALSE
    END;   -- *CreatePalette*

CopyPalette: PUBLIC PROC [p: Palette] RETURNS [pp: Palette] ~ BEGIN
    *Make full physical copy*

```
IF (p = NIL) THEN notInitialized;
IF p.lock THEN break;       p.lock ← TRUE;
pp ← NEW [PaletteRep];      pp.lock ← TRUE;
FOR i: Hue IN Hue DO
    FOR j: ValueAndChroma IN ValueAndChroma DO
        IF (p.colors[i][j] # NIL) THEN pp.colors[i][j] ← NEW [CIELAB ← p.colors[i][j]↑]
    ENDLOOP
ENDLOOP;
pp.keyColor ← p.keyColor;   p.lock ← pp.lock ← FALSE
END;    -- CopyPalette
```

```
Cartesian: PUBLIC PROC [lch: LCH] RETURNS [LAB] ~ BEGIN
    Transforms from cylindrical to cartesian CIELAB coordinates.
    RETURN [NEW [CIELAB ← [lch.lStar, lch.c * CosDeg [lch.h], lch.c * SinDeg [lch.h]]]]
END;    -- Cartesian
```

```
Cylindrical: PUBLIC PROC [lab: LAB] RETURNS [LCH] ~ BEGIN
    Transforms from cartesian to cylindrical CIELAB coordinates.
    lch: LCH ← [lab.lStar, SqRt [lab.aStar*lab.aStar + lab.bStar*lab.bStar], ArcTanDeg
            [lab.bStar, lab.aStar]];
    IF (lch.h < 0) THEN lch.h ← lch.h + 360;
    RETURN [lch]
END;    -- Cylindrical
```

```
ValueStep: PROC [v: ValueAndChroma] RETURNS [Value] ~ BEGIN
    Decodes value out of valueAndChroma index.
    IF (v > chromata) THEN RETURN [v - chromata];
    IF (v < -chromata) THEN RETURN [v + chromata];
    RETURN [0]
END;    -- ValueStep
```

```
ChromaStep: PROC [c: ValueAndChroma] RETURNS [Value] ~ BEGIN
    Decodes chroma out of valueAndChroma index.
    IF (c < -chromata) OR (c > chromata) THEN RETURN [0];
    RETURN [c]
END;    -- ChromaStep
```

Colorimetry

*The number of edges in the slices is much too high. This is to allow experimentation. In a production version the gamut need to be known only for the hues actually occurring in the palette, which is 12 instead of 40. The number of slices is critical and should not be reduced, as vivid light colors would be reported to fall outside the gamut.*

```
Pentagon: TYPE ~ ARRAY [1 .. 5] OF VEC;
Icosagon: TYPE ~ ARRAY [1 .. 20] OF VEC;
Eicosiena: TYPE ~ ARRAY [0 .. 20] OF VEC;
Sarantagon: TYPE ~ ARRAY [1 .. 40] OF VEC;
Segment: TYPE ~ RECORD [a, b: VEC];
```

```
gamut: ARRAY [1..9] OF Pentagon;
gamut20: ARRAY [1..9] OF Icosagon;
fineGamut: ARRAY [1..19] OF Sarantagon;
meridian: ARRAY [1..40] OF Eicosiena;

unknownValue: INT ~ -1;
valueCache: IntChainedHashTable.Table ← IntChainedHashTable.Create [unknownValue,
        149];
ValueExtrema: TYPE ~ REF ValueExtremaRep;
ValueExtremaRep: TYPE ~ RECORD [min, max: REAL ← unknownValue];

MaxChroma: PROC [color: LCH] RETURNS [REAL] ~ BEGIN
    Intersects a ray at angle = hue with the gamut slice for the specified lightness
    MaxDistance: PROC [p: VEC, h: Pentagon] RETURNS [q: VEC] ~ BEGIN
        q = p if p ⊆ h
        q = L(p, h.center) ∩ π(h) otherwise
        i: BOOL;         probe: Segment ~ [a: [0, 0], b: p];
        FOR s: [1..5] IN (1..5] DO
            [i, q] ← Intersect [probe, [h[s-1], h[s]]];
            IF i THEN RETURN
            ENDLOOP;
        [i, q] ← Intersect [probe, [h[5], h[1]]];       IF NOT i THEN ERROR;
        RETURN [q]
        END;  -- MaxDistance
    MaxDistance40: PROC [p: VEC, h: Sarantagon] RETURNS [q: VEC] ~ BEGIN
        q = p if p ⊆ h
        q = L(p, h.center) ∩ π(h) otherwise
        i: BOOL;         probe: Segment ~ [a: [0, 0], b: p];
        FOR s: [1..40] IN (1..40] DO
            [i, q] ← Intersect [probe, [h[s-1], h[s]]];
            IF i THEN RETURN
            ENDLOOP;
        [i, q] ← Intersect [probe, [h[40], h[1]]];      IF NOT i THEN ERROR;
        RETURN [q]
        END;  -- MaxDistance40
    SELECT precision FROM
        Shigh => BEGIN
            Assume that the gamut is regularly sampled, i.e., there is a meridian every 40° and a
            circle of latitude every 5 jnd. Determine the patch in which the point lies, project it in
            a plane through 3 of the patch's vertices and interpolate in this quadrilaterum. The
            quadrilaterum is not necessarely convex. Because of wrinkling, the quadrilaterum is
            not on a tangential plane.
            origin: VEC ~ [0, 0];      ray: Segment;
            hi: REAL ~ color.h/9.0;    vi: REAL ~ color.lStar/5.0;
            hue1: INTEGER ← Floor [hi];     hue2: INTEGER ← Ceiling [hi];
            value1: INTEGER ~ Floor [vi];   value2: INTEGER ~ Ceiling [vi];
            Four corners and edges looking from the outside.
            sw, se, ne, nw, s, e, n, w, max: VEC;      s3, e3, n3, w3: VEC3;
            ok, okS, okE, okN, okW: BOOL ← TRUE;
            IF (hue1 = 0) THEN hue1 ← 40;     IF (hue2 = 41) THEN hue2 ← 1;
```

Find the patch on the gamut containing the true value.
IF (value1 = 0) THEN {sw ← se ← origin} ELSE
   {sw ← fineGamut[value1][hue1];   se ← fineGamut[value1][hue2]};
IF (value2 = 100) THEN {sw ← se ← origin} ELSE
   {ne ← fineGamut[value2][hue2];   nw ← fineGamut[value2][hue1]};
Think of being in the tangential plane of the gamut in which the patch lies.
We intersect a ray of given hue angle with the northern and southern edges to find a north-south segment. Think of looking down from infinite lightness.
ray ← [origin, [500*CosDeg[color.h], 500*SinDeg[color.h]]];
[okS, s] ← Intersect [ray, [sw, se]];
[okN, n] ← Intersect [ray, [nw, ne]];
Now we do the same thing with the eastern and western edges and find the endpoints of the west-east segment. Think of looking to a cross-section of the gamut along the meridian of given hue.
First, change the coordinate system.

sw.x ← SqRt [sw.x*sw.x + sw.y*sw.y];     sw.y ← Floor [color.lStar];
se.x ← SqRt [se.x*se.x + se.y*se.y];     se.y ← sw.y;
nw.x ← SqRt [nw.x*nw.x + nw.y*nw.y];     nw.y ← Ceiling [color.lStar];
ne.x ← SqRt [ne.x*ne.x + ne.y*ne.y];     ne.y ← nw.y;
ray ← [[0, color.lStar], [500, color.lStar]];
[okE, e] ← Intersect [ray, [se, ne]];
[okW, w] ← Intersect [ray, [sw, nw]];

A consistency test.
IF NOT (okS AND okN AND okE AND okW) THEN break;
Now we can instersect the two segments (north-south and west-east) to find the maximum.
To do this we have to project the rectangle on the tangential plane. We approximate the tangential plane by the plane passing through tree of the points: although in some cases this is completely bogus because the gamut surface is wrinkled.
s3 ← [s.x, s.y, value1];     n3 ← [n.x, n.y, value2];
w3 ← [w.x*CosDeg[hue1], w.x*SinDeg[hue1], w.y];
e3 ← [e.x*CosDeg[hue2], e.x*SinDeg[hue2], e.y];
s ← ...; n ← ...; w ← ...; e ← ...;
[ok, max] ← Intersect [[s, n], [e, w]];
IF NOT ok THEN break;
RETURN [SqRt [max.x*max.x + max.y*max.y]]
END;

$medium => BEGIN
Assume that the gamut is regularly sampled only in one direction, namely that there is a circle of latitude every 5 jnd, but there are no meridians.
ray: VEC ~ [500*CosDeg[color.h], 500*SinDeg[color.h]];
latitude: INTEGER ~ MAX [MIN [Round [color.lStar/5.0], 19], 1];
cartesian: VEC;
cartesian ← IF published THEN MaxDistance [ray, gamut[latitude]] ELSE
            MaxDistance40 [ray, fineGamut[latitude]];
RETURN [SqRt [cartesian.x*cartesian.x + cartesian.y*cartesian.y]]
END;

$low => BEGIN
Assume that the gamut is regularly sampled, i.e., there is a meridian every 40° and a circle of latitude every 5 jnd. Find the closest coordinate in the sampled gamut.

```
    . pos: VEC;
    latitude: INTEGER ~ MAX [MIN [Round [color.lStar/5.0], 19], 1];
    meridian: CARDINAL ← Round [color.h/9.0]; IF meridian = 0 THEN meridian ← 40;
    pos ← fineGamut[latitude][meridian];    RETURN [SqRt [pos.x*pos.x +
            pos.y*pos.y]]
    END;
    ENDCASE => ERROR;
END;    -- MaxChroma MaxLightness: PROC [color: LCH] RETURNS [REAL] ~ BEGIN
    Brute force approach. Lots of room for improvement.
    probe: LCH;   key: INT ~ Round [color.lStar] + 100 * Round [color.c];
    minMax: ValueExtrema ← NARROW [valueCache.Fetch[key].value];
    IF (minMax # NIL) AND (minMax.max # unknownValue) THEN RETURN [minMax.max];
    This procedure is usually called before the chroma is adjusted for the gamut.
    color.c ← MAX [MIN [color.c, MaxChroma [color] - 10], 0];    probe ← color;
    FOR I: [1 .. 19] DECREASING IN [1 .. 19] DO
        probe.lStar ← I * 5;
        IF (MaxChroma [probe] >= color.c) THEN BEGIN
            IF (minMax # NIL) THEN BEGIN
                minMax.max ← probe.lStar + 2.5;
                IF NOT valueCache.Replace [key, minMax] THEN ERROR
            END
            ELSE BEGIN
                minMax ← NEW [ValueExtremaRep];    minMax.max ← probe.lStar + 2.5;
                IF NOT valueCache.Insert [key, minMax] THEN ERROR
            END;
            RETURN [minMax.max]
        END
    ENDLOOP;
    break;   RETURN [color.lStar]
    END;   -- MaxLightness MinLightness: PROC [color: LCH] RETURNS [REAL] ~ BEGIN
    Brute force approach. Lots of room for improvement.
    probe: LCH;   key: INT ~ Round [color.lStar] + 100 * Round [color.c];
    minMax: ValueExtrema ← NARROW [valueCache.Fetch[key].value];
    IF (minMax # NIL) AND (minMax.min # unknownValue) THEN RETURN [minMax.min];
    This procedure is usually called before the chroma is adjusted for the gamut.
    color.c ← MAX [MIN [color.c, MaxChroma [color] - 10], 0];    probe ← color;
    FOR I: [1 .. 19] IN [1 .. 19] DO
        probe.lStar ← I * 5;
        IF (MaxChroma [probe] >= color.c) THEN BEGIN
            IF (minMax # NIL) THEN BEGIN
                minMax.min ← probe.lStar - 2.5;
                IF NOT valueCache.Replace [key, minMax] THEN ERROR
            END
            ELSE BEGIN
                minMax ← NEW [ValueExtremaRep];    minMax.min ← probe.lStar - 2.5;
                IF NOT valueCache.Insert [key, minMax] THEN ERROR
```

```
        END;
        RETURN [min.Max.min]
      END
    ENDLOOP;
    break; RETURN [color.lStar]
  END;    -- MinLightness ClipLightness: PUBLIC PROC [color: CIELAB] RETURNS [CIELAB] ~ BEGIN
  Clips a color by constraining only the lightness.
  clipped: CIELAB ← color;
  lch: LCH ← [color.lStar, SqRt [color.aStar*color.aStar + color.bStar*color.bStar], ArcTanDeg
        [color.bStar, color.aStar]];
  IF (lch.h < 0) THEN lch.h ← lch.h + 360;
  IF (lch.c < 0.5) THEN RETURN [color];
  clipped.lStar ← MAX [MIN [color.lStar, MaxLightness [lch]], MinLightness [lch]];
  RETURN [clipped]
  END;    -- ClipLightness Intersect: PROC [s1, s2: Segment] RETURNS [incidence: BOOL, p: VEC ← [0, 0]] ~ BEGIN
  s1 is the probe, s1.a the center (white) and s1.b the cursor position.
  eps: REAL ~ 1.0/2112.0/2112.0;    -- (* = xmaxt-2 *) error in compiler
  a11, a12, a21, a22, v1, v2, det, cof1, cof2, alpha, beta: REAL;
  eps ← 1.0 / 2112.0 / 2112.0;      -- CONST
  incidence ← FALSE;
  a11 ← s1.b.x - s1.a.x;   a12 ← s2.a.x - s2.b.x;    v1 ← s1.a.x - s2.a.x;
  a21 ← s1.b.y - s1.a.y;   a22 ← s2.a.y - s2.b.y;    v2 ← s1.a.y - s2.a.y;
  cof1 ← a12 * v2 - a22 * v1;       cof2 ← a21 * v1 - a11 * v2;
  det ← a11 * a22 - a12 * a21;
  The pentagon is always convex ⇒ no degeneracies
  IF ABS [det] < eps THEN RETURN;
  alpha ← cof1 / det;     beta ← cof2 / det;
  incidence ← ((alpha>-eps) AND (alpha<=1.0+eps)) AND ((beta>=-eps) AND
          (beta<=1.0+eps));
  IF incidence THEN BEGIN
      p.x ← (1.0-alpha) * s1.a.x + alpha * s1.b.x;
      p.y ← (1.0-alpha) * s1.a.y + alpha * s1.b.y
      END
  END;    -- Intersect InitGamut: PROC ~ BEGIN
  Monitor. Eyeballed from Fig. 6b in Ph.K. Robertson, Visualizing Color Gamuts. IEEE
    Computer Graphics & S.
  Coordinates are u* v*.
  gamut[1] ← [[32, 0], [39, 8], [-11, 12], [-4, -37], [0, -33]];
  FOR i: [1 .. 5] IN [1 .. 5] DO
      gamut[2][i].x ← 2 * gamut[1][i].x;   gamut[2][i].y ← 2 * gamut[1][i].y;
      gamut[3][i].x ← 3 * gamut[1][i].x;   gamut[3][i].y ← 3 * gamut[1][i].y;
      gamut[4][i].x ← 4 * gamut[1][i].x;   gamut[4][i].y ← 4 * gamut[1][i].y
      ENDLOOP;
  gamut[4][4].y ← gamut[4][5].y ← -132;      gamut[4][5].x ← 3;
```

```
gamut[5] ← [[160, 0], [195, 48], [-52, 60], [-28, -122], [43, -125]];
gamut[6] ← [[103, -95], [158, 52], [-64, 72], [-40, -100], [90, -108]];
gamut[7] ← [[92, 0], [108, 69], [-75, 84], [-53, -74], [74, -81]];
gamut[8] ← [[56, 0], [64, 82], [-85, 97], [-67, -46], [49, -54]];
gamut[9] ← [[25, -28], [31, 98], [-62, 108], [-84, -20], [-79, -20]];
Transform to a* b*.
FOR i: [1 .. 9] IN [1 .. 9] DO
    FOR j: [1 .. 5] IN [1 .. 5] DO
        luv: ImagerColorES.CIELUV ← [i*10, gamut[i][j].x, gamut[i][j].y];
        xyz: XYZ ← ImagerColorES.XYZFromCIELUV [luv, [0,0,0]];
        lab: CIELAB ← ImagerColorES.CIELABFromXYZ [xyz, [0,0,0]];
        gamut[i][j] ← [lab.aStar, lab.bStar]
        ENDLOOP
    ENDLOOP
END;     -- InitGamut InitGamut40: PROC ← BEGIN
Try to find gamut of a SMPTE monitor. Needs more edges because it does not take into
consideration the gamut shape.
lch: LCH;       rgb: ImagerColorES.RGB;       count: CARDINAL;
a, b, m, min, max: REAL;
Rgb: PROC ← BEGIN
    rgb ← ImagerColorES.XeroxRGBFromXYZ [ImagerColorES.XYZFromCIELAB
        [[lch.lStar, lch.c * CosDeg [lch.h], lch.c * SinDeg [lch.h]], [0, 0, 0]]];
    min ← MIN [rgb.R, rgb.G, rgb.B];    max ← MAX [rgb.R, rgb.G, rgb.B]
    END;     -- Rgb
FOR i: [1 .. 19] IN [1 .. 19] DO
    lch.lStar ← 5 * i;
    FOR j: [1 .. 40] IN [1 .. 40] DO
        Estimate chroma.
        lch.h ← 360.0 / 40.0 * j;   lch.c ← 60;        Rgb[];
        lch.c ← ImagerColorES.ABChroma [ImagerColorES.CIELABFromXYZ
            [ImagerColorES.XYZFromXeroxRGB [ImagerColorES.RGBFromHSV
            [ImagerColorES.HSVFromRGB [rgb]]], [0, 0, 0]]];
        a ← 0;  b ← 2 * lch.c;   m ← lch.c;       count ← 0;
        Find max using binary search.
        WHILE (ABS [b - a] > 0.01) DO
            IF (min < 0) OR (max > 1) THEN b ← m
            ELSE BEGIN
                IF (min > 0.0001) AND (max < 0.9999) THEN a ← m
                ELSE EXIT      -- 0 ≤ min ≤ 0.0001 V 0.9999 ≤ max ≤ 1
                END;
            m ← lch.c ← (a + b) / 2.0;       Rgb[];
            count ← count.SUCC;    IF (count > 1000) THEN break
            ENDLOOP;
        fineGamut[i][j] ← [lch.c * CosDeg [lch.h], lch.c * SinDeg [lch.h]]
        ENDLOOP
    ENDLOOP
END;     -- InitGamut40
```

```
D65YxyToLab: PROC [Y, x, y: REAL, white: XYZ] RETURNS [LAB] ~ BEGIN
    RETURN [NEW [CIELAB ← ImagerColorES.CIELABFromXYZ
            [ImagerColorES.IlluminantChange [ImagerColorES.Tristimulus [[Y, x, y]]],
            white]]]
    END;    -- D65YxyToLab
```

Algorithms

```
CenterColor: PROC [hue: REAL, ref: KeyColor] RETURNS [LCH] ~ BEGIN
    The center color must be an invariant, otherwise the global operations depend on the previous
    state.
    color: LCH;
    color.lStar ← ref.pivot + ((ref.lch.lStar-ref.pivot) * CosDeg [ref.lch.h - hue]);
    color.h ← hue;
    This is the main focus of research. How do we best choose the center colors?
    color.c ← SELECT centerChroma FROM
        $keyColor => ref.lch.c,
        $middle => MaxChroma [color] / 2.0,
        $compromise => MaxChroma [color] / 4.0 + ref.lch.c / 2.0,
        $exceptKey => IF (Round[hue] = Round[ref.lch.h]) THEN ref.lch.c
            ELSE MaxChroma [color] / 2.0,
        ENDCASE => ERROR;
    RETURN [color]
    END;    -- CenterColor LightnessForHue: PROC [step: Value, hue: LCH, ref: KeyColor] RETURNS [REAL] ~ BEGIN
    Colors are on an inclinated plane.
    value: REAL ← CenterColor [hue.h, ref].lStar;
    max: REAL ~ MaxLightness [hue]; min: REAL ~ MinLightness [hue];
    Leave some room for the variants:
    value ← MIN [MAX [value, min + 5.0], max - 5.0];
    SELECT step FROM
        < 0 => RETURN [value + step * (value - min) / (Float[values] + 1.0)];
        = 0 => RETURN [value];
        ENDCASE => RETURN [value + step * (max - value) / Float[values]]
    END;    -- LightnessForHue ChromaForHue: PROC [step: Chroma, hue: LCH, ref: KeyColor] RETURNS [REAL] ~ BEGIN
    Vivid colors go to gamut boundary, dull colors 1/steps before gray.
    chroma: REAL ← CenterColor [hue.h, ref].c;
    max: REAL ~ MaxChroma [hue];
    Leave some room for the variants:
    chroma ← MIN [MAX [chroma, 5.0], max - 5.0];
    SELECT step FROM
        < 0 => RETURN [chroma * (1.0 + Float [step] / Float [chromata + 1])];
        = 0 => RETURN [chroma];
        ENDCASE => RETURN [chroma + (Float [step] / Float [chromata]) * (max - chroma)]
    END;    -- ChromaForHue
```

ChangeHue: PROC [color: LAB, amount: REAL, var: ValueAndChroma, ref: KeyColor]
    RETURNS [LAB] ~ BEGIN
    *Returns a newly allocated element. To make things symmetrical, first the center value must be
    computed (var = 0). ChromaForHue will refer to the center for the lightness and
    LightnessForHue will refer to the center for the chroma.*
    vs: ValueAndChroma ~ ValueStep [var];    cs: ValueAndChroma ~ ChromaStep [var];
    lch: LCH;         newHue: REAL;
    IF (color = NIL) THEN RETURN [NIL];
    newHue ← Cylindrical [color].h;    newHue ← newHue + amount;
    IF (newHue < 0) THEN newHue ← newHue + 360;
    IF (newHue > 360) THEN newHue ← newHue - 360;
    lch ← CenterColor [newHue, ref];
    IF (cs = 0) THEN
        {lch.c ← ChromaForHue [cs, lch, ref];  lch.lStar ← LightnessForHue [vs, lch, ref]}
    ELSE {lch.lStar ← LightnessForHue [vs, lch, ref];    lch.c ← ChromaForHue [cs, lch, ref]};
    RETURN [Cartesian [lch]]
    END;   -- *ChangeHue*

VaryValue: PUBLIC PROC [p: Palette, v: IsoHueVariation] RETURNS [vv: IsoHueVariation] ~
    BEGIN
    *Chroma and hue are kept constant, while the lightness is changed. The scale is asymmetric
    Returns new element for undo.*
    lch: LCH;       reference: KeyColor;
    IF (p = NIL) OR (v[0] = NIL) THEN notInitialized;
    IF p.lock THEN break;    p.lock ← TRUE;
    reference ← KeyColorData [p.keyColor];    lch ← Cylindrical [v[0]];
    FOR i: ValueAndChroma IN [-(values + chromata) .. -chromata) DO
        vv[i] ← NEW [CIELAB];
        vv[i].lStar ← LightnessForHue [ValueStep [i], lch, reference];
        vv[i].aStar ← v[0].aStar;    vv[i].bStar ← v[0].bStar
        ENDLOOP;
    FOR i: ValueAndChroma IN [-chromata .. chromata] DO vv[i] ← v[i] ENDLOOP;
    FOR i: ValueAndChroma IN (chromata .. chromata + values] DO
        vv[i] ← NEW [CIELAB];
        vv[i].lStar ← LightnessForHue [ValueStep [i], lch, reference];
        vv[i].aStar ← v[0].aStar;    vv[i].bStar ← v[0].bStar
        ENDLOOP;
    p.lock ← FALSE
    END;   -- *VaryValue*

VaryChroma: PUBLIC PROC [p: Palette, v: IsoHueVariation] RETURNS [vv: IsoHueVariation] ~
    BEGIN
    *Value and hue are kept constant, while the chroma is changed.
    Returns new element for undo.*
    lch: LCH; reference: KeyColor;
    IF (p = NIL) OR (v[0] = NIL) THEN notInitialized;
    IF p.lock THEN break;    p.lock ← TRUE;
    reference ← KeyColorData [p.keyColor];
    FOR i: ValueAndChroma IN [-(values + chromata) .. -chromata) DO vv[i] ← v[i] ENDLOOP;
    FOR i: ValueAndChroma IN (chromata .. chromata + values] DO vv[i] ← v[i] ENDLOOP;

```
vv[0] ← v[0];    lch ← Cylindrical [vv[0]];
FOR i: ValueAndChroma IN [-chromata .. chromata] DO
    vv[i] ← Cartesian [[lch.lStar, ChromaForHue [ChromaStep [i], lch, reference], lch.h]]
    ENDLOOP;
p.lock ← FALSE
END;   -- VaryChroma
```

RotateNegative: PUBLIC PROC [p: Palette] RETURNS [pp: Palette] ~ BEGIN
*The whole palette is rotated. Returns new element for undo.*
```
increment: REAL;
IF (p = NIL) THEN notInitialized;  IF p.lock THEN break;
pp ← CopyPalette [p];    p.lock ← pp.lock ← TRUE;
increment ← -hueStep / 2.0;
FOR i: Hue IN Hue DO
    FOR j: ValueAndChroma IN ValueAndChroma DO
        pp.colors[i][j] ← ChangeHue [p.colors[i][j], increment, j, KeyColorData [p.keyColor]]
        ENDLOOP;
    ENDLOOP;
p.lock ← pp.lock ← FALSE
END;   -- RotateNegative
```

RotatePositive: PUBLIC PROC [p: Palette] RETURNS [pp: Palette] ~ BEGIN
*The whole palette is rotated. Returns new element for undo.*
```
increment: REAL;
IF (p = NIL) THEN notInitialized;  IF p.lock THEN break;
pp ← CopyPalette [p];    p.lock ← pp.lock ← TRUE;
increment ← hueStep / 2.0;
FOR i: Hue IN Hue DO
    FOR j: ValueAndChroma IN ValueAndChroma DO
        pp.colors[i][j] ← ChangeHue [p.colors[i][j], increment, j, KeyColorData [p.keyColor]]
        ENDLOOP
    ENDLOOP;
p.lock ← pp.lock ← FALSE
END;   -- RotatePositive
```

MakeAnaloguousHarmony: PUBLIC PROC [p: Palette] RETURNS [pp: Palette] ~ BEGIN
*Returns new element for undo.*
```
IF (p = NIL) THEN notInitialized;  IF p.lock THEN break;
pp ← CopyPalette [p];    p.lock ← pp.lock ← TRUE;
FOR i: Hue IN analoguousHarmonies DO
    pp.colors[i][0] ← ChangeHue [pp.colors[centerHue][0], i*hueStep, 0, KeyColorData
        [p.keyColor]];
    ENDLOOP;
p.lock ← pp.lock ← FALSE
END;   -- MakeAnaloguousHarmony
```

MakeDirectComplement: PUBLIC PROC [p: Palette] RETURNS [pp: Palette] ~ BEGIN
*Returns new element for undo.*
```
IF (p = NIL) THEN notInitialized;  IF p.lock THEN break;
pp ← CopyPalette [p];    p.lock ← pp.lock ← TRUE;
```

```
pp.colors[directComplement][0] ← ChangeHue [pp.colors[centerHue][0], 180, 0,
    KeyColorData [p.keyColor]];
p.lock ← pp.lock ← FALSE
END; -- MakeDirectComplement MakeTriadicComplements: PUBLIC PROC [p: Palette] RETURNS [pp: Palette] ~ BEGIN
    Returns new element for undo.
    IF (p = NIL) THEN notInitialized; IF p.lock THEN break;
    pp ← CopyPalette [p];    p.lock ← pp.lock ← TRUE;
    pp.colors[leftTriadicComplement][0] ← ChangeHue [pp.colors[centerHue][0], +120, 0,
        KeyColorData [p.keyColor]];
    pp.colors[rightTriadicComplement][0] ← ChangeHue [pp.colors[centerHue][0], -120, 0,
        KeyColorData [p.keyColor]];
    p.lock ← pp.lock ← FALSE
END; -- MakeTriadicComplements DeleteAnaloguousHarmony: PUBLIC PROC [p: Palette] RETURNS [pp: Palette] ~ BEGIN
    IF (p = NIL) THEN notInitialized; IF p.lock THEN break;
    pp ← CopyPalette [p];    p.lock ← pp.lock ← TRUE;
    FOR i: Hue IN analoguousHarmonies DO
        IF (i = centerHue) THEN LOOP;
        FOR j: ValueAndChroma IN ValueAndChroma DO
            pp.colors[i][j] ← NIL
        ENDLOOP
    ENDLOOP;
    p.lock ← pp.lock ← FALSE
END; -- DeleteAnaloguousHarmony DeleteDirectComplement: PUBLIC PROC [p: Palette] RETURNS [pp: Palette] ~ BEGIN
    IF (p = NIL) THEN notInitialized; IF p.lock THEN break;
    pp ← CopyPalette [p];    p.lock ← pp.lock ← TRUE;
    FOR j: ValueAndChroma IN ValueAndChroma DO
        pp.colors[directComplement][j] ← NIL
    ENDLOOP;
    p.lock ← pp.lock ← FALSE
END; -- DeleteDirectComplement DeleteTriadicComplements: PUBLIC PROC [p: Palette] RETURNS [pp: Palette] ~ BEGIN
    IF (p = NIL) THEN notInitialized; IF p.lock THEN break;
    pp ← CopyPalette [p];    p.lock ← pp.lock ← TRUE;
    FOR j: ValueAndChroma IN ValueAndChroma DO
        pp.colors[leftTriadicComplement][j] ← NIL
    ENDLOOP;
    FOR j: ValueAndChroma IN ValueAndChroma DO
        pp.colors[rightTriadicComplement][j] ← NIL
    ENDLOOP;
    p.lock ← pp.lock ← FALSE
END; -- DeleteTriadicComplements RestrictValue: PUBLIC PROC [p: Palette, v: IsoHueVariation] RETURNS [vv: IsoHueVariation] ~
```

```
- BEGIN
IF (p = NIL) THEN notInitialized; IF p.lock THEN break;    p.lock ← TRUE;
FOR i: ValueAndChroma IN [-chromata .. chromata] DO
    IF (v[i] # NIL) THEN vv[i] ← NEW [CIELAB ← v[i]↑]
ENDLOOP;
p.lock ← FALSE
END;    -- RestrictValue
```

```
RestrictChroma: PUBLIC PROC [p: Palette, v: IsoHueVariation] RETURNS [vv: IsoHueVariation]
~ BEGIN
IF (p = NIL) THEN notInitialized; IF p.lock THEN break;    p.lock ← TRUE;
vv[centerHue] ← NEW [CIELAB ← v[centerHue]↑];
FOR i: ValueAndChroma IN [-(values + chromata) .. -chromata) DO
    IF (v[i] # NIL) THEN vv[i] ← NEW [CIELAB ← v[i]↑]
ENDLOOP;
FOR i: ValueAndChroma IN (chromata .. chromata + values] DO
    IF (v[i] # NIL) THEN vv[i] ← NEW [CIELAB ← v[i]↑]
ENDLOOP;
p.lock ← FALSE
END;    -- RestrictChroma
```

Key colors

```
refWhite: XYZ ← ImagerColorES.Tristimulus [[0.0, 0.2425, 0.2515]];
```

```
InitKeyColorData: PROC ~ BEGIN
    A default color and the Boynton basic colors.
    entry: KeyColor ← NEW [KeyColorRep];    whiteY: REAL;
    white: XYZ ← [0, 0, 0];    -- i.e. use value defined by standard
    BEGIN OPEN entry;
        name ← $default;        lab ← NEW [CIELAB ← [90.07729, -11.92, 76.26]];
        kch ← Cylindrical [lab];    pivot ← 70
    END;
    IF NOT keyColorTable.Store [entry.name, entry] THEN break;
``` whiteY ← 8.27;    -- Boynton's published luminance
whiteY ← 100.0;   -- The perfect reflecting diffuser illuminated by ... $D_{65}$ yields the "white"
    object color stimulus with $Y_{10}$ = 100 [W&S p. 513]

```
    entry ← NEW [KeyColorRep];
    BEGIN OPEN entry;        -- OSA -4 2 -8    $Y_{10}$ = 9.49
        name ← $red;    lab ← NEW [CIELAB];
        lab↑ ← ImagerColorES.CIELABFromXYZ [ImagerColorES.IlluminantChange
            [ImagerColorES.Tristimulus [[0.59/whiteY, 0.5132, 0.3159]]], refWhite];
        lab ← D65YxyToLab [9.72 / 75.76, 0.5341, 0.3191, white];
        kch ← Cylindrical [lab];    pivot ← 70
    END;
    IF NOT keyColorTable.Store [entry.name, entry] THEN break;

entry ← NEW [KeyColorRep];
    BEGIN OPEN entry;        -- OSA -3 5 5    $Y_{10}$ = 16.20
```

```
name ← Sgreen; lab ← NEW [CIELAB];
labt ← ImagerColorES.CIELABFromXYZ [ImagerColorES.IlluminantChange
    [ImagerColorES.Tristimulus [[1.63/whiteY, 0.3092, 0.5189]]], refWhite]:
lab ← D65YxyToLab [17.26 / 75.76, 0.2816, 0.5217, white]:
kch ← Cylindrical [lab];   pivot ← 70
END;
IF NOT keyColorTable.Store [entry.name, entry] THEN break;

entry ← NEW [KeyColorRep];
BEGIN OPEN entry;       – OSA 4 12 0     Y₁₀ = 64.45
    name ← Syellow; lab ← NEW [CIELAB];
    labt ← ImagerColorES.CIELABFromXYZ [ImagerColorES.IlluminantChange
        [ImagerColorES.Tristimulus [[5.58/whiteY, 0.4584, 0.4788]]], refWhite]:
    lab ← D65YxyToLab [67.72 / 75.76, 0.4423, 0.4962, white]:
    kch ← Cylindrical [lab];   pivot ← 70
END;
IF NOT keyColorTable.Store [entry.name, entry] THEN break;

entry ← NEW [KeyColorRep];
BEGIN OPEN entry;       – OSA -4 -4 4     Y₁₀ = 10.13
    name ← Sblue;  lab ← NEW [CIELAB];
    labt ← ImagerColorES.CIELABFromXYZ [ImagerColorES.IlluminantChange
        [ImagerColorES.Tristimulus [[0.59/whiteY, 0.1881, 0.2492]]], refWhite]:
    lab ← D65YxyToLab [8.11 / 75.76, 0.1819, 0.1965, white]:
    kch ← Cylindrical [lab];   pivot ← 70
END;
IF NOT keyColorTable.Store [entry.name, entry] THEN break;

entry ← NEW [KeyColorRep];
BEGIN OPEN entry;       – OSA 1 9 -7     Y₁₀ = 31.66
    name ← Sorange;    lab ← NEW [CIELAB];
    labt ← ImagerColorES.CIELABFromXYZ [ImagerColorES.IlluminantChange
        [ImagerColorES.Tristimulus [[1.85/whiteY, 0.5387, 0.4045]]], refWhite]:
    lab ← D65YxyToLab [33.72 / 75.76, 0.5314, 0.4161, white]:
    kch ← Cylindrical [lab];   pivot ← 70
END;
IF NOT keyColorTable.Store [entry.name, entry] THEN break;

entry ← NEW [KeyColorRep];
BEGIN OPEN entry;       – OSA -6 -4 -2   Y₁₀ = 4.85
    name ← Spurple;    lab ← NEW [CIELAB];
    labt ← ImagerColorES.CIELABFromXYZ [ImagerColorES.IlluminantChange
        [ImagerColorES.Tristimulus [[0.28/whiteY, 0.2656, 0.2044]]], refWhite]:
    lab ← D65YxyToLab [4.43 / 75.76, 0.2999, 0.2032, white]:
    kch ← Cylindrical [lab];   pivot ← 70
END;
IF NOT keyColorTable.Store [entry.name, entry] THEN break;

entry ← NEW [KeyColorRep];
BEGIN OPEN entry;       – OSA 3 -1 -5    Y₁₀ = 48.76
    name ← Spink;  lab ← NEW [CIELAB];
    labt ← ImagerColorES.CIELABFromXYZ [ImagerColorES.IlluminantChange
        [ImagerColorES.Tristimulus [[3.49/whiteY, 0.3524, 0.3010]]], refWhite]:
```

```
        lab ← D65YxyToLab [47.19 / 75.76, 0.3653, 0.3090, white];
        kch ← Cylindrical [lab];    pivot ← 70
        END;
    IF NOT keyColorTable.Store [entry.name, entry] THEN break;

entry ← NEW [KeyColorRep];
    BEGIN OPEN entry:       -- OSA -S 3 -3    Y₁₀ = 8.08
        name ← Sbrown; lab ← NEW [CIELAB];
        lab← ImagerColorES.CIELABFromXYZ [ImagerColorES.IlluminantChange
            [ImagerColorES.Tristimulus [[0.54/whiteY, 0.4604, 0.3791]]], refWhite];
        lab ← D65YxyToLab [8.42 / 75.76, 0.4749, 0.3982, white];
        kch ← Cylindrical [lab];    pivot ← 70
        END;
    IF NOT keyColorTable.Store [entry.name, entry] THEN break;

entry ← NEW [KeyColorRep];
    BEGIN OPEN entry:       -- PMS 285
        name ← Sxerox; lab ← NEW [CIELAB];
        lab← ImagerColorES.CIELABFromXYZ [ImagerColorES.IlluminantChange
                [ImagerColorES.Tristimulus [[12.11/78.13, 0.1981, 0.2045]]], refWhite];
        kch ← Cylindrical [lab];    pivot ← 70
        END;
    IF NOT keyColorTable.Store [entry.name, entry] THEN break;

entry ← NEW [KeyColorRep];
    BEGIN OPEN entry:       -- PMS 285 kept at D₆₅
        name ← Sxerox65;        lab ← NEW [CIELAB];
        lab← ImagerColorES.CIELABFromXYZ [ImagerColorES.Tristimulus [[12.11/78.13,
                0.1981, 0.2045]], refWhite];
        kch ← Cylindrical [lab];    pivot ← 70
        END;
    IF NOT keyColorTable.Store [entry.name, entry] THEN break
    END;    -- InitKeyColorData KeyColorData: PROC [keyColor: ATOM] RETURNS [KeyColor] ~ BEGIN
    Breaks if key is invalid.
    data: KeyColor ← NARROW [keyColorTable.Fetch[keyColor].val];
    IF (data = NIL) THEN break;        RETURN [data]
    END;    -- KeyColorData ValidKeyColor: PUBLIC PROC [keyColor: ATOM] RETURNS [BOOL] ~ BEGIN
    RETURN [keyColorTable.Fetch[keyColor].found]
    END;    -- ValidKeyColor
```

Main body

```
InitKeyColorData [];
IF published THEN InitGamut [] ELSE InitGamut40

END.    -- ProtoPaletteImpl
```

． rotopaletteCommander.mesa

*Copyright © 1989 by Xerox Corporation. All rights reserved.*
*Beretta:PARC:Xerox (8°923-4484) October 11. 1989 8:26:51 pm PDT*

*User interface for both ProtoPalette and DigitalPalette. MetaPalette still to be merged.*

DIRECTORY
   Rope USING [ROPE],
   ViewerClasses USING [Column, Viewer];

ProtopaletteCommander: CEDAR DEFINITIONS = BEGIN

Viewer: TYPE = ViewerClasses.Viewer;
   Column: TYPE = ViewerClasses.Column;   -- *{static, left, right, color}*

Main Interface

CreateViewer: PROC [name: Rope.ROPE, keyColor: ATOM, column: Column ← color] RETURNS
      [viewer: Viewer];
      *Initializes a viewer. The state information is in the data field of the viewer. If the key color is*
      *empty then a digital palette is assumed, otherwise a proto-palette.*

PutClientData: PROC [viewer: Viewer, type: ATOM, val: REF ← NIL];
      *Allows one to add client data to the palette associated to a particular viewer.*

GetClientData: PROC [viewer: Viewer, type: ATOM] RETURNS [REF]

END.   -- *ProtopaletteCommander*

*ProtopaletteCommanderImpl.mesa*
  *Copyright ⓒ 1989 by Xerox Corporation. All rights reserved.*
  *Written by Giordano Bruno Beretta, July 20, 1989 1:36:15 pm PDT*
  *Beretta:PARC:Xerox (8*923-4484) November 17, 1989 11:16:11 am PST*

*User interface.*

DIRECTORY
  Atom USING [EmptyAtom, MakeAtom, GetPName],
  ColorTool USING [GetRGBValue, NoColorToolViewer, SetRGBValue],
  Commander USING [CommandProc, Register],
  CommandTool USING [NextArgument],
  Convert USING [Error, RealFromRope],
  FinchSynthesizer USING [NB, SpeakText],
  FS USING [ComponentPositions, Error, ExpandName],
  FSExtras USING [GetWDir],
  Icons USING [NewIconFromFile],
  Imager USING [ClipRectangle, Context, DoSave, Font, MakeGray, MaskRectangleI,
            MaskRectangle, MaskFillTrajectory, Rectangle, ScaleT, SetColor, SetFont,
            SetPriorityImportant, SetStrokeEnd, SetStrokeJoint, SetStrokeWidth, SetXY,
            ShowRope, TranslateT, VEC],
  ImagerBackdoor USING [GetBounds],
  ImagerColorES USING [CIELABArgs, CIELABFromXYZ, Color, ColorOperator, ColorRep,
            ConstantColor, FindColor, NewColorOperatorCIELAB, OpConstantColor, RGB,
            RGBFromColor, XeroxRGBFromXYZ, XYZFromCIELAB,
            XYZFromXeroxRGB],
  ImagerColorFns USING [HSLFromRGB],
  ImagerColorMap USING [ApplyGamma, ApplyGammaInverse, GetGamma, NotifierRep,
            Register, UnRegister],
  ImagerDitherContext USING [MakeSpecialColor],
  ImagerFont USING [Find, Font, Scale, Substitution],
  ImagerInterpress USING [Close, Create, DeclareColorOperator, DeclareFont, DoPage, Ref],
  ImagerPath USING [LineTo, MoveTo, Trajectory],
  ImagerTransformation USING [Transformation],
  IO USING [DEL, ESC, int, NUL, PutFR, PutFRL, real, rope, STREAM],
  Menus USING [AppendMenuEntry, ClickProc, CopyEntry, CreateEntry, CreateMenu, Menu,
            MenuEntry],
  MessageWindow USING [Append, Blink, Clear],
  NamedColors USING [HSLToRope],
  PaletteIO USING [CL, DatabaseInfo, Error, ErrorDesc, ListDirectory, MarkEdited, PaletteInfo,
            ReadColorList, ReadProtoPalette, WriteColorList, WriteProtoPalette,
            UnmarkEdited],
  Process USING [CheckForAbort, Detach],
  Properties USING [GetProp, PropList, PutProp],
  ProtoPalette USING [analoguousHarmonies, Cartesian, centerHue, chromata, CIELAB,
            CopyPalette, CreatePalette, Cylindrical, DeleteAnaloguousHarmony,
            DeleteDirectComplement, DeleteTriadicComplements, directComplement,
            Harmony, Hue, IsoHueVariation, LAB, LCH, leftTriadicComplement,
            MakeAnaloguousHarmony, MakeDirectComplement, MakeTriadicComplements,
            Palette, RestrictChroma, RestrictValue, rightTriadicComplement, RotateNegative, · RotatePositive, ValidKeyColor, ValueAndChroma, values, VaryChroma, VaryValue],
ProtopaletteCommander,
Real USING [Fix, Float, Round],
Rope USING [Cat, Concat, Equal, FromProc, IsEmpty, ROPE, Substr],
RopeFile USING [Create],
RuntimeError USING [UnboundProcedure],
Terminal USING [BitmapState, ChannelValue, ColorCursorPresentation, ColorMode,
    ColorValue, Current, GetColorBitmapState, GetColor, GetColorMode, SetColor,
    SetColorCursorPresentation, Virtual],
TypeScript USING [BackSpace, ChangeLooks, CharsAvailable, Create, Destroy, Destroyed,
    GetChar, PutChar, PutRope, Reset, TypeIn],
TIPUser USING [InstantiateNewTIPTable, TIPScreenCoords],
ViewerClasses USING [DestroyProc, HScrollProc, MenuLine, NotifyProc, PaintHint, PaintProc,
    SaveProc, ScrollProc, Viewer, ViewerClass, ViewerClassRec, ViewerFlavor,
    ViewerRec],
ViewerForkers USING [ForkPaint],
ViewerOps USING [BlinkViewer, CreateViewer, EnumProc, EnumerateViewers,
    EstablishViewerPosition, OpenIcon, PaintViewer, RegisterViewerClass, SaveViewer,
    SetNewVersion],
WindowManager USING [colorDisplayOn];

ProtopaletteCommanderImpl: CEDAR PROGRAM

IMPORTS Atom, ColorTool, Commander, CommandTool, Convert, FinchSynthesizer, FS,
    FSExtras, Icons, Imager, ImagerBackdoor, ImagerColorES, ImagerColorFns,
    ImagerColorMap, ImagerDitherContext, ImagerFont, ImagerInterpress, ImagerPath,
    IO, Menus, MessageWindow, NamedColors, PaletteIO, ProtoPalette, Process,
    Properties, Real, Rope, RopeFile, RuntimeError, Terminal, TypeScript, TIPUser,
    ViewerForkers, ViewerOps, WindowManager EXPORTS ProtopaletteCommander ~ BEGIN OPEN ProtopaletteCommander, Real;

Imported types and variables analoguousHarmonies: TYPE ~ ProtoPalette.analoguousHarmonies;
    chromata: INTEGER ~ ProtoPalette.chromata;
    CIELAB: TYPE ~ ProtoPalette.CIELAB;    -- *RECORD [lStar, aStar, bStar: REAL]:*
    CL: TYPE ~ PaletteIO.CL;  -- *LIST OF LAB, Color List*
    Color: TYPE ~ ImagerColorES.Color;
    ColorRep: TYPE ~ ImagerColorES.ColorRep;
    Context: TYPE ~ Imager.Context;
    directComplement: INTEGER ~ ProtoPalette.directComplement;
    Font: TYPE ~ ImagerFont.Font;
    Harmony: TYPE ~ ProtoPalette.Harmony;
    Hue: TYPE ~ ProtoPalette.Hue;    -- *[-3 .. 4]:*
    IsoHueVariation: TYPE ~ ProtoPalette.IsoHueVariation;

```
LAB: TYPE ~ ProtoPalette.LAB;        -- REF CIELAB ← NIL;
LCH: TYPE ~ ProtoPalette.LCH;        -- RECORD [lStar, c, h: REAL];
leftTriadicComplement: INTEGER ~ ProtoPalette.leftTriadicComplement;
centerHue: INTEGER ~ ProtoPalette.centerHue;
MenuEntry: TYPE ~ Menus.MenuEntry;
Palette: TYPE ~ ProtoPalette.Palette;
OpConstantColor: TYPE ~ ImagerColorES.OpConstantColor;
Rectangle: TYPE ~ Imager.Rectangle;   -- RECORD [x, y, w, h: REAL]
rightTriadicComplement: INTEGER ~ ProtoPalette.rightTriadicComplement;
RGB: TYPE ~ ImagerColorES.RGB;
ROPE: TYPE ~ Rope.ROPE;
STREAM: TYPE ~ IO.STREAM;
Trajectory: TYPE ~ ImagerPath.Trajectory;
Transformation: TYPE ~ ImagerTransformation.Transformation;
ValueAndChroma: TYPE ~ ProtoPalette.ValueAndChroma;
values: INTEGER ~ ProtoPalette.values;
VEC: TYPE ~ Imager.VEC;
```

Local types and variables

```
fieldWidth: REAL ← 155.3452;    emptyAtom: ATOM ~ Atom.EmptyAtom[];
regularFace: Font ← ImagerFont.Find ["Xerox/PressFonts/Modern-MRR",
        substituteQuietly];
boldFace: Font ← ImagerFont.Find ["Xerox/PressFonts/Modern-BRR", substituteQuietly];
italicFace: Font ← ImagerFont.Find ["Xerox/PressFonts/Modern-MIR", substituteQuietly];

historySize: CARDINAL ~ 50;
History: TYPE ~ RECORD [index: CARDINAL, entry: ARRAY [0 .. historySize) OF Palette];
Wash: TYPE ~ REF WashRep;     washItems: INTEGER ~ 100;
WashRep: TYPE ~ ARRAY [0 .. washItems) OF LAB;
SelectionProto: TYPE ~ REF SelectionProtoRep ← NIL;        -- NIL means no selection
SelectionProtoRep: TYPE ~ RECORD [hue: Hue, variant: ValueAndChroma];
ChangeListProto: TYPE ~ LIST OF Hue;
SelectionDigital: TYPE ~ REF SelectionDigitalRep ← NIL;    -- NIL means no selection
SelectionDigitalRep: TYPE ~ RECORD [ch: ChannelValue, left, middle, right: LAB ← NIL];
ProtoPaletteData: TYPE ~ REF ProtoPaletteDataRep;
ProtoPaletteDataRep: TYPE ~ RECORD [palette: Palette, selection: SelectionProto];
DigitalPaletteData: TYPE ~ REF DigitalPaletteDataRep;
DigitalPaletteDataRep: TYPE ~ RECORD [palette: CL, wash: Wash ← NIL, washCache: ARRAY [0
        .. washItems) OF Color, selection: SelectionDigital ← NIL, power: CARDINAL ← 0];

State: TYPE ~ REF StateRec;
StateRec: TYPE ~ RECORD [
        paletteAndSel: REF ANY,  -- either ProtoPaletteData or DigitalPaletteData
        name, comment: ROPE,
        history: History, historyViewer: Viewer, lastInput: ROPE ← NIL,
        colors: ColorCache, subMap: ChannelValue,
        boundingBox, window: Rectangle,
        translation, titlePosition: VEC,   -- initialization imporant for caches
        scale, titleSize: REAL,
```

```
. bottomSB, rightSB: INTEGER ← 100,        -- caches: initialization important
  topSB, leftSB: INTEGER ← 0,              -- caches: initialization important
  resetPainting: BOOL ← TRUE,              -- initialization important for caches
  background: Color ← gray,
  abort: REF BOOL,
  verbose: BOOL ← FALSE,
  menuLine: MenuEntry,
  clientData: Properties.PropList ← NIL];
allStates: LIST OF State ← NIL;      stateCount: CARDINAL ← 0;
lastSelection: RECORD [r, g, b: ColorValue] ← [0, 0, 0];

break: SIGNAL -- CODE;              -- for debugging
trace: BOOL ← FALSE;       speak: BOOL ← FALSE;
lastViewer: Viewer;
lastWDir: ROPE ← NIL;       -- FSExtras.GetWDir does not always work Proto: PROC [state: State] RETURNS [ProtoPaletteData] ~ INLINE BEGIN
    RETURN [NARROW [state.paletteAndSel, ProtoPaletteData]]
    END;   -- Proto Digi: PROC [state: State] RETURNS [DigitalPaletteData] ~ INLINE BEGIN
    RETURN [NARROW [state.paletteAndSel, DigitalPaletteData]]
    END;   -- Digi
```

Interfaces

```
CreateViewer: PUBLIC PROC [name: ROPE, keyColor: ATOM, column: Column ← color]
        RETURNS [viewer: Viewer] ~ BEGIN
    Initializes a viewer. The state information is in the data field of the viewer. If the key color is
    empty then a digital palette is assumed, otherwise a proto-palette.
    state: State ~ NEW [StateRec];

FindNamedViewer: ViewerOps.EnumProc ~ BEGIN
        IF (v.class.flavor = wheel) OR (v.class.flavor = list) THEN BEGIN
            state: State ← NARROW [v.data];
            IF state.name.Equal [name] THEN BEGIN
                IF v.iconic THEN ViewerOps.OpenIcon [v]; ViewerOps.BlinkViewer [v];
                viewer ← v;     RETURN [FALSE]
                END
            END
        END;    -- FindNamedViewer FOR s: LIST OF State ← allStates, s.rest WHILE s # NIL DO
        IF (s.first # NIL) AND name.Equal [s.first.name] THEN
            {ViewerOps.EnumerateViewers [FindNamedViewer];        RETURN}
        ENDLOOP;

BEGIN OPEN state:
        subMap ← NewSubMap [];        abort ← NEW [BOOL ← FALSE];
        scale ← 1.0;     titleSize ← 10;
        IF (keyColor = emptyAtom) THEN BEGIN
```

```
              boundingBox ← [x: -5.0, y: -65.0, w: 105.0, h: 95.0];
              window ← [x: 0.0, y: -60.0, w: 90.0, h: 90.0];
              translation ← [x: 0.0, y: -50.0];      titlePosition ← [x: 20.0, y: 40.0]
              END
           ELSE BEGIN
              boundingBox ← [x: -115.0, y: -115.0, w: 230.0, h: 230.0];
              window ← [x: -110.0, y: -110.0, w: 220.0, h: 255.0];
              translation ← [x: 80.0, y: 110.0];     titlePosition ← [x: 20.0, y: 240.0]
              END
           END;
        state.name ← name;

allStates ← CONS [state, allStates];   stateCount ← stateCount.SUCC;
        viewer ← InitializeViewer [column, state, keyColor]
        END;   -- CreateViewer PutClientData: PUBLIC PROC [viewer: Viewer, type: ATOM, val: REF ← NIL] ~ BEGIN
     Allows one to add client data to the palette associated to a particular viewer.
     state: State ~ NARROW [viewer.data];
     state.clientData ← state.clientData.PutProp [type, val]
     END;   -- PutClientData GetClientData: PUBLIC PROC [viewer: Viewer, type: ATOM] RETURNS [REF] ~ BEGIN
     state: State ~ NARROW [viewer.data];
     RETURN [state.clientData.GetProp [type]]
     END;   -- GetClientData
```

Color Map & Global State

```
ColorValue: TYPE ~ Terminal.ColorValue;    -- [0..256)
ChannelValue: TYPE ~ Terminal.ChannelValue;    -- [0..256)
transferChannel: ChannelValue ~ 128;
hueOffset: INTEGER ~ Hue.FIRST;   lastHue: INTEGER ~ Hue.LAST;
vacOffset: INTEGER ~ ValueAndChroma.FIRST;    lastVac: INTEGER ~
         ValueAndChroma.LAST;
hues: INTEGER ~ lastHue - hueOffset + 1;  vacs: INTEGER ~ lastVac - vacOffset + 1;
nrEntries: INTEGER ~ hues * vacs;
SubMap: TYPE ~ RECORD [free: BOOL, firstEntry: ChannelValue];
subMaps: ChannelValue ~ 2;    subMapNIL: ChannelValue ~ 0;
subMap: ARRAY [0 .. subMaps] OF SubMap;
ColorCache: TYPE ~ ARRAY [0 .. nrEntries] OF Color ← ALL [NIL];
colorMapNotifier: ImagerColorMap.NotifierRep;

InitSubMaps: PROC ~ BEGIN
     To my knowledge, the reserved entries are 0 - 62: Imager, 128: ColorTool, 63 - 192:
     ColorGlue.
        gr: ImagerColorES.ConstantColor ~ Imager.MakeGray [0.7]; -- as in the OSA Color
             System
        subMap [0] ← [FALSE, 0];   -- no color map
        subMap [1] ← [TRUE, transferChannel + 1];  -- 129 .. 201
```

```
subMap[2] ← [TRUE, transferChannel - 1 - nrEntries]:        -- 55 - 127 constantGray ← gr;        grayCh ← 202;
gray ← ImagerDitherContext.MakeSpecialColor [ordinaryColor: gr, specialPixel: [grayCh,
        null], name: "gray"];
IF Is8bit [] THEN SetColorMapEntry [grayCh, gray];
colorMapNotifier ← [NoteDisplayChangedTo8Bit, NIL]
END;    -- InitSubMaps NewSubMap: PROC RETURNS [map: ChannelValue] ~ BEGIN
    FOR i: [1 .. subMaps] IN [1 .. subMaps] DO
        IF subMap[i].free THEN {subMap[i].free ← FALSE; RETURN [i]}
    ENDLOOP;
    RETURN [subMapNIL]
END;    -- NewSubMap DisposeSubMap: PROC [map: ChannelValue] ~ BEGIN
    IF (map # subMapNIL) THEN subMap[map].free ← TRUE;
END;    -- DisposeSubMap ColorMapIndex: PROC [firstEntry: ChannelValue, i: Hue, j: ValueAndChroma] RETURNS
        [ChannelValue] ~ BEGIN
    Computes a color map index ( = channel value) for a given color in the palette.
    RETURN [firstEntry + ((i - hueOffset) * vacs) + (j - vacOffset)]
END;    -- ColorMapIndex UnstructuredColorMapIndex: PROC [firstEntry: ChannelValue, i: CARDINAL] RETURNS
        [ChannelValue] ~ BEGIN
    Computes a color map index ( = channel value) for the i-th one-relative color in the color list.
    RETURN [firstEntry + i - 1]
END;    -- UnstructuredColorMapIndex Is8bit: PROC RETURNS [BOOL] ~ BEGIN
    Retuns true if the terminal is in 8 bit mode.
    t: Terminal.Virtual ~ Terminal.Current[];
    mode: Terminal.ColorMode ~ Terminal.GetColorMode [t];
    RETURN [(Terminal.GetColorBitmapState[t] # none) AND (NOT mode.full) AND
            (mode.bitsPerPixelChannelA = 8)]
END;    -- Is8bit MakeColor: PROC [firstEntry: ChannelValue, lab: LAB, i: Hue, j: ValueAndChroma] RETURNS
        [Color] ~ BEGIN
    If the terminal is in 8 bit mode it returns a special color pointing to the appropriate color map
    entry; otherwise it returns a constant color.
    RETURN [ImagerDitherContext.MakeSpecialColor [ordinaryColor: ColorFromLAB [lab],
            specialPixel: [ColorMapIndex [firstEntry, i, j], null], name: "ProtoPalette"]]
END;    -- MakeColor MakeUnstructuredColor: PROC [firstEntry: ChannelValue, lab: LAB, i: CARDINAL] RETURNS
        [Color] ~ BEGIN
    If the terminal is in 8 bit mode it returns a special color pointing to the appropriate color map
```

*entry, otherwise it returns a constant color.*
```
    RETURN [ImagerDitherContext.MakeSpecialColor [ordinaryColor: ColorFromLAB [lab].
            specialPixel: [UnstructuredColorMapIndex [firstEntry, i], null], name:
            "DigiPalette"]]
END:    -- MakeUnstructuredColor
```

```
SetColorMapEntry: PROC [ch: ChannelValue, color: Color] ~ BEGIN
```
*Assume terminal is in 8 bit mode.*
```
t: Terminal.Virtual ~ Terminal.Current[];
rgb: RGB ~ ImagerColorES.RGBFromColor [color];
gamma: REAL ~ ImagerColorMap.GetGamma [Terminal.Current[]];
Terminal.SetColor [vt: t, aChannelValue: ch, bChannelValue: 0,
            red: ImagerColorMap.ApplyGamma [rgb.R, gamma],
            green: ImagerColorMap.ApplyGamma [rgb.G, gamma],
            blue: ImagerColorMap.ApplyGamma [rgb.B, gamma]]
END:    -- SetColorMapEntry
```

```
NoteNewColor: PROC [state: State, i: Hue, j: ValueAndChroma] ~ BEGIN
```
*Updates the color cache and if there is one, the color map.*
```
color: LAB ~ Proto[state].palette.colors[i][j];
IF (color = NIL) THEN state.colors[ColorMapIndex[0, i, j]] ← NIL
ELSE BEGIN
    first: ChannelValue ~ subMap[state.subMap].firstEntry;
    state.colors[ColorMapIndex [0, i, j]] ← MakeColor [first, color, i, j];
    IF Is8bit [] THEN
        SetColorMapEntry [ColorMapIndex [first, i, j], state.colors[ColorMapIndex [0, i, j]]]
    END
END:    -- NoteNewColor
```

```
NoteNewUnstructuredColor: PROC [state: State, color: LAB, i: CARDINAL] ~ BEGIN
```
*Updates the color cache and if there is one, the color map.*
```
IF (i > nrEntries) THEN ERROR;    -- too many colors
IF (color = NIL) THEN state.colors[UnstructuredColorMapIndex[0, i]] ← NIL
ELSE BEGIN
    first: ChannelValue ~ subMap[state.subMap].firstEntry;
    state.colors[UnstructuredColorMapIndex[0, i]] ← MakeUnstructuredColor [first, color,
            i];
    IF Is8bit [] THEN
        SetColorMapEntry [UnstructuredColorMapIndex [first, i],
            state.colors[UnstructuredColorMapIndex [0, i]]]
    END
END:    -- NoteNewUnstructuredColor
```

```
NoteDisplayChangedTo8Bit: PUBLIC PROC [data: REF] ~ BEGIN
```
*If the display is changed from full color to 8 bit color, the color map must be set.*
```
IF (NOT Is8bit []) THEN RETURN;
SetColorMapEntry [grayCh, gray];
FOR sl: LIST OF State ← allStates, sl.rest WHILE sl # NIL DO
    IF (sl.first.subMap = subMapNIL) THEN LOOP;
    FOR i: ChannelValue IN [1 .. nrEntries] DO
```

```
    IF (sl.firstcolors[i] = NIL) THEN LOOP;
    SetColorMapEntry [subMap[sl.firstsubMap].firstEntry + i, sl.firstcolors[i]]
    ENDLOOP
  ENDLOOP
END;    -- NoteDisplayChangedTo8Bit TransferSelectedColor: PROC [state: State, rgb: RGB] ~ BEGIN
  puts selected color in transfer channel for color tool.
  t: Terminal.Virtual ~ Terminal.Current[];
  gamma: REAL ~ ImagerColorMap.GetGamma [t];
  ColorTool.SetRGBValue [[rgb.R, rgb.G, rgb.B] ! RuntimeError.UnboundProcedure =>
        CONTINUE; ColorTool.NoColorToolViewer => CONTINUE];
  IF Is8bit [] THEN BEGIN
    r, g, b: ColorValue ← 0;   ch: ChannelValue;        selection: BOOL;
    WITH state.paletteAndSel SELECT FROM
      proto: ProtoPaletteData => BEGIN
        selection ← proto.selection # NIL;
        IF selection THEN ch ← ColorMapIndex [state.subMap, proto.selection.hue,
            proto.selection.variant]
        END;
      digi: DigitalPaletteData => BEGIN
        selection ← (digi.selection # NIL) AND (digi.selection.middle # NIL);
        IF selection THEN ch ← UnstructuredColorMapIndex [state.subMap,
            digi.selection.ch]
        END;
      ENDCASE => ERROR;
    IF selection THEN [r, g, b] ← Terminal.GetColor [t, ch, 0];
    lastSelection ← [r, g, b];   Terminal.SetColor [t, transferChannel, 0, r, g, b]
    END
  ELSE lastSelection ← [ImagerColorMap.ApplyGamma [rgb.R, gamma],
        ImagerColorMap.ApplyGamma [rgb.G, gamma],
        ImagerColorMap.ApplyGamma [rgb.B, gamma]]
  END;    -- TransferSelectedColor GetLastSelection: PROC RETURNS [LAB] ~ BEGIN
  gamma: REAL ~ ImagerColorMap.GetGamma [Terminal.Current[]];
  r, g, b: ColorValue;      rgb: RGB;           badLuck: BOOL ← FALSE;
  [rgb.R, rgb.G, rgb.B] ← ColorTool.GetRGBValue [! RuntimeError.UnboundProcedure,
        ColorTool.NoColorToolViewer => {badLuck ← TRUE; CONTINUE}];
  IF badLuck THEN BEGIN
    IF Is8bit [] THEN [r, g, b] ← Terminal.GetColor [Terminal.Current[], transferChannel, 0]
    ELSE [r, g, b] ← lastSelection;
    rgb.R ← ImagerColorMap.ApplyGammaInverse [r, gamma];
    rgb.G ← ImagerColorMap.ApplyGammaInverse [g, gamma];
    rgb.B ← ImagerColorMap.ApplyGammaInverse [b, gamma]
    END;
  RETURN [NEW [CIELAB ← ImagerColorES.CIELABFromXYZ
        [ImagerColorES.XYZFromXeroxRGB [rgb], [0,0,0]]]]
  END;    -- GetLastSelection
```

Colours and Palettes

```
black: Color ~ ImagerColorES.FindColor ["Xerox/Solid/Black"];
white: Color ~ ImagerColorES.FindColor ["Xerox/Solid/White"];
gray, constantGray: Color;       grayCh: ChannelValue;
cyan: Color ~ ImagerColorES.FindColor ["Xerox/Solid/Cyan"];
magenta: Color ~ ImagerColorES.FindColor ["Xerox/Solid/Magenta"];
yellow: Color ~ ImagerColorES.FindColor ["Xerox/Solid/Yellow"];
red: Color ~ ImagerColorES.FindColor ["Xerox/Solid/Red"];
green: Color ~ ImagerColorES.FindColor ["Xerox/Solid/Green"];
blue: Color ~ ImagerColorES.FindColor ["Xerox/Solid/Blue"];
labLinear: ImagerColorES.ColorOperator ~ ImagerColorES.NewColorOperatorCIELAB
         [NIL];

ColorFromLAB: PROC [lab: LAB] RETURNS [OpConstantColor] ~ BEGIN
    args: ImagerColorES.CIELABArgs;
    l: REAL ~ MAX [MIN [lab.lStar, 100], 0];
    a: REAL ~ MAX [MIN [lab.aStar, 500], -500];
    b: REAL ~ MAX [MIN [lab.bStar, 200], -200];
    color: OpConstantColor ~ NEW [ColorRep.constantOp[3]];
    color.colorOperator ← labLinear;
    args ← NARROW [color.colorOperator.data, ImagerColorES.CIELABArgs];
    color.pixel[0] ← Round [args.sblack + (args.swhite-args.sblack) * l / 100.0];
    color.pixel[1] ← Round [args.sneutral + args.srange * a];
    color.pixel[2] ← Round [args.sneutral + args.srange * b];
    RETURN [color]
    END;   -- ColorFromLAB ToRGB: PROC [color: LAB] RETURNS [RGB] ~ BEGIN
    rgb: RGB;
    IF (color = NIL) THEN RETURN [[0, 0, 0]];
    rgb ← ImagerColorES.XeroxRGBFromXYZ
            [ImagerColorES.XYZFromCIELAB[color,[0,0,0]]];
    rgb ← [MAX [MIN [rgb.R, 1], 0], MAX [MIN [rgb.G, 1], 0], MAX [MIN [rgb.B, 1], 0]];
    RETURN [rgb]
    END;   -- ToRGB ColorName: PROC [color: LAB] RETURNS [ROPE] ~ BEGIN
    Insulates the naming procerdure, which might change in the near future.
    rgb: RGB ~ ToRGB [color];
    IF (color = NIL) THEN RETURN [NIL];
    RETURN [NamedColors.HSLToRope [ImagerColorFns.HSLFromRGB [[rgb.R, rgb.G,
        rgb.B]]]]
    END;   -- ColorName LoadPalette: PROC [state: State, keyColor: ATOM] ~ BEGIN
    Tries to load from the database; if not successful, creates a new palette.
    errorDesc: PaletteIO.ErrorDesc;
    BEGIN
        ENABLE {PaletteIO.Error => {errorDesc ← error; GOTO fileError}};
```

```
IF (keyColor = emptyAtom) THEN BEGIN
    state.paletteAndSel ← NEW [DigitalPaletteDataRep];
    Digi[state].palette ← PaletteIO.ReadColorList [state.name];
    IF (Digi[state].palette = NIL) THEN BEGIN
        PutHistoryLine [state, "Could not find palette. Creating empty palette."];
        Digi[state].palette ← NIL; state.comment ← NIL
        END
    END
ELSE BEGIN
    state.paletteAndSel ← NEW [ProtoPaletteDataRep];
    Proto[state].palette ← PaletteIO.ReadProtoPalette [state.name];
    IF (Proto[state].palette = NIL) THEN BEGIN
        PutHistoryLine [state, "Could not find palette. Creating new palette."];
        Proto[state].palette ← ProtoPalette.CreatePalette [keyColor];
        state.comment ← NIL
        END
    ELSE IF (Proto[state].palette.keyColor # keyColor) THEN PutHistoryLine [state,
            "Warning: palette based on different key color than expected."];
    END;
WITH state.paletteAndSel SELECT FROM
    pp: ProtoPaletteData => FOR i: Hue IN Hue DO
        FOR j: ValueAndChroma IN ValueAndChroma DO NoteNewColor [state, i, j]
            ENDLOOP;
        ENDLOOP;
    dp: DigitalPaletteData => FOR l: CL ← dp.palette, l.rest WHILE l # NIL DO
        dp.power ← dp.power.SUCC;  NoteNewUnstructuredColor [state, l.first,
            dp.power]
        ENDLOOP;
    ENDCASE => NULL;      -- no palette
    state.comment ← PaletteIO.PaletteInfo [state.name].comment;
    PutHistoryLine [state, state.comment];
    EXITS
        fileError => BEGIN
            msg: ROPE;
            SELECT errorDesc.code FROM
                $noDB => msg ← "Could not find database.";
                $wrongFromat => msg ← "There already is a palette with such a name but it
                        is in a different format";
                ENDCASE => msg ← errorDesc.explanation;
            PutHistoryLine [state, msg]
            END
    END
END;    -- LoadPalette LABToLCHRope: PROC [lab: LAB] RETURNS [ROPE] ~ BEGIN
    lch: LCH ~ ProtoPalette.Cylindrical [lab];
    RETURN [IO.PutFR ["[L: %5.1f, C: %5.1f, H: %5.1f]", IO.real [lch.lStar], IO.real [lch.c], IO.real
        [lch.h]]]
    END;    -- LABToLCHRope
```

```
AddToList: PROC [color: LAB, list: DigitalPaletteData, state: State] RETURNS
    [DigitalPaletteData] ~ BEGIN
    Adds a new color to the color list and updates the color map cache
    IF (list.palette = NIL) THEN BEGIN
        list.palette ← LIST [color]; NoteNewUnstructuredColor [state, color, 1]
        END
    ELSE IF (list.palette.first = NIL) THEN BEGIN
        We want to be efficient if the user tries to find a new color to add to a palette. We do not
            try to insert it in the middle of the palette because it would make it harder for the user to
            find the new color.
        list.palette.first ← color; NoteNewUnstructuredColor [state, color, 1]
        END
    ELSE BEGIN
        list.palette ← CONS [color, list.palette];
        Because we add the new color in front of the palette, we have to rebuild the colors.
        list.power ← 0;   -- we use it as an index
        FOR l: CL ← list.pale``l.rest WHILE l # NIL DO
            list.power ← list.power.succ; NoteNewUnstructuredColor [state, l.first, list.power]
            ENDLOOP;
        list.selection.ch ← list.power
        END;
    RETURN [list]
    END;   -- AddToList
```

Graphics

Speed or beauty? Originally I drew the interior of the swatches and then drew a border around the one that is selected. Everything looked nice, but on the Dorado the routine for drawing a trajectory was slow. To make a flashy video tape, Michael Plass and Maureen Stone proposed to draw the polygons twice in two different sizes to make the border. Unfortunately, due to rounding the border no longer has a uniform thickness. When machines will be sufficiently fast, I propose to revert to the old method of explicitly drawing a border.

```
swatchSize: REAL ~ 10;   -- in mm
swatchSize2: REAL ~ swatchSize * 1.2;   -- in mm
outlineSize: REAL ~ 1.1;   -- in mm
rectangle: Rectangle ~ [-swatchSize/2.0, -swatchSize/2.0, swatchSize, swatchSize];
hexagon: ARRAY [0 .. 5] OF VEC ~ [[swatchSize2/2.0, 0], [swatchSize2/4.0, swatchSize2/2.0],
    [-swatchSize2/4.0, swatchSize2/2.0], [-swatchSize2/2.0, 0], [-swatchSize2/4.0,
    -swatchSize2/2.0], [swatchSize2/4.0, -swatchSize2/2.0]];
octagon: ARRAY [0 .. 7] OF VEC ~ [[0.5*swatchSize2, 0], [swatchSize2/3.0, swatchSize2/3.0], [0,
    swatchSize2/2.0], [-swatchSize2/3.0, swatchSize2/3.0], [-swatchSize2/2.0, 0],
    [-swatchSize2/3.0, -swatchSize2/3.0], [0, -swatchSize2/2.0], [swatchSize2/3.0,
    -swatchSize2/3.0]];
keyColorPos: ARRAY Hue OF VEC;
variantColorPos: ARRAY ValueAndChroma OF VEC;

swatchSize: REAL ← 10;   swatchSize2: REAL ← swatchSize * 1.2;   -- in mm
outlineSize: REAL ~ 1.1;   overhang: REAL ~ 5;   -- in mm
```

```
potoSwatch, potoSwatch2, exoSwatch, exoSwatch2: REAL;
potoRectangle, exoRectangle: Rectangle;
potoHexagon, exoHexagon: ARRAY [0 .. 5] OF VEC;
potOctagon, exOctagon: ARRAY [0 .. 7] OF VEC ;
keyColorPos: ARRAY Hue OF VEC;
variantColorPos: ARRAY ValueAndChroma OF VEC;
video: BOOL ← FALSE;    videoMag: REAL ← 4.0;

InitSwatches: PROC [] ~ BEGIN
    IF video THEN swatchSize ← swatchSize * videoMag;
    swatchSize2 ← swatchSize * 1.2;
    potoSwatch ← swatchSize - overhang / 2.0;
    potoSwatch2 ← swatchSize2 - overhang / 2.0;
    exoSwatch ← potoSwatch + overhang / 2.0;
    exoSwatch2 ← potoSwatch2 + overhang / 2.0;
    potoRectangle ← [-potoSwatch/2.0, -potoSwatch/2.0, potoSwatch, potoSwatch];
    exoRectangle ← [-exoSwatch/2.0, -exoSwatch/2.0, exoSwatch, exoSwatch];
    potoHexagon← [[potoSwatch2/2.0, 0], [potoSwatch2/4.0, potoSwatch2/2.0],
            [-potoSwatch2/4.0, potoSwatch2/2.0], [-potoSwatch2/2.0, 0], [-potoSwatch2/4.0,
            -potoSwatch2/2.0], [potoSwatch2/4.0, -potoSwatch2/2.0]];
    exoHexagon ← [[exoSwatch2/2.0, 0], [exoSwatch2/4.0, exoSwatch2/2.0], [-exoSwatch2/4.0,
            exoSwatch2/2.0], [-exoSwatch2/2.0, 0], [-exoSwatch2/4.0, -exoSwatch2/2.0],
            [exoSwatch2/4.0, -exoSwatch2/2.0]];
    potOctagon ← [[0.5*potoSwatch2, 0], [potoSwatch2/3.0, potoSwatch2/3.0], [0,
            potoSwatch2/2.0], [-potoSwatch2/3.0, potoSwatch2/3.0], [-potoSwatch2/2.0, 0],
            [-potoSwatch2/3.0, -potoSwatch2/3.0], [0, -potoSwatch2/2.0], [potoSwatch2/3.0,
            -potoSwatch2/3.0]];
    exOctagon ← [[0.5*exoSwatch2, 0], [exoSwatch2/3.0, exoSwatch2/3.0], [0, exoSwatch2/2.0],
            [-exoSwatch2/3.0, exoSwatch2/3.0], [-exoSwatch2/2.0, 0], [-exoSwatch2/3.0,
            -exoSwatch2/3.0], [0, -exoSwatch2/2.0], [exoSwatch2/3.0, -exoSwatch2/3.0]];
    IF video THEN swatchSize ← swatchSize / videoMag
    END;    -- DrawRectangle DrawRectangle: PROC [context: Context, p: VEC, interior: BOOL] ~ BEGIN
    IF interior THEN context.MaskRectangle [[p.x + potoRectangle.x, p.y + potoRectangle.y,
            potoRectangle.w, potoRectangle.h]]
    ELSE context.MaskRectangle [[p.x + exoRectangle.x, p.y + exoRectangle.y, exoRectangle.w,
            exoRectangle.h]]
    END;    -- DrawRectangle DrawHexagon: PROC [context: Context, p: VEC, interior: BOOL] ~ BEGIN
    t: Trajectory;
    IF interior THEN BEGIN
        t ← ImagerPath.MoveTo [[p.x + potoHexagon[0].x, p.y + potoHexagon[0].y]];
        FOR i: [0 .. 5] IN [1 .. 5] DO
            t ← t.LineTo [[p.x + potoHexagon[i].x, p.y + potoHexagon[i].y]]
            ENDLOOP
        END
    ELSE BEGIN
        t ← ImagerPath.MoveTo [[p.x + exoHexagon[0].x, p.y + exoHexagon[0].y]];
```

```
        FOR i: [0 .. 5] IN [1 .. 5] DO
            t ← t.LineTo [[p.x + exoHexagon[i].x, p.y + exoHexagon[i].y]]
            ENDLOOP
        END;
    context.MaskFillTrajectory [t]
    END;   -- DrawHexagon DrawOctagon: PROC [context: Context, p: VEC, interior: BOOL] ~ BEGIN
    t: Trajectory;
    IF interior THEN BEGIN
        t ← ImagerPath.MoveTo [[p.x + potOctagon[0].x, p.y + potOctagon[0].y]];
        FOR i: [0 .. 7] IN [1 .. 7] DO
            t ← t.LineTo [[p.x + potOctagon[i].x, p.y + potOctagon[i].y]]
            ENDLOOP
        END
    ELSE BEGIN
        t ← ImagerPath.MoveTo [[p.x + exOctagon[0].x, p.y + exOctagon[0].y]];
        FOR i: [0 .. 7] IN [1 .. 7] DO
            t ← t.LineTo [[p.x + exOctagon[i].x, p.y + exOctagon[i].y]]
            ENDLOOP
        END;
    context.MaskFillTrajectory [t]
    END;   -- DrawOctagon
```

*DrawRectangle: PROC [context: Context, p: VEC] ~ BEGIN*
 *context.MaskRectangle [[p.x + rectangle.x, p.y + rectangle.y, rectangle.w, rectangle.h]]*
 *END;   -- DrawRectangle*

*DrawHexagon: PROC [context: Context, p: VEC] ~ BEGIN*
 *t: Trajectory ← ImagerPath.MoveTo [[p.x + hexagon[0].x, p.y + hexagon[0].y]];*
 *FOR i: [0 .. 5] IN [1 .. 5] DO*
  *t ← t.LineTo [[p.x + hexagon[i].x, p.y + hexagon[i].y]]*
  *ENDLOOP;*
 *context.MaskFillTrajectory [t]*
 *END;   -- DrawHexagon*

*DrawOctagon: PROC [context: Context, p: VEC] ~ BEGIN*
 *t: Trajectory ← ImagerPath.MoveTo [[p.x + octagon[0].x, p.y + octagon[0].y]];*
 *FOR i: [0 .. 7] IN [1 .. 7] DO*
  *t ← t.LineTo [[p.x + octagon[i].x, p.y + octagon[i].y]]*
  *ENDLOOP;*
 *context.MaskFillTrajectory [t]*
 *END;   -- DrawOctagon*

*OutlineRectangle: PROC [context: Context, p: VEC] ~ BEGIN*
 *Outlines a rectangle in the opponent color.*
 *r: Rectangle ~ [p.x + rectangle.x, p.y + rectangle.y, rectangle.w, rectangle.h];*
 *context.MaskVector [[r.x, r.y], [r.x + r.w, r.y]];         -- South*
 *context.MaskVector [[r.x + r.w, r.y], [r.x + r.w, r.y + r.h]];   -- East*
 *context.MaskVector [[r.x + r.w, r.y + r.h], [r.x, r.y + r.h]];   -- North*

```
contextMaskVector[[r.x, r.y+r.h], [r.x, r.y]]          -- West
END;    -- OutlineRectangle OutlineHexagon: PROC [context: Context, p: VEC] ~ BEGIN
    t: Trajectory ← ImagerPath.MoveTo [[p.x + hexagon[0].x, p.y + hexagon[0].y]];
    FOR i: [0..5] IN [1..5] DO
        t ← t.LineTo [[p.x + hexagon[i].x, p.y + hexagon[i].y]]
    ENDLOOP;
    context.MaskStrokeTrajectory [t, TRUE]
END;    -- OutlineHexagon OutlineOctagon: PROC [context: Context, p: VEC] ~ BEGIN
    t: Trajectory ← ImagerPath.MoveTo [[p.x + octagon[0].x, p.y + octagon[0].y]];
    FOR i: [0..7] IN [1..7] DO
        t ← t.LineTo [[p.x + octagon[i].x, p.y + octagon[i].y]]
    ENDLOOP;
    context.MaskStrokeTrajectory [t, TRUE]
END;    -- OutlineOctagon DrawPalette: PROC [context: Context, state: State, ip: BOOL ← FALSE, changes: REF ANY] ~
    BEGIN
    palette: Palette ← Proto[state].palette;          selected: LAB;

OutlineColor: PROC [h: Hue, i: ValueAndChroma, interior: Color] RETURNS [Color] ~
        BEGIN
        IF (Proto[state].selection = NIL) OR (Proto[state].selection.hue # h) OR
            (Proto[state].selection.variant # i) THEN RETURN [interior]
        ELSE BEGIN
            outlineColor: Color;
            IF (ABS[selected.aStar] < 10) AND (ABS[selected.bStar] < 10) THEN outlineColor ←
                white
            ELSE BEGIN
                lch: LCH ← ProtoPalette.Cylindrical [selected];
                lch.lStar ← 100 - lch.lStar;           lch.h ← lch.h + 180;
                IF lch.h > 360 THEN lch.h ← lch.h - 360;
                outlineColor ← ColorFromLAB [ProtoPalette.Cartesian[lch]]
            END;
            RETURN [outlineColor]
            END
        END;    -- OutlineColor DrawHueVariants: PROC [h: Hue, p: VEC] ~ BEGIN
        variant: IsoHueVariation ← palette.colors[h];
        color: Color;     pos: VEC;
        FOR i: ValueAndChroma IN [-(values + chromata)..0) DO
            IF (variant[i] = NIL) THEN color ← IF ip THEN constantGray ELSE state.background
            ELSE color ← IF ip THEN ColorFromLAB [variant[i]] ELSE
                state.colors[ColorMapIndex[0, h, i]];
            pos ← [p.x + variantColorPos[i].x, p.y + variantColorPos[i].y];
            context.SetColor [OutlineColor [h, i, color]]; DrawRectangle [context, pos, FALSE];
            context.SetColor [color]; DrawRectangle [context, pos, TRUE]
```

```
ENDLOOP;
IF (variant[0] = NIL) THEN color ← IF ip THEN constantGray ELSE state.background
ELSE color ← IF ip THEN ColorFromLAB [variant[0]] ELSE state.colors[ColorMapIndex[0,
        h, 0]];
contextSetColor [OutlineColor [h, 0, color]];
IF (h = centerHue) THEN DrawOctagon [context, p, FALSE] ELSE DrawHexagon
        [context, p, FALSE];
contextSetColor [color];
IF (h = centerHue) THEN DrawOctagon [context, p, TRUE] ELSE DrawHexagon [context,
        p, TRUE];
FOR i: ValueAndChroma IN (0 .. chromata + values] DO
    IF (variant[i] = NIL) THEN color ← IF ip THEN constantGray ELSE state.background
    ELSE color ← IF ip THEN ColorFromLAB [variant[i]] ELSE
            state.colors[ColorMapIndex[0, h, i]];
    pos ← [p.x + variantColorPos[i].x, p.y + variantColorPos[i].y];
    contextSetColor [OutlineColor [h, i, color]]; DrawRectangle [context, pos, FALSE];
    contextSetColor [color];   DrawRectangle [context, pos, TRUE]
    ENDLOOP
END;   -- DrawHueVariants DrawVideoHueVariants: PROC [h: Hue, p: VEC] ~ BEGIN
    color: Color;
    IF (palette.colors[h][0] = NIL) THEN color ← IF ip THEN constantGray ELSE
            state.background
    ELSE color ← IF ip THEN ColorFromLAB [palette.colors[h][0]] ELSE
            state.colors[ColorMapIndex[0, h, 0]];
    contextSetColor [color];
    IF (h = centerHue) THEN DrawOctagon [context, p, FALSE] ELSE DrawHexagon
            [context, p, FALSE]
    END;   -- DrawVideoHueVariants IF (palette = NIL) THEN ImportantMessage ["No palette"]
ELSE BEGIN
    IF video THEN FOR i: Hue IN Hue DO DrawVideoHueVariants [i, keyColorPos[i]]
            ENDLOOP
    ELSE BEGIN
        IF (Proto[state].selection # NIL) THEN selected ←
                palette.colors[Proto[state].selection.hue][Proto[state].selection.variant];
        WITH changes SELECT FROM
            c: ChangeListProto => FOR l: ChangeListProto ← c, l.rest WHILE l # NIL DO
                DrawHueVariants [l.first, keyColorPos[l.first]]
                ENDLOOP;
            ENDCASE => FOR i: Hue IN Hue DO DrawHueVariants [i, keyColorPos[i]]
                ENDLOOP
        END
    END
END;   -- DrawPalette Measures are in millimeters. Numbers are such that hitting is fast.
    washHeight: INT ~ 30;   washWidth: INT ~ 90;
    washItemWidth: REAL ~ Float [washWidth] / Float [washItems];
``` rectHeight: INT ~ 20;    rectWidth, rectSpacing: INT ~ 10;

DrawList: PROC [context: Context, state: State, ip: BOOL ← FALSE, changes: REF ANY] ~ BEGIN
    count: CARDINAL ← 0;    palette: CL ~ Digi[state].palette;
    IF (palette = NIL) THEN ImportantMessage ["No palette"]
    ELSE BEGIN
        rect: Rectangle ← [x: 0, y: 0, w: washItemWidth, h: washHeight];
        column, line: CARDINAL; hint: ATOM;
        WITH changes SELECT FROM
            a: ATOM => hint ← a;
            ENDCASE => hint ← NIL;
        IF (hint = $none) THEN RETURN;
        IF (hint # $wash) THEN FOR colors: CL ← palette.colors.rest WHILE colors # NIL DO
            column ← count MOD 5; line ← 1 + (count / 5); count ← count.succ;
            IF (colors.first = NIL) THEN context.SetColor [IF ip THEN constantGray ELSE
                    state.background]
            ELSE BEGIN
                IF ip THEN context.SetColor [ColorFromLAB [colors.first]]
                ELSE context.SetColor [state.colors[UnstructuredColorMapIndex[0, count]]]
            END;
            context.MaskRectangle| [x: column * (rectWidth + rectSpacing),
                    y: - line * (rectHeight + rectSpacing),
                    w: rectWidth, h: rectHeight]
        ENDLOOP;
        IF (Digi[state].wash # NIL) AND (hint # $list) THEN FOR i: INT IN [0 .. washItems) DO
            context.SetColor [Digi[state].washCache[i]];
            rect.x ← i * rect.w;    context.MaskRectangle [rect]
        ENDLOOP
    END
END;    -- DrawList DrawEverything: PROC [context: Context, state: State, ip, clear: BOOL ← FALSE, changes: REF
        ANY ← NIL] ~ BEGIN
    Draws everything. Window for scroll bars is not updated in the case of Interpress production.
    context.ScaleT [state.scale];         context.TranslateT [state.translation];
    IF NOT ip THEN state.window ← ImagerBackdoor.GetBounds [context]
    ELSE BEGIN
        context.SetPriorityImportant [TRUE];
        state.window ← state.boundingBox;        context.TranslateT [[10, 45]]
    END;
    context.ClipRectangle [state.window];
    context.SetStrokeJoint [bevel];     context.SetStrokeEnd [square];
    context.SetStrokeWidth [outlineSize];
    IF state.abort↑ THEN {state.abort↑ ← FALSE;        RETURN};
    IF clear THEN BEGIN
        context.SetColor [IF ip THEN constantGray ELSE state.background];
            context.MaskRectangle [state.window]
    END;
    IF ip THEN BEGIN
        context.SetFont [ImagerFontScale [boldFace, state.titleSize]];

```
        contextSetXY [state.titlePosition]; contextSetColor [black];
        contextShowRope [state.name]
        END;
    WITH state.paletteAndSel SELECT FROM
        proto: ProtoPaletteData => DrawPalette [context, state. ip, changes];
        digi: DigitalPaletteData => DrawList [context, state. ip, changes];
        ENDCASE => NULL
    END;    -- DrawEverything
```

Viewers & Class Set-up

```
ViewerFlavor: TYPE ~ ViewerClasses.ViewerFlavor;
wheel: ViewerFlavor ~ SColorWheel;
list: ViewerFlavor ~ SColorList;
MenuLine: TYPE ~ ViewerClasses.MenuLine;

InitializeViewerClass: PROC ~ BEGIN
    Initializes and registers the viewer classes.
    wheelClass: ViewerClasses.ViewerClass ← NEW [ViewerClasses.ViewerClassRec];
    listClass: ViewerClasses.ViewerClass ← NEW [ViewerClasses.ViewerClassRec];
    wheelMenu: Menus.Menu ~ Menus.CreateMenu [2];
    listMenu: Menus.Menu ~ Menus.CreateMenu [1];
    abortButton: MenuEntry ~ Menus.CreateEntry [name: "Abort",
            proc: Abort,
            guarded: TRUE];
    zoomButton: MenuEntry ~ Menus.CreateEntry [name: "Zoom",
            proc: ZoomIn,
            documentation: "Left: in, right: out"];
    saveButton: MenuEntry ~ Menus.CreateEntry [name: "Save",
            proc: Housekeeping,
            clientData: Ssave,
            documentation: "Save palette"];
    listDirButton: MenuEntry ~ Menus.CreateEntry [name: "List",
            proc: Housekeeping,
            clientData: Slist,
            guarded: FALSE,
            documentation: "List palettes"];
    renameButton: MenuEntry ~ Menus.CreateEntry [name: "Rename",
            proc: Housekeeping,
            clientData: Srename,
            guarded: FALSE,
            documentation: "Rename palette"];
    resetButton: MenuEntry ~ Menus.CreateEntry [name: "Reset",
            proc: Housekeeping,
            clientData: Sreset,
            guarded: TRUE,
            documentation: "Reset transformation, SHIFT: Undo all edits"];
    historyButton: MenuEntry ~ Menus.CreateEntry [name: "History",
            proc: Housekeeping,
```

```
            documentation: "Left: undo, right: redo",
            clientData: Shistory];
ipButton: MenuEntry ~ Menus.CreateEntry [name: "Hardcopy",
        proc: DoInterpress,
        documentation: "Generate Interpress master of palette",
        guarded: FALSE];
verboseButton: MenuEntry ~ Menus.CreateEntry [name: "Verbose",
        proc: Housekeeping,
        clientData: Sverbose,
        documentation: "Explain commands",
        guarded: FALSE];
explainButton: MenuEntry ~ Menus.CreateEntry [name: "Explain",
        proc: Housekeeping,
        clientData: Sexplain,
        documentation: "Explain tool use",
        guarded: FALSE];
grabButton: MenuEntry ~ Menus.CreateEntry [name: "Grab",
        proc: Housekeeping,
        clientData: SgrabSelection,
        documentation: "Grab last color selection",
        guarded: FALSE];
harmoniesButton: MenuEntry ~ Menus.CreateEntry [name: "Harmonies",
        proc: AddHue,
        clientData: Sharmonies,
        documentation: "Add analoguous harmonies"];
complementButton: MenuEntry ~ Menus.CreateEntry [name: "Complement(s)",
        proc: AddHue,
        clientData: Scomplement,
        documentation: "Left: triadic, middle: direct complement"];
rotationButton: MenuEntry ~ Menus.CreateEntry [name: "ShiftHue",
        proc: RotateHue,
        documentation: "Rotate Palette colder left or right"];
valueButton: MenuEntry ~ Menus.CreateEntry [name: "MoreValues",
        proc: Values,
        documentation: "Add values to selected color"];
chromaButton: MenuEntry ~ Menus.CreateEntry [name: "MoreChromata",
        proc: Chromata,
        documentation: "Add chromata to selected color"];

Menus.AppendMenuEntry [wheelMenu, abortButton, 0];
Menus.AppendMenuEntry [wheelMenu, resetButton, 0];
Menus.AppendMenuEntry [wheelMenu, zoomButton, 0];
Menus.AppendMenuEntry [wheelMenu, renameButton, 0];
Menus.AppendMenuEntry [wheelMenu, listDirButton, 0];
Menus.AppendMenuEntry [wheelMenu, saveButton, 0];
Menus.AppendMenuEntry [wheelMenu, historyButton, 0];
Menus.AppendMenuEntry [wheelMenu, ipButton, 0];
Menus.AppendMenuEntry [wheelMenu, verboseButton, 0];
Menus.AppendMenuEntry [wheelMenu, explainButton, 0];
Menus.AppendMenuEntry [wheelMenu, rotationButton, 1];
Menus.AppendMenuEntry [wheelMenu, harmoniesButton, 1];
```

Menus.AppendMenuEntry [wheelMenu, complementButton, 1];
Menus.AppendMenuEntry [wheelMenu, valueButton, 1];
Menus.AppendMenuEntry [wheelMenu, chromaButton, 1];

Menus.AppendMenuEntry [listMenu, Menus.CopyEntry [abortButton], 0];
Menus.AppendMenuEntry [listMenu, Menus.CopyEntry [resetButton], 0];
Menus.AppendMenuEntry [listMenu, Menus.CopyEntry [zoomButton], 0];
Menus.AppendMenuEntry [listMenu, Menus.CopyEntry [renameButton], 0];
Menus.AppendMenuEntry [listMenu, Menus.CopyEntry [listDirButton], 0];
Menus.AppendMenuEntry [listMenu, Menus.CopyEntry [saveButton], 0];
Menus.AppendMenuEntry [listMenu, Menus.CopyEntry [ipButton], 0];
Menus.AppendMenuEntry [listMenu, Menus.CopyEntry [verboseButton], 0];
Menus.AppendMenuEntry [listMenu, Menus.CopyEntry [grabButton], 0];

BEGIN OPEN wheelClass:
    flavor ← wheel;
    notify ← UserEvent;
    paint ← Paint;
    destroy ← Destroy;
    save ← SaveViewer;
    scroll ← VerticalTranslation;
    hscroll ← HorizontalTranslation;
    menu ← wheelMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 5];
    cursor ← crossHairsCircle
    END;

BEGIN OPEN listClass:
    flavor ← list;
    notify ← UserEvent;
    paint ← Paint;
    destroy ← Destroy;
    save ← SaveViewer;
    scroll ← VerticalTranslation;
    hscroll ← HorizontalTranslation;
    menu ← listMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 6];
    cursor ← crossHairsCircle
    END;

ViewerOps.RegisterViewerClass [wheel, wheelClass];
ViewerOps.RegisterViewerClass [list, listClass]
END; -- InitializeViewerClass InitializeViewer: PROC [colonna: Column, state: State, keyColor: ATOM] RETURNS [viewer: Viewer] ~ BEGIN
*If the key color is empty then a digital palette is assumed, otherwise a proto-palette.*
paletteViewer, historyViewer: ViewerClasses.ViewerRec;
class: ATOM ~ IF (keyColor = emptyAtom) THEN list ELSE wheel;

IF (colonna = color) AND (NOT WindowManager.colorDisplayOn) THEN colonna ← left;

```
BEGIN OPEN paletteViewer:
    label ← state.name;
    name ← IF (keyColor = emptyAtom) THEN state.name ELSE state.name.Cat [" (",
        Atom.GetPName [keyColor], ")"];
    column ← colonna;      iconic ← TRUE;
    scrollable ← TRUE;     hscrollable ← TRUE;      guardDestroy ← TRUE;
    data ← state
    END;
BEGIN OPEN historyViewer:
    label ← paletteViewer.label.Concat [" history"];
    name ← paletteViewer.name.Concat [" history"];
    column ← right; iconic ← TRUE;  data ← state
    END;
viewer ← ViewerOps.CreateViewer [class, paletteViewer];
ViewerOps.EstablishViewerPosition [viewer, viewer.wx, viewer.wy, viewer.ww, viewer.wh];
[] ← Terminal.SetColorCursorPresentation [Terminal.Current[], onesAreBlack];
state.historyViewer ← TypeScript.Create [historyViewer, FALSE];
ViewerOps.PaintViewer [state.historyViewer, all];
LoadPalette [state, keyColor];     paletteViewer.file ← PaletteIO.DatabaseInfo[].name
END;    -- InitializeViewer PutHistoryLine: PROC [state: State, rope: ROPE, italicize: BOOL ← FALSE] ~ BEGIN
    ENABLE {TypeScriptDestroyed => GOTO again};
    IF italicize THEN TypeScript.ChangeLooks [state.historyViewer, 'i];
    TypeScript.PutRope [state.historyViewer, rope.Concat["\n"]];
    IF italicize THEN TypeScript.ChangeLooks [state.historyViewer, ' ];
    EXITS
        again => BEGIN
            historyViewer: ViewerClasses.ViewerRec;
            BEGIN OPEN historyViewer;
                label ← name ← state.name.Concat [" history"];
                column ← right; iconic ← FALSE;  data ← state
                END;
            state.historyViewer ← TypeScript.Create [historyViewer, TRUE];
            IF italicize THEN TypeScript.ChangeLooks [state.historyViewer, 'i];
            TypeScript.PutRope [state.historyViewer, rope];
            IF italicize THEN TypeScript.ChangeLooks [state.historyViewer, ' ]
            END;
    END;    -- PutHistoryLine GetHistoryLine: PROC [state: State, prompt: ROPE] RETURNS [ROPE] ~ BEGIN
    Returns NIL if the input is aborted.
    ENABLE {TypeScriptDestroyed => GOTO abort};
    buffer: ARRAY (0 .. 200) OF CHAR; index, length: [0 .. 200] ← 0;
    ch: CHAR ← IO.NUL;
    Fetch: PROC RETURNS [CHAR] ~ {index ← index.SUCC; RETURN [buffer[index]]};
    WHILE TypeScript.CharsAvailable[state.historyViewer] DO
        [] ← TypeScript.GetChar [state.historyViewer]
        ENDLOOP;
    PutHistoryLine [state, prompt];
```

```
WHILE (ch # '\n) DO
    IF state.abort THEN GOTO abort;
    ch ← TypeScript.GetChar [state.historyViewer];
    SELECT ch FROM
        IO.ESC => BEGIN
            TypeScript.TypeIn [state.historyViewer, state.lastInput];
            TypeScript.PutRope [state.historyViewer, state.lastInput]
            END;
        IO.DEL => GOTO abort;
        '\b => IF index > 0 THEN BEGIN
            index ← index.PRED;
            TypeScript.BackSpace [state.historyViewer]
            END;
        ENDCASE => BEGIN
            index ← index.SUCC;      IF index >= 200 THEN LOOP;      buffer[index] ← ch;
            TypeScript.PutChar [state.historyViewer, ch]
            END;
    ENDLOOP;
    IF (index = 0) THEN RETURN [NIL];
    length ← index - 1;      index ← 0;
    state.lastInput ← Rope.FromProc [length, Fetch, length];      RETURN [state.lastInput];
EXITS
    abort => BEGIN
        WHILE TypeScript.CharsAvailable[state.historyViewer] DO
            [] ← TypeScript.GetChar [state.historyViewer]
            ENDLOOP;
        RETURN [NIL]
        END
END;    -- GetHistoryLine SetNewVersion: PROC [v: Viewer, state: State] ~ BEGIN
    Marks a palette edited both in the viewer and in the database.
    errorDesc: PaletteIO.ErrorDesc;
    BEGIN
    ENABLE BEGIN
        PaletteIO.Error => {errorDesc ← [error.code, error.explanation]; GOTO
            databaseError};
        END;
    ViewerOps.SetNewVersion [v];      PaletteIO.MarkEdited [state.name];
    EXITS
        databaseError => IF errorDesc.code # $noSuchPalette THEN BEGIN
            PutHistoryLine [state, errorDesc.explanation];
            ImportantMessage [errorDesc.explanation]
            END
    END
END;    -- SetNewVersion ResetNewVersion: PROC [v: Viewer] ~ BEGIN
    Does t'  : converse operation of ViewerOps.SetNewVersion. Assume the class is correct.
    v.newVersion ← FALSE;
```

ViewerForkers.ForkPaint [viewer: v, hint: caption, clearClient: FALSE, tryShortCuts: TRUE]
END;  -- ResetNewVersion UserEvent: ViewerClasses.NotifyProc ~ BEGIN
    [self: Viewer, input: LIST OF REF ANY]
    *Input events from the class TIPTable. Mouse events get passed whenever the mouse is over the
    viewer, keyboard events get passed if the viewer owns the input focus (see the InputFocus
    interface). N.B. Called at Process.priorityForeground!*
    state: State ~ NARROW [self.data];
    xy: TIPUser.TIPScreenCoords ~ NARROW [input.first];
    pos: VEC;          invScale: REAL ← 1.0 / state.scale;
    cmd: ATOM ~ NARROW [input.rest.first];
    pos.x ← xy.mouseX * invScale;     pos.y ← xy.mouseY * invScale;
    pos.x ← pos.x - state.translation.x;  pos.y ← pos.y - state.translation.y;
    SELECT self.class.flavor FROM
        wheel => TRUSTED {Process.Detach [FORK Hit [state, self, pos, (cmd = $delete) OR
                (cmd = $deleteLeft) OR (cmd = $deleteRight)]]};
        list => TRUSTED {Process.Detach [FORK HitList [state, self, pos, cmd]]};
        ENDCASE => NULL
    END;  -- UserEvent

Menu Commands

Paint: ViewerClasses.PaintProc ~ BEGIN
    [self: Viewer, context: Imager.Context, whatChanged: REF, clear: BOOL] RETURNS [quit:
    BOOL ← FALSE]
    *Called by the window manager when the client should repaint the data on the screen. The
    context is clipped to the client screen area. whatChanged is just passed from the call to
    ViewerOps.PaintViewer, but will be NIL when the window manager requires a full repaint
    after moving a viewer on the screen. clear is a hint that the client background is white, so
    that the client can paint on the black bits if it so chooses. See comments for paintRectangles
    bit in the viewer class. Return quit~TRUE to stop without painting children.*
    state: State ~ NARROW [self.data];

state.abort↑ ← FALSE;
    state.window ← ImagerBackdoor.GetBounds [context];       -- needed for scroll bars IF state.abort↑ THEN {state.abort↑ ← FALSE; RETURN [TRUE]};
    Process.CheckForAbort;

context.SetPriorityImportant [FALSE];
    IF state.resetPainting THEN BEGIN
        *Important for initialization of caches.*
        state.translation ← [-state.boundingBox.x, -state.boundingBox.y];
        state.scale ← MIN [(state.window.w / state.boundingBox.w), (state.window.h /
                state.boundingBox.h)];
        state.resetPainting ← FALSE;     clear ← TRUE
        END;
    DrawEverything [context: context, state: state, ip: FALSE, clear: clear, changes:
            whatChanged]
    END;  -- Paint SaveViewer: ViewerClasses.SaveProc ~ BEGIN
    PROC [self: Viewer, force: BOOL ← FALSE]:
        Requests client to save data structures on the disk. force should only be true when called
        from the emergency backup code on error recovery and requests that the client consider
        overriding monitors or locks that might otherwise prevent saving the data.
    errorDesc: PaletteIO.ErrorDesc;   state: State ← NARROW [self.data, State];
    BEGIN
        ENABLE {PaletteIO.Error => {errorDesc ← error; GOTO fileError}};
        IF NOT self.newVersion THEN RETURN;
        IF trace THEN PutHistoryLine [state, "Saving ..."];
        IF force THEN WITH state.paletteAndSel SELECT FROM
            proto: ProtoPaletteData => proto.palette.lock ← FALSE;
            ENDCASE => NULL;
        WITH state.paletteAndSel SELECT FROM
            proto: ProtoPaletteData => PaletteIO.WriteProtoPalette [state.name,
                    state.comment, proto.palette];
            digi: DigitalPaletteData => PaletteIO.WriteColorList [state.name, state.comment,
                    digi.palette];
            ENDCASE => NULL;
        ResetNewVersion [self];
        EXITS
            fileError => {PutHistoryLine [NARROW [self.data, State], errorDesc.explanation];
                    SetNewVersion [self, state]; ImportantMessage [errorDesc.explanation]}
        END
    END;   -- SaveViewer VerticalTranslation: ViewerClasses.ScrollProc ~ BEGIN
    [self: Viewer, op: ScrollOp, amount: INTEGER, shift, control: BOOL ← FALSE] RETURNS [top,
        bottom: INTEGER ← LAST[INTEGER]]
    ScrollOp = {query, up, down, thumb}
    Client scrolling and scrolling feedback. If op is 'query' the client should return the *percentage*
    of the scrollable document at the top and bottom of the screen, or default if unknown. If op
    is 'up' or 'down' then amount is *number of pixels* to glitch. If op is 'thumb' then amount is
    *percentage* into document to scroll. The shift and control information reflects the state of the
    shift and control keys during the up, down, and thumb ops and may be interpreted by the
    client as desired.
    state: State ~ NARROW [self.data];
    viewport: [self.cx, cy, cw, ch]

BEGIN OPEN state;
        SELECT op FROM
            query => BEGIN
                A query is performed each time the mouse is on a scroll bar, hence this must be
                faster than a bullet.
                top ← MAX [topSB, 0];    bottom ← MIN [bottomSB, 100];    RETURN
                END;
            up => IF (window.y < boundingBox.y + boundingBox.h) THEN BEGIN
                translation.y ← translation.y + (Float [amount] / Float [self.ch]) * window.h;
                Note that the cached values may exceed the displayed values to avoid referring to the
                window when it is moved back into the viewer.
                Note also that topSB and bottomSB cannot be computed trivially from amount.

*because amount is in pixels while I have to return a percentage.*
```
        topSB ← Fix [(window.y + window.h) / (boundingBox.y + boundingBox.h) *
           100.0];
        bottomSB ← topSB + Fix [(window.h / boundingBox.h) * 100.0]
      END;
    down => IF (window.y + window.h > boundingBox.y) THEN BEGIN
        translation.y ← translation.y - (Float [amount] / Float [self.ch]) * window.h;
        topSB ← Fix [(window.y + window.h) / (boundingBox.y + boundingBox.h) *
           100.0];
        bottomSB ← topSB + Fix [(window.h / boundingBox.h) * 100.0]
      END;
    thumb => SELECT TRUE FROM
      shift AND control => ImportantMessage ["Invalid command"];
      shift => BEGIN    -- scale up (window becomes relatively smaller)
          The scroll bar is viewed as a scale from 1 to 10.
        factor: REAL ← 10.0 / Float [amount + 10];        scale ← scale * factor;
        topSB ← Fix [((window.y + window.h) * factor) / (boundingBox.y +
             boundingBox.h) * 100.0];
        bottomSB ← topSB + Fix [(window.h / boundingBox.h) * 100.0]
      END;
      control => BEGIN       -- reset painting
        resetPainting ← TRUE;
        bottomSB ← rightSB ← 100;        topSB ← leftSB ← 0
      END;
      ENDCASE => BEGIN       -- thumb
        sign: INTEGER ← IF (boundingBox.h > window.h) THEN -1 ELSE 1;
        translation.y ← sign * (boundingBox.y + (boundingBox.h * Float [amount] /
             100.0));
        topSB ← amount;
        bottomSB ← amount + Fix [(window.h / boundingBox.h) * 100.0]
      END;
    ENDCASE => ERROR;

Trace [amount];

ViewerOps.PaintViewer [viewer: self, hint: client];   -- op <> query
  Note that the cached values may exceed the diplayed values to avoid referring to the
    window when it is moved back into the viewer.
    top ← MAX [topSB, 0];     bottom ← MIN [bottomSB, 100]
  END    -- OPEN state
  END;   -- VerticalTranslation HorizontalTranslation: ViewerClasses.HScrollProc ~ BEGIN
  [self: Viewer, op: HScrollOp, amount: INTEGER, shift, control: BOOL ← FALSE] RETURNS
  [left, right: INTEGER ← LAST[INTEGER]]
  HScrollOp = {query, left, right, thumb}
  Client scrolling and scrolling feedback. If op is 'query' the client should return the percentage
    of the scrollable document at the top and bottom of the screen, or default if unknown. If op
    is 'up' or 'down' then amount is number of pixels to glitch. If op is 'thumb' then amount is
    percentage into document to scroll. The shift and control information reflects the state of the
    shift and control keys during the up, down, and thumb ops and may be interpreted by the
```

*client as desired.* state: State ← NARROW [self.data];

BEGIN OPEN state;
  SELECT op FROM
    query => BEGIN
      *A query is performed each time the mouse is on a scroll bar, hence this must be faster than a bullet.*
      right ← MIN [rightSB, 100];      left ← MAX [leftSB, 0];    RETURN
      END;
    right => IF (window.x < boundingBox.x + boundingBox.w) THEN BEGIN
      translation.x ← translation.x + (Float [amount] / Float [self.cw]) * window.w;
      leftSB ← Fix [(window.x + window.w) / (boundingBox.x + boundingBox.w) * 100.0];
      rightSB ← leftSB + Fix [(window.w / boundingBox.w) * 100.0]
      END;
    left => IF (window.x + window.w > boundingBox.x) THEN BEGIN
      translation.x ← translation.x - (Float [amount] / Float [self.cw]) * window.w;
      leftSB ← Fix [(window.x + window.w) / (boundingBox.x + boundingBox.w) * 100.0];
      rightSB ← leftSB + Fix [(window.w / boundingBox.w) * 100.0]
      END;
    thumb => SELECT TRUE FROM
      shift AND control => ImportantMessage ["Invalid command"];
      shift => BEGIN   -- *scale down (window becomes relatively larger)*
        factor: REAL ← Float [amount + 10] / 10.0;      scale ← scale * factor;
        leftSB ← Fix [((window.x + window.w) * factor) / (boundingBox.x + boundingBox.w) * 100.0];
        rightSB ← leftSB + Fix [(window.w / boundingBox.w) * 100.0]
        END;
      control => BEGIN     -- *reset painting*
        resetPainting ← TRUE;   bottomSB ← rightSB ← 100;     topSB ← leftSB ← 0
        END;
      ENDCASE => BEGIN    -- *thumb*
        sign: INTEGER ← IF (boundingBox.w > window.w) THEN -1 ELSE 1;
        translation.x ← sign * (boundingBox.x + (boundingBox.w * Float [amount] / 100.0));
        leftSB ← amount;
        rightSB ← amount + Fix [(window.w / boundingBox.w) * 100.0]
        END;
    ENDCASE => ERROR;

*Trace [amount]:*

ViewerOps.PaintViewer [viewer: self, hint: client];   -- *op <> query*
  *Note that the cached values may exceed the diplayed values to avoid referring to the window when it is moved back into the viewer.*
    right ← MIN [rightSB, 100];     left ← MAX [leftSB, 0]
END   -- *OPEN state*
END;  -- *HorizontalTranslation*

```
Destroy: ViewerClasses.DestroyProc ~ BEGIN
    Called when the viewer has been destroyed for some reason.
    state: State ← NARROW [self.data];
    PaletteIO.UnmarkEdited [state.name ! PaletteIO.Error => {CONTINUE}];
    TypeScript.Destroy [state.historyViewer];   DisposeSubMap [state.subMap];
    FOR sl: LIST OF State ← allStates, sl.rest WHILE sl # NIL DO
        IF (sl.first = state) THEN sl.first ← NIL
    ENDLOOP;
    state ← NIL;    lastViewer ← NIL;    stateCount ← stateCount.PRED;
    IF (stateCount = 0) THEN ImagerColorMap.UnRegister [colorMapNotifier]
    END; -- Destroy Abort: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
        state: State ~ NARROW [NARROW [parent, Viewer].data];
        IF state.verbose THEN PutHistoryLine [state, "Abort painting"];
        state.abort↑ ← TRUE
        END
    END; -- Abort ZoomIn: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
        v: Viewer ~ NARROW [parent];
        state: State ~ NARROW [v.data];
        IF state.verbose THEN PutHistoryLine [state, "Red: zoom in by 50%; blue: zoom out"];
        BEGIN OPEN state;
            scale ← SELECT mouseButton FROM
                    red => scale * 1.5,
                    blue => scale / 1.5,
                    ENDCASE => IF control THEN scale * 3 ELSE scale;
            IF control AND (mouseButton = yellow) THEN
                translation ← [translation.x - swatchSize * 3, translation.y - swatchSize * 3.2];
            ViewerOps.PaintViewer [viewer: v, hint: client];
            topSB ← Fix [(window.y + window.h) / (boundingBox.y + boundingBox.h) *
                    100.0];
            bottomSB ← topSB + Fix [(window.h / boundingBox.h) * 100.0];
            leftSB ← Fix [(window.x + window.w) / (boundingBox.x + boundingBox.w) *
                    100.0];
            rightSB ← leftSB + Fix [(window.w / boundingBox.w) * 100.0]
            END
        END
    END; -- ZoomIn
```

Housekeeping: Menus.ClickProc ~ BEGIN
    [parent: REF ANY, clientData: REF ANY ← NIL, mouseButton: MouseButton ← red, shift,
    control: BOOL ← FALSE].  MouseButton: TYPE = {red, yellow, blue}
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];
        WITH clientData SELECT FROM
            a: ATOM => SELECT a FROM
                $save => ViewerOps.SaveViewer [v];
                $verbose => state.verbose ← speak ← NOT state.verbose;
                $explain => BEGIN
                    lang: ROPE ~ SELECT mouseButton FROM red => "English", yellow =>
                            "Italiano", ENDCASE => "Deutsch";
                    name: ROPE ~ lastWDir.Cat ["ProtoPalette-", lang, ".Tioga"];
                    IF state.verbose THEN PutHistoryLine [state, "Red: explain tool: yellow:
                            spiega l'utensile; blue: erkläre das Werkzeug"];
                    PutHistory.... [state, RopeFile.Create [name: name, raw: FALSE ! FS.Error
                            => {PutHistoryLine [state, Rope.Concat ["Could not find help file
                            ", name]]; CONTINUE}], TRUE];
                    PutHistoryLine [state, state.comment];
                    PutHistoryLine [state, "Red/left: English: yellow/middle: Italiano:
                            blue/right: Deutsch"]
                    END;
                $history => BEGIN
                    changed: BOOL ← TRUE;   c: CARDINAL ← state.history.index;
                    protoPalette: Palette;      -- immutably referenced by state.paletteAndSel
                    WITH state.paletteAndSel SELECT FROM
                        proto: ProtoPaletteData => protoPalette ← proto.palette;
                        ENDCASE => RETURN;
                    IF state.verbose THEN PutHistoryLine [state, "Red/left: redo: blue/right:
                            undo"];
                    SELECT mouseButton FROM
                        red => c ← c.SUCC MOD (historySize-1);
                        blue => c ← IF (c > 0) THEN c.PRED ELSE historySize-1;
                        ENDCASE => RETURN;
                    IF (state.history.entry[c] # NIL) THEN state.history.index ← c ELSE changed ←
                            FALSE;
                    protoPalette ← state.history.entry[state.history.index];
                    IF changed THEN ViewerOps.PaintViewer [viewer: v, hint: client]
                    END;
                $rename => BEGIN
                    oldName: ROPE ~ state.name;
                    ImportantMessage ["Type new name in typescript"];
                    IF state.verbose THEN PutHistoryLine [state, "Rename the current palette. An
                            old palette with the same name is not overwritten"];
                    IF state.historyViewer.iconic THEN ViewerOps.OpenIcon
                            [state.historyViewer];
                    v.label ← state.name ← GetHistoryLine [state, "Type new name"];
                    IF (PaletteIO.PaletteInfo [state.name].type # NIL) THEN BEGIN

*This is not correct. It should be possible to overwrite a deleted palette.*
PutHistoryLine [state, "A palette with such a name already exists."];
ImportantMessage ["A palette with such a name already exists."]
       END
    ELSE BEGIN
       IF NOT state.name.Equal [oldName] THEN BEGIN
          PaletteIO.UnmarkEdited [oldName];
          v.name ← IF (v.class.flavor = list) THEN state.name ELSE
                 state.name.Cat [" (", Atom.GetPName
                 [Proto[state].palette.keyColor], ")"];
          state.historyViewer.name ← v.name.Concat [" history"];
          state.historyViewer.label ← v.label.Concat [" history"];
          ViewerOps.PaintViewer [viewer: v, hint: caption, clearClient: FALSE];
          ViewerOps.PaintViewer [viewer: state.historyViewer, hint: caption]
          END
       END
    END;
$reset => BEGIN
    state.resetPainting ← TRUE;
    state.bottomSB ← state.rightSB ← 100;    state.topSB ← state.leftSB ← 0;
    IF state.verbose THEN PutHistoryLine [state, "Reset viewing transformation;
          SHIFT: reset palette"];
    IF shift THEN BEGIN
       key: ATOM ~ IF (v.class.flavor = wheel) THEN
             Proto[state].palette.keyColor ELSE emptyAtom;
       LoadPalette [state, key];   ResetNewVersion [v];
       v.file ← PaletteIO.DatabaseInfo[].name;   TypeScriptReset
             [state.historyViewer]
       END;
    ViewerOps.PaintViewer [viewer: v, hint: client]
    END;
$list => BEGIN
    dbname: ROPE;  palettes: INT;
    char: CHAR ~ IF (v.class.flavor = wheel) THEN 'P ELSE 'D;
    IF state.verbose THEN PutHistoryLine [state, "List palettes editable with this
          tool. SHIFT: list all palettes in database"];
    [dbname, palettes] ← PaletteIO.DatabaseInfo [];
    PutHistoryLine [state, PaletteIO.ListDirectory [IF shift THEN ' ELSE char]];
    PutHistoryLine [state, IO.PutFR ["Database: %g, palettes: %g", IO.rope
          [dbname], IO.int [palettes]]]
    END;
$grabSelection => BEGIN
    IF (v.class.flavor = list) THEN BEGIN
       state.paletteAndSel ← AddToList [GetLastSelection[], Digi[state], state];
       SetNewVersion [v, state];
       ViewerOps.PaintViewer [viewer: v, hint: client, clearClient: FALSE,
             whatChanged: $list]
       END
    END;
ENDCASE => ImportantMessage ["Implementation error (wrong housekeeping

```
                        class)"];
            ENDCASE => ImportantMessage ["Implementation error (wrong clientData type)"]
        END
    END;    -- Housekeeping RotateHue: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
                viewer type)"]
    ELSE BEGIN
        v: Viewer ~ NARROW [parent];     state: State ~ NARROW [v.data];
        data: ProtoPaletteData ← Proto[state];
        SetNewVersion [v, state];
        state.history.index ← state.history.index.SUCC MOD historySize;
        state.history.entry[state.history.index] ← data.palette;
        IF state.verbose THEN PutHistoryLine [state, "Red: rotate positive; blue: rotate
                    negative"];
        SELECT mouseButton FROM
            red => data.palette ← ProtoPalette.RotatePositive [data.palette];
            yellow => NULL;
            blue => data.palette ← ProtoPalette.RotateNegative [data.palette];
            ENDCASE => NULL;
        FOR i: Hue IN Hue DO
            FOR j: ValueAndChroma IN ValueAndChroma DO NoteNewColor [state, i, j]
                ENDLOOP;
        ENDLOOP;
        PutHistoryLine [state, Rope.Concat ["New center color: ", LABToLCHRope
                [data.palette.colors[centerHue][0]]]];
        IF (NOT Is8bit []) THEN ViewerOps.PaintViewer [viewer: v, hint: client, clearClient:
                    FALSE]
        END
    END;    -- RotateHue AddHue: Menus.ClickProc ~ BEGIN
    [parent: REF ANY, clientData: REF ANY ← NIL, mouseButton: MouseButton ← red, shift,
        control: BOOL ← FALSE], MouseButton: TYPE = {red, yellow, blue}
    IF NOT ISTYPE [parent, Viewer] THEN ImportantMessage ["Implementation error (wrong
                viewer type)"]
    ELSE BEGIN
        v: Viewer ~ NARROW [parent];     state: State ~ NARROW [v.data];
        data: ProtoPaletteData ← Proto[state];      changes: ChangeListProto ← NIL;
        WITH clientData SELECT FROM
            a: ATOM => BEGIN
                SetNewVersion [v, state];
                state.history.index ← state.history.index.SUCC MOD historySize;
                state.history.entry[state.history.index] ← data.palette;
                SELECT a FROM
                    Sharmonies => BEGIN
                        IF state.verbose THEN PutHistoryLine [state, "Add an analoguous
```

```
            harmony: CTRL: delete it"];
        data.palette ← IF control THEN ProtoPalette.DeleteAnaloguousHarmony
                [data.palette]
            ELSE ProtoPalette.MakeAnaloguousHarmony [data.palette];
        FOR i: analoguousHarmonies IN analoguousHarmonies DO
            NoteNewColor [state, i, 0]
            ENDLOOP;
        changes ← LIST [-2, -1, 0, 1, 2];
        END;
    $complement => BEGIN
        IF state.verbose THEN PutHistoryLine [state, "Red: add direct
                complement: yellow: add triadic complements; CTRL: delete
                them\n\t(The complements are mutually exclusive)"];
        changes ← LIST [directComplement, leftTriadicComplement,
                rightTriadicComplement];
        SELECT mouseButton FROM
            red => BEGIN
                data.palette ← IF control THEN
                        ProtoPalette.DeleteDirectComplement [data.palette]
                    ELSE ProtoPalette.MakeDirectComplement [data.palette];
                NoteNewColor [state, directComplement, 0];
                data.palette ← ProtoPalette.DeleteTriadicComplements
                        [data.palette]
                END;
            yellow => BEGIN
                data.palette ← IF control THEN
                        ProtoPalette.DeleteTriadicComplements [data.palette]
                    ELSE ProtoPalette.MakeTriadicComplements [data.palette];
                NoteNewColor [state, leftTriadicComplement, 0];
                NoteNewColor [state, rightTriadicComplement, 0];
                data.palette ← ProtoPalette.DeleteDirectComplement [data.palette]
                END;
            blue => IF shift THEN BEGIN
                data.palette ← IF control THEN
                        ProtoPalette.DeleteDirectComplement [data.palette]
                    ELSE ProtoPalette.MakeDirectComplement [data.palette];
                data.palette ← IF control THEN
                        ProtoPalette.DeleteTriadicComplements [data.palette]
                    ELSE ProtoPalette.MakeTriadicComplements [data.palette];
                NoteNewColor [state, leftTriadicComplement, 0];
                NoteNewColor [state, directComplement, 0];
                NoteNewColor [state, rightTriadicComplement, 0]
                END;
            ENDCASE => NULL
        END;
        ENDCASE => ImportantMessage ["Implementation error (wrong hue addition
                class)"]
    END;
ENDCASE => ImportantMessage ["Implementation error (wrong clientData type)"];
ViewerOps.PaintViewer [viewer: v, hint: client, clearClient: FALSE, whatChanged:
```

```
                changes]
        END
END:    -- AddHue

Values: Menus.ClickProc ~ BEGIN
    [parent: REF ANY, clientData: REF ANY + NIL mouseButton: MouseButton + red shift,
       control: BOOL + FALSE]
    IF NOT ISTYPE [parent, Viewer] THEN ImportantMessage ["Implementation error (wrong
                viewer type)"]
    ELSE BEGIN
        v: Viewer ~ NARROW [parent];    state: State ~ NARROW [v.data];   hue: Hue;
        data: ProtoPaletteData + Proto[state];
        IF (data.selection = NIL) THEN {Message ["No selection"];   RETURN};
        IF (data.selection.variant # 0) THEN {Message ["Already an atomic color"];
                RETURN};
        SetNewVersion [v, state];  hue + data.selection.hue;
        state.history.index + state.history.index.SUCC MOD historySize;
        state.history.entry[state.history.index] + ProtoPalette.CopyPalette [data.palette];
        IF state.verbose THEN PutHistoryLine [state, "add 2 aequidistant high and 2 aequidistant
                low values; CTRL: delete them"];
        data.palette.colors[hue] + IF control THEN ProtoPalette.RestrictValue [data.palette,
                data.palette.colors[hue]]
            ELSE ProtoPalette.VaryValue [data.palette, data.palette.colors[hue]];
        FOR i: ValueAndChroma IN [-(values + chromata) .. -chromata) DO NoteNewColor
                [state, hue, i] ENDLOOP;
        FOR i: ValueAndChroma IN (chromata .. chromata + values] DO NoteNewColor [state,
                hue, i] ENDLOOP;
        IF trace THEN BEGIN
            PutHistoryLine [state, "New values:"];
            FOR i: ValueAndChroma IN [-(values + chromata) .. -chromata) DO
                color: LAB ~ data.palette.colors[hue][i];
                IF (color # NIL) THEN PutHistoryLine [state, LABToLCHRope [color]]
                ENDLOOP;
            IF (data.palette.colors[hue][0] # NIL) THEN PutHistoryLine [state, LABToLCHRope
                    [data.palette.colors[hue][0]]];
            FOR i: ValueAndChroma IN (chromata .. chromata + values] DO
                color: LAB ~ data.palette.colors[hue][i];
                IF (color # NIL) THEN PutHistoryLine [state, LABToLCHRope [color]]
                ENDLOOP
            END;
        ViewerOps.PaintViewer [viewer: v, hint: client, clearClient: FALSE]
        END
END;    -- Values Chromata: Menus.ClickProc ~ BEGIN
    [parent: REF ANY, clientData: REF ANY + NIL mouseButton: MouseButton + red shift,
       control: BOOL + FALSE]
    IF NOT ISTYPE [parent, Viewer] THEN ImportantMessage ["Implementation error (wrong
                viewer type)"]
    ELSE BEGIN
```

```
v: Viewer ~ NARROW [parent];    state: State ~ NARROW [v.data];    hue: Hue;
data: ProtoPaletteData ← Proto[state];
IF (data.selection = NIL) THEN {Message ["No selection"];   RETURN};
IF (data.selection.variant # 0) THEN {Message ["Already an atomic color"];
        RETURN};
SetNewVersion [v, state];  hue ← data.selection.hue;
state.history.index ← state.history.index.SUCC MOD historySize;
state.history.entry[state.history.index] ← ProtoPalette.CopyPalette [data.palette];
IF state.verbose THEN PutHistoryLine [state, "add 2 aequidistant vivid and 2
        aequidistant dull chromata: CTRL: delete them"];
data.palette.colors[hue] ← IF control THEN ProtoPalette.RestrictChroma [data.palette,
        data.palette.colors[hue]]
    ELSE ProtoPalette.VaryChroma [data.palette, data.palette.colors[hue]];
FOR i: ValueAndChroma IN [-chromata .. chromata] DO NoteNewColor [state, hue, i]
        ENDLOOP;
IF trace THEN BEGIN
    PutHistoryLine [state, "New chromata:"];
    FOR i: ValueAndChroma IN [-chromata .. chromata] DO
        color: LAB ~ data.palette.colors[hue][i];
        IF (color # NIL) THEN PutHistoryLine [state, LABToLCHRope [color]]
        ENDLOOP
    END;
ViewerOps.PaintViewer [viewer: v, hint: client, clearClient: FALSE]
    END
END;   -- Chromata DoInterpress: Menus.ClickProc ~ BEGIN
    [parent: REF ANY, clientData: REF ANY ← NIL, mouseButton: MouseButton ← red, shift,
     control: BOOL ← FALSE]
    Produces an Interpress master.
    v: Viewer ~ NARROW [parent];    state: State ~ NARROW [v.data];
    lc: Context;      -- local context
    DoIt: PROC ~ {DrawEverything [lc, state, TRUE, TRUE]};
    DrawToIP: PROC [context: Imager.Context] ~ {lc ← context; context.DoSave [DoIt]};
    IF NOT ISTYPE [parent, Viewer] THEN ImportantMessage ["Implementation error (wrong
            viewer type)"]
    ELSE SELECT mouseButton FROM
        red => BEGIN
            master: ImagerInterpress.Ref;
            masterName: ROPE ~ IO.PutFR1 ["[]<>Temp>ProtoPalette>%g.Interpress",
                    IO.rope [state.name]];
            master ← ImagerInterpress.Create [masterName];
            master.DeclareColorOperator [labLinear];   master.DeclareFont [boldFace];
            master.DoPage [action: DrawToIP,
                    scale: ((fieldWidth / 1000.0) / state.boundingBox.w / state.scale)];
            master.Close [];
            ImportantMessage [masterName.Cat [" created"]];
            PutHistoryLine [state, Rope.Concat ["\nIPPreView ", masterName]]
            END;
        yellow => NULL;
```

```
blue => NULL;
ENDCASE => ERROR
END;    -- DoInterpress
```

Mouse Commands

```
Hit: PROC [state: State, v: Viewer, pos: VEC, delete: BOOL] ~ BEGIN
    Hit the current mouse position and store the target in the state.
    data: ProtoPaletteData ← Proto[state];         selectedColor: LAB;
    colors: Harmony ~ data.palette.colors;         prevSel: SelectionProto ~ data.selection;
    left: REAL ~ pos.x - swatchSize / 2.0;         right: REAL ~ pos.x + swatchSize / 2.0;
    bottom: REAL ~ pos.y - swatchSize / 2.0;       top: REAL ~ pos.y + swatchSize / 2.0;
    changes: ChangeListProto ← NIL;
    IF (prevSel # NIL) THEN changes ← CONS [prevSel.hue, changes];
    data.selection ← NIL;
    IF state.verbose THEN PutHistoryLine [state, "Selected color can be grabbed by Gargoyle; if
            there is a ColorTool, it shows the color\n\tCTRL deletes the color"];
    FOR i: Hue IN Hue DO
        FOR j: ValueAndChroma IN ValueAndChroma DO
            xy: VEC;
            xy.x ← keyColorPos[i].x + variantColorPos[j].x;
            xy.y ← keyColorPos[i].y + variantColorPos[j].y;
            IF (colors[i][j] # NIL) AND (xy.x > left) AND (xy.x < right) AND (xy.y > bottom) AND
                    (xy.y < top) THEN {data.selection ← NEW [SelectionProtoRep ← [i, j]];
                    EXIT}
        ENDLOOP
    ENDLOOP;
    IF (prevSel = NIL) AND (data.selection = NIL) THEN RETURN;
    IF (data.selection = NIL) THEN BEGIN
        ViewerOps.PaintViewer [viewer: v, hint: client, clearClient: FALSE, whatChanged:
                changes];
        RETURN
        END;
    IF delete THEN BEGIN
        state.history.index ← state.history.index.SUCC MOD historySize;
        state.history.entry[state.history.index] ← data.palette;
        data.palette ← ProtoPalette.CopyPalette [data.palette];
        data.palette.colors[data.selection.hue][data.selection.variant] ← NIL;
        data.selection ← NIL;     selectedColor ← NEW [CIELAB ← [25, 0, 0]];
        SetNewVersion [v, state]
        END
    ELSE BEGIN
        name: ROPE;
        selectedColor ← colors[data.selection.hue][data.selection.variant];
        changes ← CONS [data.selection.hue, changes];
        name ← ColorName [selectedColor];      Message [name];
        PutHistoryLine [state, Rope.Cat [LABToLCHRope
                [data.palette.colors[data.selection.hue][data.selection.variant]], " = ", name]];
        TRUSTED {Process.Detach [FORK SpeakMessage [name]]}
```

```
        END;
    TransferSelectedColor [state, ToRGB [selectedColor]];
    ViewerOps.PaintViewer [viewer: v, hint: client, clearClient: FALSE, whatChanged: changes]
    END;    -- Hit HitList: PROC [state: State, v: Viewer, pos: VEC, cmd: ATOM] ~ BEGIN
    Hit the current mouse position and store the target in the state. If the selected color is in the
    wash, its index is nrEntries - 1.
    data: DigitalPaletteData ← Digi[state];         doWash, deletable: BOOL ← FALSE;
    colors: CL ~ data.palette;   prevSel: SelectionDigital ~ data.selection;
    selectedColor: LAB ← NIL;           name: ROPE;         changes: ATOM ← $none;
    IF state.verbose THEN PutHistoryLine [state, "Left: left side of wash; right: right side of
                    wash; middle: add to palette\nMiddle-selected color can be grabbed by
                    Gargoyle; if there is a ColorTool, it shows the color\n\tCTRL middle deletes the
                    color"];
    IF (pos.y >= 0) THEN BEGIN
        IF (cmd = $selectMiddle) AND (data.wash # NIL) AND (pos.y <= washHeight) AND
            (pos.x >= 0) AND (pos.x < washWidth) THEN BEGIN
            A color in the wash has been selected. Add it to the palette and transfer it.
            SetNewVersion [v, state];
            IF (data.selection = NIL) THEN data.selection ← NEW [SelectionDigitalRep];
            data.selection.middle ← selectedColor ← data.wash[Round[pos.x/washItemWidth]];
            data ← AddToList [selectedColor, data, state];      changes ← $list;
            SetNewVersion [v, state]
            END     -- else no hit
        END
    ELSE BEGIN
        IF (pos.x >= 0) AND (pos.x <= washWidth) THEN BEGIN
            x: INT ← Fix[pos.x / 10];  y: INT ← - Fix[pos.y / 10];
            IF (x MOD 2 = 0) AND (y MOD 3 # 0) THEN BEGIN
                index: NAT ~ (x/2 + 1) + (y - 1)/3 * 5;
                IF (data.selection = NIL) THEN data.selection ← NEW [SelectionDigitalRep];
                selectedColor ← IthListElt [data, index];
                IF (selectedColor # NIL) THEN BEGIN
                    data.selection.ch ← index;
                    SELECT cmd FROM
                        $selectMiddle => data.selection.middle ← selectedColor;
                        $delete, $deleteLeft => BEGIN
                            data.selection.middle ← NIL;       deletable ← TRUE;
                            SetNewVersion [v, state]; changes ← $list
                            END;
                        $selectLeft => BEGIN
                            data.selection.left ← selectedColor; data.selection.middle ← NIL;
                            doWash ← TRUE;          changes ← $wash
                            END;
                        $selectRight => BEGIN
                            data.selection.right ← selectedColor; data.selection.middle ← NIL;
                            doWash ← TRUE;          changes ← $wash
                            END;
                        $deleteRight => ImportantMessage ["Use left button to delete"];
```

```
            ENDCASE => ERROR
          END
        END   -- else no hit
      END   -- else no hit
    END;
    IF (selectedColor = NIL) THEN RETURN;
    IF doWash AND (data.selection.left # NIL) AND (data.selection.right # NIL) THEN BEGIN
        delta: CIELAB;  sel: SelectionDigital ~ data.selection;
        IF (data.wash = NIL) THEN data.wash ← NEW [WashRep];
        delta.lStar ← sel.right.lStar - sel.left.lStar;
        delta.aStar ← sel.right.aStar - sel.left.aStar;
        delta.bStar ← sel.right.bStar - sel.left.bStar;
        FOR i: INTEGER IN [0 .. washItems) DO
            t: REAL ~ Float [i] / Float [washItems-1];
            data.wash[i] ← NEW [CIELAB];
            data.wash[i].lStar ← sel.left.lStar + t * delta.lStar;
            data.wash[i].aStar ← sel.left.aStar + t * delta.aStar;
            data.wash[i].bStar ← sel.left.bStar + t * delta.bStar;
            data.washCache[i] ← ColorFromLAB [data.wash[i]]
        ENDLOOP
    END;
    name ← ColorName [selectedColor];
    IF deletable THEN BEGIN
        index: NAT ← 1;
        FOR l: CL ← data.palette, l.rest WHILE (l # NIL) DO
            IF (index = data.selection.ch) THEN {l.first ← NIL;  EXIT};
            index ← index.SUCC
        ENDLOOP
    END
    ELSE BEGIN
        Message [name];
        PutHistoryLine [state, Rope.Cat [LABToLCHRope [selectedColor], " = ", name]];
        TRUSTED {Process.Detach [FORK SpeakMessage [name]]}
    END;
    TransferSelectedColor [state, ToRGB [selectedColor]];
    ViewerOps.PaintViewer [viewer: v, hint: client, clearClient: FALSE, whatChanged: changes]
    END;   -- HitList
```

Utilities

```
IthListElt: PROC [palette: DigitalPaletteData, i: NAT] RETURNS [LAB] ~ BEGIN
    Returns the one relative i-th element of the list
    count: CARDINAL ← 1;
    IF (i < 1) OR (i > palette.power) THEN RETURN [NIL];
    FOR list: CL ← palette.palette, list.rest WHILE (list # NIL) DO
        IF (count = i) THEN RETURN [list.first];
        count ← count.SUCC
    ENDLOOP;
    RETURN [NIL]
```

END;  -- *IthListElt*

WDir: PROC RETURNS [wDir: ROPE] ~ BEGIN
   *Guarantees that the working directory is not the root.*
   wDir ← FSExtras.GetWDir [];
   IF wDir.Equal ["[]◇"] AND (NOT lastWDir.IsEmpty) THEN wDir ← lastWDir;
   IF wDir.Equal ["[]◇"] THEN wDir ← "[]◇Temp>MetaPalette>"
   END;  -- *WDir*

Message: PROC [msg: ROPE] ~ BEGIN
   *Writes a message in the Message Window at the top of the LF screen.*
   MessageWindow.Clear [];         MessageWindow.Append [msg]
   END;  -- *Message*

ImportantMessage: PROC [msg: ROPE] ~ BEGIN
   *Writes a message in the Message Window at the top of the LF screen and makes it blink.*
   Message [msg];   MessageWindow.Blink []
   END.  -- *ImportantMessage*

SpeakMessage: PROC [msg: ROPE] ~ BEGIN
   *Speaks the message if Finch is loaded. The ra parameter is the speaking rate in words per minute. 120 < ra < 350: default 180.*
   status: FinchSynthesizer.NB;
   ctrl: ROPE ~ "∎P0:0z:ra230:nb∎\\ ";
   IF speak THEN status ← FinchSynthesizer.SpeakText [ctrl.Concat[msg] !
         RuntimeError.UnboundProcedure => CONTINUE]
   END;  -- *SpeakMessage*

Initializations

InitKeyColorPos: PROC ~ BEGIN
   FOR i: Hue IN Hue DO
      keyColorPos[i] ← SELECT i FROM
         -3 => [-4*swatchSize, -4*swatchSize],
         -2 => [8*swatchSize, 8*swatchSize],
         -1 => [4*swatchSize, 4*swatchSize],
         -0 => [0, 0],
         1 => [-4*swatchSize, 4*swatchSize],
         2 => [-8*swatchSize, 8*swatchSize],
         3 => [4*swatchSize, -4*swatchSize],
         4 => [0, -8*swatchSize],
         ENDCASE => [0, 0]
      ENDLOOP
   END;  -- *InitKeyColorPos*

InitVariantColorPos: PROC ~ BEGIN
   FOR i: ValueAndChroma IN [-(values + chromata) .. -chromata) DO
      variantColorPos[i] ← [0, Float [i + chromata] * swatchSize2]
      ENDLOOP;

```
FOR i: ValueAndChroma IN [-chromata .. 0) DO
    variantColorPos[i] ← [Float [i] * swatchSize2, 0]
    ENDLOOP;
variantColorPos[0] ← [0, 0];
FOR i: ValueAndChroma IN (0 .. chromata] DO
    variantColorPos[i] ← [Float [i] * swatchSize2, 0]
    ENDLOOP;
FOR i: ValueAndChroma IN (chromata .. chromata + values] DO
    variantColorPos[i] ← [0, Float [i - chromata] * swatchSize2]
    ENDLOOP
END;  -- InitVariantColorPos protoDoc: ROPE ~ "is an editor for functional color palettes. Parameters: Palette name, Key
    color.\nMouse buttons: left: select, CTRL left: delete.\nRelated commands:
    DigitalPalette, NewFieldWidth, PaletteTo8Bit; and ListPalettes,
    AddPaletteComment, AddReferencePalettes, PaletteGC.";

digDoc: ROPE ~ "is an editor for functional color palettes. Parameter: Palette name.\nMouse
    buttons: left/right: select left/right color for wash, middle: select, CTRL left:
    delete.\nRelated commands: ProtoPalette, NewFieldWidth, PaletteTo8Bit; and
    ListPalettes, AddPaletteComment, AddReferencePalettes, PaletteGC.";

ProtoCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    keyColor: ATOM ← Atom.MakeAtom [CommandTool.NextArgument [cmd]];
    IF name.IsEmpty THEN name ← "Arlecchino";
    IF name.IsEmpty THEN BEGIN
        msg ← "Specify a palette name (use ListPalettes to list existing palettes)."; result ←
            $failure
        END
    ELSE BEGIN
        IF (keyColor = emptyAtom) THEN keyColor ← $default;
        lastWDir ← cmd.command.Substr [0, FS.ExpandName[cmd.command].cp.base.start-1];
        msg ← "Mouse buttons: left: select, CTRL left: delete.";
        IF ProtoPalette.ValidKeyColor [keyColor] THEN lastViewer ← CreateViewer [name,
            keyColor]
        ELSE {result ← $failure;  msg ← "No such key color."}
        END
    END;  -- ProtoCmd DigiCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    IF name.IsEmpty THEN BEGIN
        msg ← "Specify a palette name (use ListPalettes to list existing palettes)."; result ←
            $failure
        END
    ELSE BEGIN
        msg ← "Mouse buttons: left/right: select left/right color for wash, middle: select, CTRL
```

```
        left: delete.";
    lastWDir ← cmd.command.Substr [0, FS.ExpandName[cmd.command].cp.base.start-1];
    lastViewer ← CreateViewer [name, emptyAtom]
    END
END;    -- DigiCmd FieldWidth: Commander.CommandProc ~ BEGIN
    width: ROPE ← CommandTool.NextArgument [cmd];
    fieldWidth ← Convert.RealFromRope [width ! Convert.Error => {fieldWidth ← 155.3452;
            CONTINUE}];
    msg ← IO.PutFR1 ["Field width = %g mm.", IO.real [fieldWidth]]
END;    -- FieldWidth To8BitCmd: Commander.CommandProc ~ BEGIN
    NoteDisplayChangedTo8Bit [NIL]
END;    -- To8BitCmd VideoCmd: Commander.CommandProc ~ BEGIN
    video ← NOT video;      InitSwatches
END;    -- VideoCmd
```

Main body

*UserProfile.CallWhenProfileChanges [PaletteNameMgr];*

```
InitializeViewerClass;    InitKeyColorPos;         InitVariantColorPos;
InitSwatches;    InitSubMaps;

ImagerColorMap.Register [colorMapNotifier];

Commander.Register [key: "ProtoPalette", proc: ProtoCmd, doc: protoDoc];
Commander.Register [key: "DigitalPalette", proc: DigiCmd, doc: digiDoc];
Commander.Register [key: "PaletteTo8Bit", proc: To8BitCmd,
        doc: "notices that the display device changed to 8-bit color."];
Commander.Register [key: "NewFieldWidth", proc: FieldWidth,
        doc: "sets the width of the field in mm for Interpress masters."];
Commander.Register [key: "VideoHack", proc: VideoCmd,
        doc: "does a hack for doing Abekas frames for the ProtoPalette."]

END.    -- ProtopaletteCommanderImpl
```

```
gamut[5] ← [[160, 0], [195, 48], [-52, 60], [-28, -122], [43, -125]];
gamut[6] ← [[103, -95], [158, 52], [-64, 72], [-40, -100], [90, -108]];
gamut[7] ← [[92, 0], [108, 69], [-75, 84], [-53, -74], [74, -81]];
gamut[8] ← [[56, 0], [64, 82], [-85, 97], [-67, -46], [49, -54]];
gamut[9] ← [[25, -28], [31, 98], [-62, 108], [-84, -20], [-79, -20]];
```
*Transform to a* b*.*
```
FOR i: [1..9] IN [1..9] DO
    FOR j: [1..5] IN [1..5] DO
        luv: ImagerColorES.CIELUV ← [i*10, gamut[i][j].x, gamut[i][j].y];
        xyz: XYZ ← ImagerColorES.XYZFromCIELUV [luv, [0,0,0]];
        lab: CIELAB ← ImagerColorES.CIELABFromXYZ [xyz, [0,0,0]];
        gamut[i][j] ← [lab.aStar, lab.bStar]
        ENDLOOP
    ENDLOOP
END;    -- InitGamut InitGamut40: PROC ~ BEGIN
```
*Try to find gamut of a SMPTE monitor. Needs more edges because it does not take into consideration the gamut shape.*
```
lch: LCH;       rgb: ImagerColorES.RGB;         count: CARDINAL;
a, b, m, min, max: REAL;
Rgb: PROC ~ BEGIN
    rgb ← ImagerColorES.XeroxRGBFromXYZ [ImagerColorES.XYZFromCIELAB
            [[lch.lStar, lch.c * CosDeg [lch.h], lch.c * SinDeg [lch.h]], [0, 0, 0]]];
    min ← MIN [rgb.R, rgb.G, rgb.B];    max ← MAX [rgb.R, rgb.G, rgb.B]
    END;    -- Rgb
FOR i: [1..19] IN [1..19] DO
    lch.lStar ← 5 * i;
    FOR j: [1..40] IN [1..40] DO
        Estimate chroma.
        lch.h ← 360.0 / 40.0 * j;   lch.c ← 60;     Rgb[];
        lch.c ← ImagerColorES.ABChroma [ImagerColorES.CIELABFromXYZ
                    [ImagerColorES.XYZFromXeroxRGB [ImagerColorES.RGBFromHSV
                    [ImagerColorES.HSVFromRGB [rgb]]], [0, 0, 0]]];
        a ← 0;  b ← 2 * lch.c;   m ← lch.c;    count ← 0;
        Find max using binary search.
        WHILE (ABS [b - a] > 0.01) DO
            IF (min < 0) OR (max > 1) THEN b ← m
            ELSE BEGIN
                IF (min > 0.0001) AND (max < 0.9999) THEN a ← m
                ELSE EXIT       -- 0 ≤ min ≤ 0.0001 ∨ 0.9999 ≤ max ≤ 1
                END;
            m ← lch.c ← (a + b) / 2.0;      Rgb[];
            count ← count.SUCC;     IF (count > 1000) THEN break
            ENDLOOP;
        fineGamut[i][j] ← [lch.c * CosDeg [lch.h], lch.c * SinDeg [lch.h]]
        ENDLOOP
    ENDLOOP
END;    -- InitGamut40
```

D65YxyToLab: PROC [Y, x, y: REAL, white: XYZ] RETURNS [LAB] ~ BEGIN
    RETURN [NEW [CIELAB ← ImagerColorES.CIELABFromXYZ
        [ImagerColorES.IlluminantChange [ImagerColorES.Tristimulus [[Y, x, y]],
        white]]]
    END;   -- D65YxyToLab

Algorithms

CenterColor: PROC [hue: REAL, ref: KeyColor] RETURNS [LCH] ~ BEGIN
    *The center color must be an invariant, otherwise the global operations depend on the previous state.*
    color: LCH;
    color.lStar ← ref.pivot + ((ref.lch.lStar-ref.pivot) * CosDeg [ref.lch.h - hue]);
    color.h ← hue;
    *This is the main focus of research. How do we best choose the center colors?*
    color.c ← SELECT centerChroma FROM
        $keyColor => ref.lch.c,
        $middle => MaxChroma [color] / 2.0,
        $compromise => MaxChroma [color] / 4.0 + ref.lch.c / 2.0,
        $exceptKey => IF (Round[hue] = Round[ref.lch.h]) THEN ref.lch.c
            ELSE MaxChroma [color] / 2.0,
        ENDCASE => ERROR;
    RETURN [color]
    END;   -- CenterColor LightnessForHue: PROC [step: Value, hue: LCH, ref: KeyColor] RETURNS [REAL] ~ BEGIN
    *Colors are on an inclinated plane.*
    value: REAL ← CenterColor [hue.h, ref].lStar;
    max: REAL ~ MaxLightness [hue]; min: REAL ~ MinLightness [hue];
    *Leave some room for the variants:*
    value ← MIN [MAX [value, min + 5.0], max - 5.0];
    SELECT step FROM
        < 0 => RETURN [value + step * (value - min) / (Float[values] + 1.0)];
        = 0 => RETURN [value];
        ENDCASE => RETURN [value + step * (max - value) / Float[values]]
    END;   -- LightnessForHue ChromaForHue: PROC [step: Chroma, hue: LCH, ref: KeyColor] RETURNS [REAL] ~ BEGIN
    *Vivid colors go to gamut boundary, dull colors 1/steps before gray.*
    chroma: REAL ← CenterColor [hue.h, ref].c;
    max: REAL ~ MaxChroma [hue];
    *Leave some room for the variants:*
    chroma ← MIN [MAX [chroma, 5.0], max - 5.0];
    SELECT step FROM
        < 0 => RETURN [chroma * (1.0 + Float [step] / Float [chromata + 1])];
        = 0 => RETURN [chroma];
        ENDCASE => RETURN [chroma + (Float [step] / Float [chromata]) * (max - chroma)]
    END;   -- ChromaForHue

```
ChangeHue: PROC [color: LAB, amount: REAL, var: ValueAndChroma, ref: KeyColor]
        RETURNS [LAB] ~ BEGIN
    Returns a newly allocated element. To make things symmetrical first the center value must be
    computed (var = 0). ChromaForHue will refer to the center for the lightness and
    LightnessForHue will refer to the center for the chroma.
    vs: ValueAndChroma ~ ValueStep [var];   cs: ValueAndChroma ~ ChromaStep [var];
    lch: LCH;        newHue: REAL;
    IF (color = NIL) THEN RETURN [NIL];
    newHue ← Cylindrical [color].h;   newHue ← newHue + amount;
    IF (newHue < 0) THEN newHue ← newHue + 360;
    IF (newHue > 360) THEN newHue ← newHue - 360;
    lch ← CenterColor [newHue, ref];
    IF (cs = 0) THEN
        {lch.c ← ChromaForHue [cs, lch, ref];  lch.lStar ← LightnessForHue [vs, lch, ref]}
    ELSE {lch.lStar ← LightnessForHue [vs, lch, ref];   lch.c ← ChromaForHue [cs, lch, ref]};
    RETURN [Cartesian [lch]]
    END;   -- ChangeHue VaryValue: PUBLIC PROC [p: Palette, v: IsoHueVariation] RETURNS [vv: IsoHueVariation] ~
        BEGIN
    Chroma and hue are kept constant, while the lightness is changed. The scale is asymmetric.
    Returns new element for undo.
    lch: LCH;         reference: KeyColor;
    IF (p = NIL) OR (v[0] = NIL) THEN notInitialized;
    IF p.lock THEN break;    p.lock ← TRUE;
    reference ← KeyColorData [p.keyColor];   lch ← Cylindrical [v[0]];
    FOR i: ValueAndChroma IN [-(values + chromata) .. -chromata) DO
        vv[i] ← NEW [CIELAB];
        vv[i].lStar ← LightnessForHue [ValueStep [i], lch, reference];
        vv[i].aStar ← v[0].aStar;   vv[i].bStar ← v[0].bStar
        ENDLOOP;
    FOR i: ValueAndChroma IN [-chromata .. chromata] DO vv[i] ← v[i] ENDLOOP;
    FOR i: ValueAndChroma IN (chromata .. chromata + values] DO
        vv[i] ← NEW [CIELAB];
        vv[i].lStar ← LightnessForHue [ValueStep [i], lch, reference];
        vv[i].aStar ← v[0].aStar;   vv[i].bStar ← v[0].bStar
        ENDLOOP;
    p.lock ← FALSE
    END;   -- VaryValue VaryChroma: PUBLIC PROC [p: Palette, v: IsoHueVariation] RETURNS [vv: IsoHueVariation] ~
        BEGIN
    Value and hue are kept constant, while the chroma is changed.
    Returns new element for undo.
    lch: LCH; reference: KeyColor;
    IF (p = NIL) OR (v[0] = NIL) THEN notInitialized;
    IF p.lock THEN break;    p.lock ← TRUE;
    reference ← KeyColorData [p.keyColor];
    FOR i: ValueAndChroma IN [-(values + chromata) .. -chromata) DO vv[i] ← v[i] ENDLOOP;
    FOR i: ValueAndChroma IN (chromata .. chromata + values] DO vv[i] ← v[i] ENDLOOP;
```

```
      vv[0] ← v[0];      lch ← Cylindrical [vv[0]];
      FOR i: ValueAndChroma IN [-chromata .. chromata] DO
            vv[i] ← Cartesian [[lch.lStar, ChromaForHue [ChromaStep [i], lch, reference], lch.h]]
            ENDLOOP;
      p.lock ← FALSE
      END;    -- VaryChroma RotateNegative: PUBLIC PROC [p: Palette] RETURNS [pp: Palette] ~ BEGIN
      The whole palette is rotated. Returns new element for undo.
      increment: REAL;
      IF (p = NIL) THEN notInitialized;  IF p.lock THEN break;
      pp ← CopyPalette [p];     p.lock ← pp.lock ← TRUE;
      increment ← -hueStep / 2.0;
      FOR i: Hue IN Hue DO
            FOR j: ValueAndChroma IN ValueAndChroma DO
                  pp.colors[i][j] ← ChangeHue [p.colors[i][j], increment, j, KeyColorData [p.keyColor]]
                  ENDLOOP;
            ENDLOOP;
      p.lock ← pp.lock ← FALSE
      END;    -- RotateNegative RotatePositive: PUBLIC PROC [p: Palette] RETURNS [pp: Palette] ~ BEGIN
      The whole palette is rotated. Returns new element for undo.
      increment: REAL;
      IF (p = NIL) THEN notInitialized;  IF p.lock THEN break;
      pp ← CopyPalette [p];     p.lock ← pp.lock ← TRUE;
      increment ← hueStep / 2.0;
      FOR i: Hue IN Hue DO
            FOR j: ValueAndChroma IN ValueAndChroma DO
                  pp.colors[i][j] ← ChangeHue [p.colors[i][j], increment, j, KeyColorData [p.keyColor]]
                  ENDLOOP
            ENDLOOP;
      p.lock ← pp.lock ← FALSE
      END;    -- RotatePositive MakeAnaloguousHarmony: PUBLIC PROC [p: Palette] RETURNS [pp: Palette] ~ BEGIN
      Returns new element for undo.
      IF (p = NIL) THEN notInitialized;  IF p.lock THEN break;
      pp ← CopyPalette [p];     p.lock ← pp.lock ← TRUE;
      FOR i: Hue IN analoguousHarmonies DO
            pp.colors[i][0] ← ChangeHue [pp.colors[centerHue][0], i*hueStep, 0, KeyColorData
                  [p.keyColor]];
            ENDLOOP;
      p.lock ← pp.lock ← FALSE
      END;    -- MakeAnaloguousHarmony MakeDirectComplement: PUBLIC PROC [p: Palette] RETURNS [pp: Palette] ~ BEGIN
      Returns new element for undo.
      IF (p = NIL) THEN notInitialized;  IF p.lock THEN break;
      pp ← CopyPalette [p];     p.lock ← pp.lock ← TRUE;
```

```
pp.colors[directComplement][0] ← ChangeHue [pp.colors[centerHue][0], 180, 0,
        KeyColorData [p.keyColor]];
p.lock ← pp.lock ← FALSE
END;    -- MakeDirectComplement
```

MakeTriadicComplements: PUBLIC PROC [p: Palette] RETURNS [pp: Palette] ~ BEGIN
*Returns new element for undo.*
```
IF (p = NIL) THEN notInitialized; IF p.lock THEN break;
pp ← CopyPalette [p];    p.lock ← pp.lock ← TRUE;
pp.colors[leftTriadicComplement][0] ← ChangeHue [pp.colors[centerHue][0], +120, 0,
        KeyColorData [p.keyColor]];
pp.colors[rightTriadicComplement][0] ← ChangeHue [pp.colors[centerHue][0], -120, 0,
        KeyColorData [p.keyColor]];
p.lock ← pp.lock ← FALSE
END;    -- MakeTriadicComplements
```

DeleteAnaloguousHarmony: PUBLIC PROC [p: Palette] RETURNS [pp: Palette] ~ BEGIN
```
IF (p = NIL) THEN notInitialized; IF p.lock THEN break;
pp ← CopyPalette [p];    p.lock ← pp.lock ← TRUE;
FOR i: Hue IN analoguousHarmonies DO
    IF (i = centerHue) THEN LOOP;
    FOR j: ValueAndChroma IN ValueAndChroma DO
        pp.colors[i][j] ← NIL
        ENDLOOP
    ENDLOOP;
p.lock ← pp.lock ← FALSE
END;    -- DeleteAnaloguousHarmony
```

DeleteDirectComplement: PUBLIC PROC [p: Palette] RETURNS [pp: Palette] ~ BEGIN
```
IF (p = NIL) THEN notInitialized; IF p.lock THEN break;
pp ← CopyPalette [p];    p.lock ← pp.lock ← TRUE;
FOR j: ValueAndChroma IN ValueAndChroma DO
    pp.colors[directComplement][j] ← NIL
    ENDLOOP;
p.lock ← pp.lock ← FALSE
END;    -- DeleteDirectComplement
```

DeleteTriadicComplements: PUBLIC PROC [p: Palette] RETURNS [pp: Palette] ~ BEGIN
```
IF (p = NIL) THEN notInitialized; IF p.lock THEN break;
pp ← CopyPalette [p];    p.lock ← pp.lock ← TRUE;
FOR j: ValueAndChroma IN ValueAndChroma DO
    pp.colors[leftTriadicComplement][j] ← NIL
    ENDLOOP;
FOR j: ValueAndChroma IN ValueAndChroma DO
    pp.colors[rightTriadicComplement][j] ← NIL
    ENDLOOP;
p.lock ← pp.lock ← FALSE
END;    -- DeleteTriadicComplements
```

RestrictValue: PUBLIC PROC [p: Palette, v: IsoHueVariation] RETURNS [vv: IsoHueVariation] ~

```
· BEGIN
IF (p = NIL) THEN notInitialized; IF p.lock THEN break;    p.lock ← TRUE;
FOR i: ValueAndChroma IN [-chromata .. chromata] DO
    IF (v[i] # NIL) THEN vv[i] ← NEW [CIELAB ← v[i]↑]
    ENDLOOP;
p.lock ← FALSE
END;   -- RestrictValue
```

```
RestrictChroma: PUBLIC PROC [p: Palette, v: IsoHueVariation] RETURNS [vv: IsoHueVariation]
~ BEGIN
IF (p = NIL) THEN notInitialized; IF p.lock THEN break;    p.lock ← TRUE;
vv[centerHue] ← NEW [CIELAB ← v[centerHue]↑];
FOR i: ValueAndChroma IN [-(values + chromata) .. -chromata) DO
    IF (v[i] # NIL) THEN vv[i] ← NEW [CIELAB ← v[i]↑]
    ENDLOOP;
FOR i: ValueAndChroma IN (chromata .. chromata + values] DO
    IF (v[i] # NIL) THEN vv[i] ← NEW [CIELAB ← v[i]↑]
    ENDLOOP;
p.lock ← FALSE
END;   -- RestrictChroma
```

Key colors refWhite: XYZ ← ImagerColorES.Tristimulus [[0.0, 0.2425, 0.2515]];

```
InitKeyColorData: PROC ~ BEGIN
    A default color and the Boynton basic colors.
    entry: KeyColor ← NEW [KeyColorRep];    whiteY: REAL;
    white: XYZ ← [0, 0, 0];      -- i.e. use value defined by standard
    BEGIN OPEN entry:
        name ← $default;         lab ← NEW [CIELAB ← [90.07729, -11.92, 76.26]];
        kch ← Cylindrical [lab];  pivot ← 70
        END;
    IF NOT keyColorTable.Store [entry.name, entry] THEN break;

whiteY ← 8.27;   -- Boynton's published luminance
    whiteY ← 100.0;  -- The perfect reflecting diffuser illuminated by ... D65 yields the "white"
        object color stimulus with Y10 = 100 [W&S p. 513]

entry ← NEW [KeyColorRep];
    BEGIN OPEN entry;       -- OSA -4 2 -8    Y10 = 9.49
        name ← $red;    lab ← NEW [CIELAB];
        lab↑ ← ImagerColorES.CIELABFromXYZ [ImagerColorES.IlluminantChange
            [ImagerColorES.Tristimulus [[0.59/whiteY, 0.5132, 0.3159]]], refWhite];
        lab ← D65YxyToLab [9.72 / 75.76, 0.5341, 0.3191, white];
        kch ← Cylindrical [lab];  pivot ← 70
        END;
    IF NOT keyColorTable.Store [entry.name, entry] THEN break;

entry ← NEW [KeyColorRep];
    BEGIN OPEN entry;       -- OSA -3 5 5    Y10 = 16.20
```

```
    name ← Sgreen:  lab ← NEW [CIELAB];
    labt ← ImagerColorES.CIELABFromXYZ [ImagerColorES.IlluminantChange
       [ImagerColorES.Tristimulus[[1.63/whiteY, 0.3092, 0.5189]]], refWhite]:
    lab ← D65YxyToLab [17.26 / 75.76, 0.2816, 0.5217, white];
    kh ← Cylindrical [lab];    pivot ← 70
    END;
IF NOT keyColorTable.Store [entry.name, entry] THEN break;

entry ← NEW [KeyColorRep];
BEGIN OPEN entry;     - OSA 4 12 0    Y₁₀ = 64.45
    name ← Syellow;  lab ← NEW [CIELAB];
    labt ← ImagerColorES.CIELABFromXYZ [ImagerColorES.IlluminantChange
       [ImagerColorES.Tristimulus[[5.58/whiteY, 0.4584, 0.4788]]], refWhite]:
    lab ← D65YxyToLab [67.72 / 75.76, 0.4423, 0.4962, white];
    kh ← Cylindrical [lab];    pivot ← 70
    END;
IF NOT keyColorTable.Store [entry.name, entry] THEN break;

entry ← NEW [KeyColorRep];
BEGIN OPEN entry;     - OSA -4 -4 4    Y₁₀ = 10.13
    name ← Sblue;  lab ← NEW [CIELAB];
    labt ← ImagerColorES.CIELABFromXYZ [ImagerColorES.IlluminantChange
       [ImagerColorES.Tristimulus[[0.59/whiteY, 0.1881, 0.2492]]], refWhite]:
    lab ← D65YxyToLab [8.11 / 75.76, 0.1819, 0.1965, white];
    kh ← Cylindrical [lab];    pivot ← 70
    END;
IF NOT keyColorTable.Store [entry.name, entry] THEN break;

entry ← NEW [KeyColorRep];
BEGIN OPEN entry;     - OSA 1 9 -7    Y₁₀ = 31.66
    name ← Sorange;        lab ← NEW [CIELAB];
    labt ← ImagerColorES.CIELABFromXYZ [ImagerColorES.IlluminantChange
       [ImagerColorES.Tristimulus[[1.85/whiteY, 0.5387, 0.4045]]], refWhite]:
    lab ← D65YxyToLab [33.72 / 75.76, 0.5314, 0.4161, white];
    kh ← Cylindrical [lab];    pivot ← 70
    END;
IF NOT keyColorTable.Store [entry.name, entry] THEN break;

entry ← NEW [KeyColorRep];
BEGIN OPEN entry;     - OSA -6 -4 -2    Y₁₀ = 4.85
    name ← Spurple;        lab ← NEW [CIELAB];
    labt ← ImagerColorES.CIELABFromXYZ [ImagerColorES.IlluminantChange
       [ImagerColorES.Tristimulus[[0.28/whiteY, 0.2656, 0.2044]]], refWhite]:
    lab ← D65YxyToLab [4.43 / 75.76, 0.2999, 0.2032, white];
    kh ← Cylindrical [lab];    pivot ← 70
    END;
IF NOT keyColorTable.Store [entry.name, entry] THEN break;

entry ← NEW [KeyColorRep];
BEGIN OPEN entry;     - OSA 3 -1 -5    Y₁₀ = 48.76
    name ← Spink;  lab ← NEW [CIELAB];
    labt ← ImagerColorES.CIELABFromXYZ [ImagerColorES.IlluminantChange
       [ImagerColorES.Tristimulus[[3.49/whiteY, 0.3524, 0.3010]]], refWhite]:
```

```
        lab ← D65YxyToLab [47.19 / 75.76, 0.3653, 0.3090, white];
        lch ← Cylindrical [lab];   pivot ← 70
        END;
    IF NOT keyColorTable.Store [entry.name, entry] THEN break;

entry ← NEW [KeyColorRep];
    BEGIN OPEN entry:        -- OSA -S 3 -3    Y_{10} = 8.08
        name ← $brown; lab ← NEW [CIELAB];
        labt ← ImagerColorES.CIELABFromXYZ [ImagerColorES.IlluminantChange
            [ImagerColorES.Tristimulus [[0.54/whiteY, 0.4604, 0.3791]]], refWhite];
        lab ← D65YxyToLab [8.42 / 75.76, 0.4749, 0.3982, white];
        lch ← Cylindrical [lab];   pivot ← 70
        END;
    IF NOT keyColorTable.Store [entry.name, entry] THEN break;

entry ← NEW [KeyColorRep];
    BEGIN OPEN entry:        -- PMS 285
        name ← $xerox; lab ← NEW [CIELAB];
        labt ← ImagerColorES.CIELABFromXYZ [ImagerColorES.IlluminantChange
                 [ImagerColorES.Tristimulus [[12.11/78.13, 0.1981, 0.2045]]], refWhite];
        lch ← Cylindrical [lab];   pivot ← 70
        END;
    IF NOT keyColorTable.Store [entry.name, entry] THEN break;

entry ← NEW [KeyColorRep];
    BEGIN OPEN entry:        -- PMS 285 kept at D_{65}
        name ← $xerox65;     lab ← NEW [CIELAB];
        labt ← ImagerColorES.CIELABFromXYZ [ImagerColorES.Tristimulus [[12.11/78.13,
                 0.1981, 0.2045]], refWhite];
        lch ← Cylindrical [lab];   pivot ← 70
        END;
    IF NOT keyColorTable.Store [entry.name, entry] THEN break
    END;      -- InitKeyColorData KeyColorData: PROC [keyColor: ATOM] RETURNS [KeyColor] ~ BEGIN
    Breaks if key is invalid.
    data: KeyColor ← NARROW [keyColorTable.Fetch[keyColor].val];
    IF (data = NIL) THEN break;     RETURN [data]
    END;      -- KeyColorData ValidKeyColor: PUBLIC PROC [keyColor: ATOM] RETURNS [BOOL] ~ BEGIN
    RETURN [keyColorTable.Fetch[keyColor].found]
    END;      -- ValidKeyColor
```

Main body

```
InitKeyColorData [];
IF published THEN InitGamut [] ELSE InitGamut40

END.     -- ProtoPaletteImpl
```

*Copyright © 1989 by Xerox Corporation. All rights reserved.*
*Beretta:PARC:Xerox (8°923-4484) October 11, 1989 8:26:51 pm PDT*

*User interface for both ProtoPalette and DigitalPalette. MetaPalette still to be merged.*

DIRECTORY
   Rope USING [ROPE],
   ViewerClasses USING [Column, Viewer];

ProtopaletteCommander: CEDAR DEFINITIONS ~ BEGIN

Viewer: TYPE ~ ViewerClasses.Viewer;
   Column: TYPE ~ ViewerClasses.Column;   -- {static, left, right, color}

Main Interface

CreateViewer: PROC [name: Rope.ROPE, keyColor: ATOM, column: Column ← color] RETURNS
      [viewer: Viewer];
      *Initializes a viewer. The state information is in the data field of the viewer. If the key color is empty then a digital palette is assumed, otherwise a proto-palette.*

PutClientData: PROC [viewer: Viewer, type: ATOM, val: REF ← NIL];
      *Allows one to add client data to the palette associated to a particular viewer.*

GetClientData: PROC [viewer: Viewer, type: ATOM] RETURNS [REF]

END.   -- *ProtopaletteCommander*

*ProtopaletteCommanderImpl.mesa*
   Copyright © 1989 by Xerox Corporation. All rights reserved.
   Written by Giordano Bruno Beretta, July 20, 1989 1:36:15 pm PDT
   Beretta:PARC:Xerox (8°923-4484) November 17, 1989 11:16:11 am PST

*User interface.*

DIRECTORY
    Atom USING [EmptyAtom, MakeAtom, GetPName],
    ColorTool USING [GetRGBValue, NoColorToolViewer, SetRGBValue],
    Commander USING [CommandProc, Register],
    CommandTool USING [NextArgument],
    Convert USING [Error, RealFromRope],
    FinchSynthesizer USING [NB, SpeakText],
    FS USING [ComponentPositions, Error, ExpandName],
    FSExtras USING [GetWDir],
    Icons USING [NewIconFromFile],
    Imager USING [ClipRectangle, Context, DoSave, Font, MakeGray, MaskRectangleI,
            MaskRectangle, MaskFillTrajectory, Rectangle, ScaleT, SetColor, SetFont,
            SetPriorityImportant, SetStrokeEnd, SetStrokeJoint, SetStrokeWidth, SetXY,
            ShowRope, TranslateT, VEC],
    ImagerBackdoor USING [GetBounds],
    ImagerColorES USING [CIELABArgs, CIELABFromXYZ, Color, ColorOperator, ColorRep,
            ConstantColor, FindColor, NewColorOperatorCIELAB, OpConstantColor, RGB,
            RGBFromColor, XeroxRGBFromXYZ, XYZFromCIELAB,
            XYZFromXeroxRGB],
    ImagerColorFns USING [HSLFromRGB],
    ImagerColorMap USING [ApplyGamma, ApplyGammaInverse, GetGamma, NotifierRep,
            Register, UnRegister],
    ImagerDitherContext USING [MakeSpecialColor],
    ImagerFont USING [Find, Font, Scale, Substitution],
    ImagerInterpress USING [Close, Create, DeclareColorOperator, DeclareFont, DoPage, Ref],
    ImagerPath USING [LineTo, MoveTo, Trajectory],
    ImagerTransformation USING [Transformation],
    IO USING [DEL, ESC, int, NUL, PutFR, PutFR1, real, rope, STREAM],
    Menus USING [AppendMenuEntry, ClickProc, CopyEntry, CreateEntry, CreateMenu, Menu,
            MenuEntry],
    MessageWindow USING [Append, Blink, Clear],
    NamedColors USING [HSLToRope],
    PaletteIO USING [CL, DatabaseInfo, Error, ErrorDesc, ListDirectory, MarkEdited, PaletteInfo,
            ReadColorList, ReadProtoPalette, WriteColorList, WriteProtoPalette,
            UnmarkEdited],
    Process USING [CheckForAbort, Detach],
    Properties USING [GetProp, PropList, PutProp],
    ProtoPalette USING [analoguousHarmonies, Cartesian, centerHue, chromata, CIELAB,
            CopyPalette, CreatePalette, Cylindrical, DeleteAnaloguousHarmony,
            DeleteDirectComplement, DeleteTriadicComplements, directComplement,
            Harmony, Hue, IsoHueVariation, LAB, LCH, leftTriadicComplement,
            MakeAnaloguousHarmony, MakeDirectComplement, MakeTriadicComplements,
            Palette, RestrictChroma, RestrictValue, rightTriadicComplement, RotateNegative, · RotatePositive, ValidKeyColor, ValueAndChroma, values, VaryChroma, VaryValue];
ProtopaletteCommander,
Real USING [Fix, Float, Round],
Rope USING [Cat, Concat, Equal, FromProc, IsEmpty, ROPE, Substr],
RopeFile USING [Create],
RuntimeError USING [UnboundProcedure],
Terminal USING [BitmapState, ChannelValue, ColorCursorPresentation, ColorMode, ColorValue, Current, GetColorBitmapState, GetColor, GetColorMode, SetColor, SetColorCursorPresentation, Virtual],
TypeScript USING [BackSpace, ChangeLooks, CharsAvailable, Create, Destroy, Destroyed, GetChar, PutChar, PutRope, Reset, TypeIn],
TIPUser USING [InstantiateNewTIPTable, TIPScreenCoords],
ViewerClasses USING [DestroyProc, HScrollProc, MenuLine, NotifyProc, PaintHint, PaintProc, SaveProc, ScrollProc, Viewer, ViewerClass, ViewerClassRec, ViewerFlavor, ViewerRec],
ViewerForkers USING [ForkPaint],
ViewerOps USING [BlinkViewer, CreateViewer, EnumProc, EnumerateViewers, EstablishViewerPosition, OpenIcon, PaintViewer, RegisterViewerClass, SaveViewer, SetNewVersion],
WindowManager USING [colorDisplayOn]:

ProtopaletteCommanderImpl: CEDAR PROGRAM

IMPORTS Atom, ColorTool, Commander, CommandTool, Convert, FinchSynthesizer, FS, FSExtras, Icons, Imager, ImagerBackdoor, ImagerColorES, ImagerColorFns, ImagerColorMap, ImagerDitherContext, ImagerFont, ImagerInterpress, ImagerPath, IO, Menus, MessageWindow, NamedColors, PaletteIO, ProtoPalette, Process, Properties, Real, Rope, RopeFile, RuntimeError, Terminal, TypeScript, TIPUser, ViewerForkers, ViewerOps, WindowManager EXPORTS ProtopaletteCommander ~ BEGIN OPEN ProtopaletteCommander, Real;

Imported types and variables analoguousHarmonies: TYPE ~ ProtoPalette.analoguousHarmonies;
chromata: INTEGER ~ ProtoPalette.chromata;
CIELAB: TYPE ~ ProtoPalette.CIELAB;        -- RECORD [lStar, aStar, bStar: REAL];
CL: TYPE ~ PaletteIO.CL; -- LIST OF LAB, Color List
Color: TYPE ~ ImagerColorES.Color;
ColorRep: TYPE ~ ImagerColorES.ColorRep;
Context: TYPE ~ Imager.Context;
directComplement: INTEGER ~ ProtoPalette.directComplement;
Font: TYPE ~ ImagerFont.Font;
Harmony: TYPE ~ ProtoPalette.Harmony;
Hue: TYPE ~ ProtoPalette.Hue;     -- [-3 .. 4];
IsoHueVariation: TYPE ~ ProtoPalette.IsoHueVariation;

```
LAB: TYPE ~ ProtoPalette.LAB:      -- REF CIELAB ← NIL:
LCH: TYPE ~ ProtoPalette.LCH:      -- RECORD [lStar. c h: REAL]:
leftTriadicComplement: INTEGER ~ ProtoPalette.leftTriadicComplement:
centerHue: INTEGER ~ ProtoPalette.centerHue:
MenuEntry: TYPE ~ Menus.MenuEntry:
Palette: TYPE ~ ProtoPalette.Palette:
OpConstantColor: TYPE ~ ImagerColorES.OpConstantColor:
Rectangle: TYPE ~ Imager.Rectangle:       -- RECORD [x y. w, h: REAL]
rightTriadicComplement: INTEGER ~ ProtoPalette.rightTriadicComplement:
RGB: TYPE ~ ImagerColorES.RGB:
ROPE: TYPE ~ Rope.ROPE:
STREAM: TYPE ~ IO.STREAM:
Trajectory: TYPE ~ ImagerPath.Trajectory:
Transformation: TYPE ~ ImagerTransformation.Transformation:
ValueAndChroma: TYPE ~ ProtoPalette.ValueAndChroma:
values: INTEGER ~ ProtoPalette.values:
VEC: TYPE ~ Imager.VEC:
```

Local types and variables

```
fieldWidth: REAL ← 155.3452;       emptyAtom: ATOM ~ Atom.EmptyAtom[];
regularFace: Font ← ImagerFont.Find ["Xerox/PressFonts/Modern-MRR",
        substituteQuietly];
boldFace: Font ← ImagerFont.Find ["Xerox/PressFonts/Modern-BRR", substituteQuietly];
italicFace: Font ← ImagerFont.Find ["Xerox/PressFonts/Modern-MIR", substituteQuietly];

historySize: CARDINAL ~ 50;
History: TYPE ~ RECORD [index: CARDINAL, entry: ARRAY [0 .. historySize) OF Palette];
Wash: TYPE ~ REF WashRep;       washItems: INTEGER ~ 100;
WashRep: TYPE ~ ARRAY [0 .. washItems) OF LAB;
SelectionProto: TYPE ~ REF SelectionProtoRep ← NIL;       -- NIL means no selection
SelectionProtoRep: TYPE ~ RECORD [hue: Hue, variant: ValueAndChroma];
ChangeListProto: TYPE ~ LIST OF Hue;
SelectionDigital: TYPE ~ REF SelectionDigitalRep ← NIL;   -- NIL means no selection
SelectionDigitalRep: TYPE ~ RECORD [ch: ChannelValue, left, middle, right: LAB ← NIL];
ProtoPaletteData: TYPE ~ REF ProtoPaletteDataRep;
ProtoPaletteDataRep: TYPE ~ RECORD [palette: Palette, selection: SelectionProto];
DigitalPaletteData: TYPE ~ REF DigitalPaletteDataRep;
DigitalPaletteDataRep: TYPE ~ RECORD [palette: CL wash: Wash ← NIL, washCache: ARRAY [0
        .. washItems) OF Color, selection: SelectionDigital ← NIL, power: CARDINAL ← 0];

State: TYPE ~ REF StateRec;
StateRec: TYPE ~ RECORD [
        paletteAndSel: REF ANY,  -- either ProtoPaletteData or DigitalPaletteData
        name, comment: ROPE,
        history: History, historyViewer: Viewer, lastInput: ROPE ← NIL,
        colors: ColorCache, subMap: ChannelValue,
        boundingBox, window: Rectangle,
        translation, titlePosition: VEC,    -- initialization imporant for caches
        scale, titleSize: REAL,
```

```
. bottomSB, rightSB: INTEGER ← 100,        -- caches: initialization important
  topSB, leftSB: INTEGER ← 0.              -- caches: initialization important
  resetPainting: BOOL ← TRUE,              -- initialization important for caches
  background: Color ← gray,
  abort: REF BOOL,
  verbose: BOOL ← FALSE,
  menuLine: MenuEntry,
  clientData: Properties.PropList ← NIL];
allStates: LIST OF State ← NIL;     stateCount: CARDINAL ← 0;
lastSelection: RECORD [r, g, b: ColorValue] ← [0, 0, 0];

break: SIGNAL -- CODE;               -- for debugging
trace: BOOL ← FALSE;      speak: BOOL ← FALSE;
lastViewer: Viewer;
lastWDir: ROPE ← NIL;     -- FSExtras.GetWDir does not always work Proto: PROC [state: State] RETURNS [ProtoPaletteData] ~ INLINE BEGIN
    RETURN [NARROW [state.paletteAndSel, ProtoPaletteData]]
    END;   -- Proto Digi: PROC [state: State] RETURNS [DigitalPaletteData] ~ INLINE BEGIN
    RETURN [NARROW [state.paletteAndSel, DigitalPaletteData]]
    END;   -- Digi
```

Interfaces

```
CreateViewer: PUBLIC PROC [name: ROPE, keyColor: ATOM, column: Column ← color]
        RETURNS [viewer: Viewer] ~ BEGIN
    Initializes a viewer. The state information is in the data field of the viewer. If the key color is
    empty then a digital palette is assumed, otherwise a proto-palette.
    state: State ~ NEW [StateRec];

FindNamedViewer: ViewerOps.EnumProc ~ BEGIN
        IF (v.class.flavor = wheel) OR (v.class.flavor = list) THEN BEGIN
           state: State ← NARROW [v.data];
           IF state.name.Equal [name] THEN BEGIN
              IF v.iconic THEN ViewerOps.OpenIcon [v];  ViewerOps.BlinkViewer [v];
              viewer ← v;        RETURN [FALSE]
              END
           END
        END;   -- FindNamedViewer FOR s: LIST OF State ← allStates, s.rest WHILE s # NIL DO
        IF (s.first # NIL) AND name.Equal [s.first.name] THEN
           { ViewerOps.EnumerateViewers [FindNamedViewer];       RETURN}
        ENDLOOP;

BEGIN OPEN state:
        subMap ← NewSubMap [];        abort ← NEW [BOOL ← FALSE];
        scale ← 1.0;     titleSize ← 10;
        IF (keyColor = emptyAtom) THEN BEGIN
```

```
            boundingBox ← [x: -5.0, y: -65.0, w: 105.0, h: 95.0];
            window ← [x: 0.0, y: -60.0, w: 90.0, h: 90.0];
            translation ← [x: 0.0, y: -50.0];      titlePosition ← [x: 20.0, y: 40.0]
            END
        ELSE BEGIN
            boundingBox ← [x: -115.0, y: -115.0, w: 230.0, h: 230.0];
            window ← [x: -110.0, y: -110.0, w: 220.0, h: 255.0];
            translation ← [x: 80.0, y: 110.0];     titlePosition ← [x: 20.0, y: 240.0]
            END
        END;
    state.name ← name;

allStates ← CONS [state, allStates];  stateCount ← stateCount.SUCC;
    viewer ← InitializeViewer [column, state, keyColor]
    END;    -- CreateViewer PutClientData: PUBLIC PROC [viewer: Viewer, type: ATOM, val: REF ← NIL] ~ BEGIN
    Allows one to add client data to the palette associated to a particular viewer.
    state: State ~ NARROW [viewer.data];
    state.clientData ← state.clientData.PutProp [type, val]
    END;    -- PutClientData GetClientData: PUBLIC PROC [viewer: Viewer, type: ATOM] RETURNS [REF] ~ BEGIN
    state: State ~ NARROW [viewer.data];
    RETURN [state.clientData.GetProp [type]]
    END;    -- GetClientData
```

Color Map & Global State

```
ColorValue: TYPE ~ Terminal.ColorValue;    -- [0..256)
ChannelValue: TYPE ~ Terminal.ChannelValue;    -- [0..256)
transferChannel: ChannelValue ~ 128;
hueOffset: INTEGER ~ Hue.FIRST;  lastHue: INTEGER ~ Hue.LAST;
vacOffset: INTEGER ~ ValueAndChroma.FIRST;   lastVac: INTEGER ~
        ValueAndChroma.LAST;
hues: INTEGER ~ lastHue - hueOffset + 1;  vacs: INTEGER ~ lastVac - vacOffset + 1;
nrEntries: INTEGER ~ hues * vacs;
SubMap: TYPE ~ RECORD [free: BOOL, firstEntry: ChannelValue];
subMaps: ChannelValue ~ 2;     subMapNIL: ChannelValue ~ 0;
subMap: ARRAY [0 .. subMaps] OF SubMap;
ColorCache: TYPE ~ ARRAY [0 .. nrEntries] OF Color ← ALL [NIL];
colorMapNotifier: ImagerColorMap.NotifierRep;

InitSubMaps: PROC ~ BEGIN
    To my knowledge, the reserved entries are 0 - 62: Imager, 128: ColorTool 63 - 192:
    ColorGlue.
        gr: ImagerColorES.ConstantColor ~ Imager.MakeGray [0.7];  -- as in the OSA Color
            System
    subMap [0] ← [FALSE, 0];    -- no color map
    subMap[1] ← [TRUE, transferChannel + 1];  -- 129 .. 201
```

```
subMap[2] ← [TRUE, transferChannel - 1 - nrEntries];            -- 55 - 127 constantGray ← gr;       grayCh ← 202;
gray ← ImagerDitherContext.MakeSpecialColor [ordinaryColor: gr, specialPixel: [grayCh,
        null], name: "gray"];
IF Is8bit [] THEN SetColorMapEntry [grayCh, gray];
colorMapNotifier ← [NoteDisplayChangedTo8Bit, NIL]
END;    -- InitSubMaps NewSubMap: PROC RETURNS [map: ChannelValue] ~ BEGIN
    FOR i: [1 .. subMaps] IN [1 .. subMaps] DO
        IF subMap[i].free THEN {subMap[i].free ← FALSE; RETURN [i]}
    ENDLOOP;
    RETURN [subMapNIL]
END;    -- NewSubMap DisposeSubMap: PROC [map: ChannelValue] ~ BEGIN
    IF (map # subMapNIL) THEN subMap[map].free ← TRUE;
END;    -- DisposeSubMap ColorMapIndex: PROC [firstEntry: ChannelValue, i: Hue, j: ValueAndChroma] RETURNS
        [ChannelValue] ~ BEGIN
    Computes a color map index (= channel value) for a given color in the palette.
    RETURN [firstEntry + ((i - hueOffset) * vacs) + (j - vacOffset)]
END;    -- ColorMapIndex UnstructuredColorMapIndex: PROC [firstEntry: ChannelValue, i: CARDINAL] RETURNS
        [ChannelValue] ~ BEGIN
    Computes a color map index (= channel value) for the i-th one-relative color in the color list.
    RETURN [firstEntry + i - 1]
END;    -- UnstructuredColorMapIndex Is8bit: PROC RETURNS [BOOL] ~ BEGIN
    Retuns true if the terminal is in 8 bit mode.
    t: Terminal.Virtual ← Terminal.Current[];
    mode: Terminal.ColorMode ← Terminal.GetColorMode [t];
    RETURN [(Terminal.GetColorBitmapState[t] # none) AND (NOT mode.full) AND
            (mode.bitsPerPixelChannelA = 8)]
END;    -- Is8bit MakeColor: PROC [firstEntry: ChannelValue, lab: LAB, i: Hue, j: ValueAndChroma] RETURNS
        [Color] ~ BEGIN
    If the terminal is in 8 bit mode it returns a special color pointing to the appropriate color map
    entry; otherwise it returns a constant color.
    RETURN [ImagerDitherContext.MakeSpecialColor [ordinaryColor: ColorFromLAB [lab],
            specialPixel: [ColorMapIndex [firstEntry, i, j], null], name: "ProtoPalette"]]
END;    -- MakeColor MakeUnstructuredColor: PROC [firstEntry: ChannelValue, lab: LAB, i: CARDINAL] RETURNS
        [Color] ~ BEGIN
    If the terminal is in 8 bit mode it returns a special color pointing to the appropriate color map
``` entry. otherwise it returns a constant color.
RETURN [ImagerDitherContext.MakeSpecialColor [ordinaryColor: ColorFromLAB [lab],
    specialPixel: [UnstructuredColorMapIndex [firstEntry, i], null], name:
    "DigiPalette"]]
END;   -- MakeUnstructuredColor SetColorMapEntry: PROC [ch: ChannelValue, color: Color] ~ BEGIN
*Assume terminal is in 8 bit mode.*
t: Terminal.Virtual ~ Terminal.Current[];
rgb: RGB ~ ImagerColorES.RGBFromColor [color];
gamma: REAL ~ ImagerColorMap.GetGamma [Terminal.Current[]];
Terminal.SetColor [vt: t, aChannelValue: ch, bChannelValue: 0,
        red: ImagerColorMap.ApplyGamma [rgb.R, gamma],
        green: ImagerColorMap.ApplyGamma [rgb.G, gamma],
        blue: ImagerColorMap.ApplyGamma [rgb.B, gamma]]
END;   -- SetColorMapEntry NoteNewColor: PROC [state: State, i: Hue, j: ValueAndChroma] ~ BEGIN
*Updates the color cache and if there is one, the color map.*
color: LAB ~ Proto[state].palette.colors[i][j];
IF (color = NIL) THEN state.colors[ColorMapIndex[0, i, j]] ← NIL
ELSE BEGIN
    first: ChannelValue ~ subMap[state.subMap].firstEntry;
    state.colors[ColorMapIndex [0, i, j]] ← MakeColor [first, color, i, j];
    IF Is8bit [] THEN
        SetColorMapEntry [ColorMapIndex [first, i, j], state.colors[ColorMapIndex [0, i, j]]]
    END
END;   -- NoteNewColor NoteNewUnstructuredColor: PROC [state: State, color: LAB, i: CARDINAL] ~ BEGIN
*Updates the color cache and if there is one, the color map.*
IF (i > nrEntries) THEN ERROR;   -- too many colors
IF (color = NIL) THEN state.colors[UnstructuredColorMapIndex[0, i]] ← NIL
ELSE BEGIN
    first: ChannelValue ~ subMap[state.subMap].firstEntry;
    state.colors[UnstructuredColorMapIndex[0, i]] ← MakeUnstructuredColor [first, color,
            i];
    IF Is8bit [] THEN
        SetColorMapEntry [UnstructuredColorMapIndex [first, i],
                state.colors[UnstructuredColorMapIndex [0, i]]]
    END
END;   -- NoteNewUnstructuredColor NoteDisplayChangedTo8Bit: PUBLIC PROC [data: REF] ~ BEGIN
*If the display is changed from full color to 8 bit color, the color map must be set.*
IF (NOT Is8bit []) THEN RETURN;
SetColorMapEntry [grayCh, gray];
FOR sl: LIST OF State ← allStates, sl.rest WHILE sl # NIL DO
    IF (sl.first.subMap = subMapNIL) THEN LOOP;
    FOR i: ChannelValue IN [1 .. nrEntries] DO

```
        IF (sl.firstcolors[i] = NIL) THEN LOOP:
        SetColorMapEntry [subMap[sl.firstsubMap].firstEntry + i, sl.firstcolors[i]]
      ENDLOOP
    ENDLOOP
  END;  -- NoteDisplayChangedTo8Bit TransferSelectedColor: PROC [state: State, rgb: RGB] ~ BEGIN
  puts selected color in transfer channel for color tool.
  t: Terminal.Virtual ~ Terminal.Current[];
  gamma: REAL ~ ImagerColorMap.GetGamma [t];
  ColorTool.SetRGBValue [[rgb.R, rgb.G, rgb.B] ! RuntimeError.UnboundProcedure =>
        CONTINUE; ColorTool.NoColorToolViewer => CONTINUE];
  IF Is8bit [] THEN BEGIN
    r, g, b: ColorValue ← 0;   ch: ChannelValue;        selection: BOOL;
    WITH state.paletteAndSel SELECT FROM
      proto: ProtoPaletteData => BEGIN
        selection ← proto.selection # NIL;
        IF selection THEN ch ← ColorMapIndex [state.subMap, proto.selection.hue,
              proto.selection.variant]
        END;
      digi: DigitalPaletteData => BEGIN
        selection ← (digi.selection # NIL) AND (digi.selection.middle # NIL);
        IF selection THEN ch ← UnstructuredColorMapIndex [state.subMap,
              digi.selection.ch]
        END;
      ENDCASE => ERROR;
    IF selection THEN [r, g, b] ← Terminal.GetColor [t, ch, 0];
    lastSelection ← [r, g, b];   Terminal.SetColor [t, transferChannel, 0, r, g, b]
    END
  ELSE lastSelection ← [ImagerColorMap.ApplyGamma [rgb.R, gamma],
        ImagerColorMap.ApplyGamma [rgb.G, gamma],
        ImagerColorMap.ApplyGamma [rgb.B, gamma]]
  END;  -- TransferSelectedColor GetLastSelection: PROC RETURNS [LAB] ~ BEGIN
  gamma: REAL ~ ImagerColorMap.GetGamma [Terminal.Current[]];
  r, g, b: ColorValue;      rgb: RGB;       badLuck: BOOL ← FALSE;
  [rgb.R, rgb.G, rgb.B] ← ColorTool.GetRGBValue [! RuntimeError.UnboundProcedure,
        ColorTool.NoColorToolViewer => {badLuck ← TRUE; CONTINUE}];
  IF badLuck THEN BEGIN
    IF Is8bit [] THEN [r, g, b] ← Terminal.GetColor [Terminal.Current[], transferChannel, 0]
    ELSE [r, g, b] ← lastSelection;
    rgb.R ← ImagerColorMap.ApplyGammaInverse [r, gamma];
    rgb.G ← ImagerColorMap.ApplyGammaInverse [g, gamma];
    rgb.B ← ImagerColorMap.ApplyGammaInverse [b, gamma]
    END;
  RETURN [NEW [CIELAB ← ImagerColorES.CIELABFromXYZ
        [ImagerColorES.XYZFromXeroxRGB [rgb], [0,0,0]]]]
  END;  -- GetLastSelection
```

Colours and Palettes

```
black: Color ~ ImagerColorES.FindColor ["Xerox/Solid/Black"];
white: Color ~ ImagerColorES.FindColor ["Xerox/Solid/White"];
gray, constantGray: Color;        grayCh: ChannelValue;
cyan: Color ~ ImagerColorES.FindColor ["Xerox/Solid/Cyan"];
magenta: Color ~ ImagerColorES.FindColor ["Xerox/Solid/Magenta"];
yellow: Color ~ ImagerColorES.FindColor ["Xerox/Solid/Yellow"];
red: Color ~ ImagerColorES.FindColor ["Xerox/Solid/Red"];
green: Color ~ ImagerColorES.FindColor ["Xerox/Solid/Green"];
blue: Color ~ ImagerColorES.FindColor ["Xerox/Solid/Blue"];
labLinear: ImagerColorES.ColorOperator ~ ImagerColorES.NewColorOperatorCIELAB
        [NIL];

ColorFromLAB: PROC [lab: LAB] RETURNS [OpConstantColor] ~ BEGIN
    args: ImagerColorES.CIELABArgs;
    l: REAL ~ MAX [MIN [lab.lStar, 100], 0];
    a: REAL ~ MAX [MIN [lab.aStar, 500], -500];
    b: REAL ~ MAX [MIN [lab.bStar, 200], -200];
    color: OpConstantColor ~ NEW [ColorRep.constantOp[3]];
    color.colorOperator ← labLinear;
    args ← NARROW [color.colorOperator.data, ImagerColorES.CIELABArgs];
    color.pixel[0] ← Round [args.sblack + (args.swhite-args.sblack) * l / 100.0];
    color.pixel[1] ← Round [args.sneutral + args.srange * a];
    color.pixel[2] ← Round [args.sneutral + args.srange * b];
    RETURN [color]
    END;   -- ColorFromLAB ToRGB: PROC [color: LAB] RETURNS [RGB] ~ BEGIN
    rgb: RGB;
    IF (color = NIL) THEN RETURN [[0, 0, 0]];
    rgb ← ImagerColorES.XeroxRGBFromXYZ
            [ImagerColorES.XYZFromCIELAB[color,[0,0,0]]];
    rgb ← [MAX [MIN [rgb.R, 1], 0], MAX [MIN [rgb.G, 1], 0], MAX [MIN [rgb.B, 1], 0]];
    RETURN [rgb]
    END;   -- ToRGB ColorName: PROC [color: LAB] RETURNS [ROPE] ~ BEGIN
    Insulates the naming procedure, which might change in the near future.
    rgb: RGB ~ ToRGB [color];
    IF (color = NIL) THEN RETURN [NIL];
    RETURN [NamedColors.HSLToRope [ImagerColorFns.HSLFromRGB [[rgb.R, rgb.G,
        rgb.B]]]]
    END;   -- ColorName LoadPalette: PROC [state: State, keyColor: ATOM] ~ BEGIN
    Tries to load from the database; if not successful creates a new palette.
    errorDesc: PaletteIO.ErrorDesc;
    BEGIN
        ENABLE {PaletteIO.Error => {errorDesc ← error; GOTO fileError}};
```

```
IF (keyColor = emptyAtom) THEN BEGIN
    state.paletteAndSel ← NEW [DigitalPaletteDataRep];
    Digi[state].palette ← PaletteIO.ReadColorList [state.name];
    IF (Digi[state].palette = NIL) THEN BEGIN
        PutHistoryLine [state, "Could not find palette. Creating empty palette."];
        Digi[state].palette ← NIL; state.comment ← NIL
        END
    END
ELSE BEGIN
    state.paletteAndSel ← NEW [ProtoPaletteDataRep];
    Proto[state].palette ← PaletteIO.ReadProtoPalette [state.name];
    IF (Proto[state].palette = NIL) THEN BEGIN
        PutHistoryLine [state, "Could not find palette. Creating new palette."];
        Proto[state].palette ← ProtoPalette.CreatePalette [keyColor];
        state.comment ← NIL
        END
    ELSE IF (Proto[state].palette.keyColor # keyColor) THEN PutHistoryLine [state,
            "Warning: palette based on different key color than expected."];
    END;
WITH state.paletteAndSel SELECT FROM
    pp: ProtoPaletteData => FOR i: Hue IN Hue DO
        FOR j: ValueAndChroma IN ValueAndChroma DO NoteNewColor [state, i, j]
            ENDLOOP;
        ENDLOOP;
    dp: DigitalPaletteData => FOR l: CL ← dp.palette, l.rest WHILE l # NIL DO
        dp.power ← dp.power.SUCC; NoteNewUnstructuredColor [state, l.first,
            dp.power]
        ENDLOOP;
    ENDCASE => NULL;    -- no palette
state.comment ← PaletteIO.PaletteInfo [state.name].comment;
PutHistoryLine [state, state.comment];
EXITS
    fileError => BEGIN
        msg: ROPE;
        SELECT errorDesc.code FROM
            $noDB => msg ← "Could not find database.";
            $wrongFromat => msg ← "There already is a palette with such a name but it
                is in a different format.";
            ENDCASE => msg ← errorDesc.explanation;
        PutHistoryLine [state, msg]
        END
    END
END;    -- LoadPalette LABToLCHRope: PROC [lab: LAB] RETURNS [ROPE] ~ BEGIN
    lch: LCH ~ ProtoPalette.Cylindrical [lab];
    RETURN [IO.PutFR ["[L: %5.1f, C: %5.1f, H: %5.1f]", IO.real [lch.lStar], IO.real [lch.c], IO.real
        [lch.h]]]
    END;    -- LABToLCHRope
```

```
AddToList: PROC [color: LAB, list: DigitalPaletteData, state: State] RETURNS
        [DigitalPaletteData] = BEGIN
    Adds a new color to the color list and updates the color map cache
    IF (list.palette = NIL) THEN BEGIN
        list.palette ← LIST [color]; NoteNewUnstructuredColor [state, color, 1]
        END
    ELSE IF (list.palette.first = NIL) THEN BEGIN
        We want to be efficient if the user tries to find a new color to add to a palette. We do not
        try to insert it in the middle of the palette because it would make it harder for the user to
        find the new color.
        list.palette.first ← color; NoteNewUnstructuredColor [state, color, 1]
        END
    ELSE BEGIN
        list.palette ← CONS [color, list.palette];
        Because we add the new color in front of the palette, we have to rebuild the colors.
        list.power ← 0;  -- we use it as an index
        FOR l: CL ← list.pale~~ l.rest WHILE l # NIL DO
            list.power ← list.power.SLCC; NoteNewUnstructuredColor [state, l.first, list.power]
            ENDLOOP;
        list.selection.ch ← list.power
        END;
    RETURN [list]
    END;  -- AddToList
```

Graphics

Speed or beauty? Originally I drew the interior of the swatches and then drew a border around the one that is selected. Everything looked nice, but on the Dorado the routine for drawing a trajectory was slow. To make a flashy video tape, Michael Plass and Maureen Stone proposed to draw the polygons twice in two different sizes to make the border. Unfortunately, due to rounding the border no longer has a uniform thickness. When machines will be sufficiently fast, I propose to revert to the old method of explicitly drawing a border.

```
swatchSize: REAL ← 10;    -- in mm
swatchSize2: REAL ← swatchSize * 1.2;    -- in mm
outlineSize: REAL ← 1.1;   -- in mm
rectangle: Rectangle ← [-swatchSize/2.0, -swatchSize/2.0, swatchSize, swatchSize];
hexagon: ARRAY [0 .. 5] OF VEC ← [[swatchSize2/2.0, 0], [swatchSize2/4.0, swatchSize2/2.0],
    [-swatchSize2/4.0, swatchSize2/2.0], [-swatchSize2/2.0, 0], [-swatchSize2/4.0,
    -swatchSize2/2.0], [swatchSize2/4.0, -swatchSize2/2.0]];
octagon: ARRAY [0 .. 7] OF VEC ← [[0.5*swatchSize2, 0], [swatchSize2/3.0, swatchSize2/3.0], [0,
    swatchSize2/2.0], [-swatchSize2/3.0, swatchSize2/3.0], [-swatchSize2/2.0, 0],
    [-swatchSize2/3.0, -swatchSize2/3.0], [0, -swatchSize2/2.0], [swatchSize2/3.0,
    -swatchSize2/3.0]];
keyColorPos: ARRAY Hue OF VEC;
variantColorPos: ARRAY ValueAndChroma OF VEC;

swatchSize: REAL ← 10;   swatchSize2: REAL ← swatchSize * 1.2;    -- in mm
outlineSize: REAL ← 1.1;  overhang: REAL ← 5;    -- in mm
```

```
potoSwatch, potoSwatch2, exoSwatch, exoSwatch2: REAL;
potoRectangle, exoRectangle: Rectangle;
potoHexagon, exoHexagon: ARRAY [0 .. 5] OF VEC;
potOctagon, exOctagon: ARRAY [0 .. 7] OF VEC ;
keyColorPos: ARRAY Hue OF VEC;
variantColorPos: ARRAY ValueAndChroma OF VEC;
video: BOOL ← FALSE;    videoMag: REAL ← 4.0;

InitSwatches: PROC [] ~ BEGIN
    IF video THEN swatchSize ← swatchSize * videoMag;
    swatchSize2 ← swatchSize * 1.2;
    potoSwatch ← swatchSize - overhang / 2.0;
    potoSwatch2 ← swatchSize2 - overhang / 2.0;
    exoSwatch ← potoSwatch + overhang / 2.0;
    exoSwatch2 ← potoSwatch2 + overhang / 2.0;
    potoRectangle ← [-potoSwatch/2.0, -potoSwatch/2.0, potoSwatch, potoSwatch];
    exoRectangle ← [-exoSwatch/2.0, -exoSwatch/2.0, exoSwatch, exoSwatch];
    potoHexagon ← [[potoSwatch2/2.0, 0], [potoSwatch2/4.0, potoSwatch2/2.0],
            [-potoSwatch2/4.0, potoSwatch2/2.0], [-potoSwatch2/2.0, 0], [-potoSwatch2/4.0,
            -potoSwatch2/2.0], [potoSwatch2/4.0, -potoSwatch2/2.0]];
    exoHexagon ← [[exoSwatch2/2.0, 0], [exoSwatch2/4.0, exoSwatch2/2.0], [-exoSwatch2/4.0,
            exoSwatch2/2.0], [-exoSwatch2/2.0, 0], [-exoSwatch2/4.0, -exoSwatch2/2.0],
            [exoSwatch2/4.0, -exoSwatch2/2.0]];
    potOctagon ← [[0.5*potoSwatch2, 0], [potoSwatch2/3.0, potoSwatch2/3.0], [0,
            potoSwatch2/2.0], [-potoSwatch2/3.0, potoSwatch2/3.0], [-potoSwatch2/2.0, 0],
            [-potoSwatch2/3.0, -potoSwatch2/3.0], [0, -potoSwatch2/2.0], [potoSwatch2/3.0,
            -potoSwatch2/3.0]];
    exOctagon ← [[0.5*exoSwatch2, 0], [exoSwatch2/3.0, exoSwatch2/3.0], [0, exoSwatch2/2.0],
            [-exoSwatch2/3.0, exoSwatch2/3.0], [-exoSwatch2/2.0, 0], [-exoSwatch2/3.0,
            -exoSwatch2/3.0], [0, -exoSwatch2/2.0], [exoSwatch2/3.0, -exoSwatch2/3.0]];
    IF video THEN swatchSize ← swatchSize / videoMag
    END;   -- DrawRectangle DrawRectangle: PROC [context: Context, p: VEC, interior: BOOL] ~ BEGIN
    IF interior THEN context.MaskRectangle [[p.x + potoRectangle.x, p.y + potoRectangle.y,
            potoRectangle.w, potoRectangle.h]]
    ELSE context.MaskRectangle [[p.x + exoRectangle.x, p.y + exoRectangle.y, exoRectangle.w,
            exoRectangle.h]]
    END;   -- DrawRectangle DrawHexagon: PROC [context: Context, p: VEC, interior: BOOL] ~ BEGIN
    t: Trajectory;
    IF interior THEN BEGIN
        t ← ImagerPath.MoveTo [[p.x + potoHexagon[0].x, p.y + potoHexagon[0].y]];
        FOR i: [0 .. 5] IN [1 .. 5] DO
            t ← t.LineTo [[p.x + potoHexagon[i].x, p.y + potoHexagon[i].y]]
            ENDLOOP
        END
    ELSE BEGIN
        t ← ImagerPath.MoveTo [[p.x + exoHexagon[0].x, p.y + exoHexagon[0].y]];
```

```
        FOR i: [0..5] IN [1..5] DO
            t ← LLineTo [[p.x + exoHexagon[i].x, p.y + exoHexagon[i].y]]
            ENDLOOP
        END;
    context.MaskFillTrajectory [t]
    END;     -- DrawHexagon DrawOctagon: PROC [context: Context, p: VEC, interior: BOOL] ~ BEGIN
    t: Trajectory;
    IF interior THEN BEGIN
        t ← ImagerPath.MoveTo [[p.x + potOctagon[0].x, p.y + potOctagon[0].y]];
        FOR i: [0..7] IN [1..7] DO
            t ← LLineTo [[p.x + potOctagon[i].x, p.y + potOctagon[i].y]]
            ENDLOOP
        END
    ELSE BEGIN
        t ← ImagerPath.MoveTo [[p.x + exOctagon[0].x, p.y + exOctagon[0].y]];
        FOR i: [0..7] IN [1..7] DO
            t ← LLineTo [[p.x + exOctagon[i].x, p.y + exOctagon[i].y]]
            ENDLOOP
        END;
    context.MaskFillTrajectory [t]
    END;     -- DrawOctagon
```

*DrawRectangle: PROC [context: Context, p: VEC] ~ BEGIN*
  *context.MaskRectangle [[p.x + rectangle.x, p.y + rectangle.y, rectangle.w, rectangle.h]]*
  *END;     -- DrawRectangle*

*DrawHexagon: PROC [context: Context, p: VEC] ~ BEGIN*
  *t: Trajectory ← ImagerPath.MoveTo [[p.x + hexagon[0].x, p.y + hexagon[0].y]];*
  *FOR i: [0..5] IN [1..5] DO*
     *t ← LLineTo [[p.x + hexagon[i].x, p.y + hexagon[i].y]]*
     *ENDLOOP;*
  *context.MaskFillTrajectory [t]*
  *END;     -- DrawHexagon*

*DrawOctagon: PROC [context: Context, p: VEC] ~ BEGIN*
  *t: Trajectory ← ImagerPath.MoveTo [[p.x + octagon[0].x, p.y + octagon[0].y]];*
  *FOR i: [0..7] IN [1..7] DO*
     *t ← LLineTo [[p.x + octagon[i].x, p.y + octagon[i].y]]*
     *ENDLOOP;*
  *context.MaskFillTrajectory [t]*
  *END;     -- DrawOctagon*

*OutlineRectangle: PROC [context: Context, p: VEC] ~ BEGIN*
  *Outlines a rectangle in the opponent color.*
  *r: Rectangle ~ [p.x + rectangle.x, p.y + rectangle.y, rectangle.w, rectangle.h];*
  *context.MaskVector [[r.x, r.y], [r.x + r.w, r.y]];            -- South*
  *context.MaskVector [[r.x + r.w, r.y], [r.x + r.w, r.y + r.h]];    -- East*
  *context.MaskVector [[r.x + r.w, r.y + r.h], [r.x, r.y + r.h]];    -- North* contextMaskVector[[r.x, r.y + r.h], [r.x, r.y]]  -- West
END:  -- OutlineRectangle OutlineHexagon: PROC [context: Context, p: VEC] ~ BEGIN
    t: Trajectory ← ImagerPath.MoveTo [[p.x + hexagon[0].x, p.y + hexagon[0].y]];
    FOR i: [0..5] IN [1..5] DO
        t ← t.LineTo [[p.x + hexagon[i].x, p.y + hexagon[i].y]]
    ENDLOOP;
    context.MaskStrokeTrajectory [t, TRUE]
END;  -- OutlineHexagon OutlineOctagon: PROC [context: Context, p: VEC] ~ BEGIN
    t: Trajectory ← ImagerPath.MoveTo [[p.x + octagon[0].x, p.y + octagon[0].y]];
    FOR i: [0..7] IN [1..7] DO
        t ← t.LineTo [[p.x + octagon[i].x, p.y + octagon[i].y]]
    ENDLOOP;
    context.MaskStrokeTrajectory [t, TRUE]
END;  -- OutlineOctagon DrawPalette: PROC [context: Context, state: State, ip: BOOL ← FALSE, changes: REF ANY] ~
    BEGIN
    palette: Palette ← Proto[state].palette;    selected: LAB;

OutlineColor: PROC [h: Hue, i: ValueAndChroma, interior: Color] RETURNS [Color] ~
        BEGIN
        IF (Proto[state].selection = NIL) OR (Proto[state].selection.hue # h) OR
                (Proto[state].selection.variant # i) THEN RETURN [interior]
        ELSE BEGIN
            outlineColor: Color;
            IF (ABS[selected.aStar] < 10) AND (ABS[selected.bStar] < 10) THEN outlineColor ←
                white
            ELSE BEGIN
                lch: LCH ← ProtoPalette.Cylindrical [selected];
                lch.lStar ← 100 - lch.lStar;          lch.h ← lch.h + 180;
                IF lch.h > 360 THEN lch.h ← lch.h - 360;
                outlineColor ← ColorFromLAB [ProtoPalette.Cartesian[lch]]
            END;
            RETURN [outlineColor]
        END
    END;  -- OutlineColor DrawHueVariants: PROC [h: Hue, p: VEC] ~ BEGIN
        variant: IsoHueVariation ← palette.colors[h];
        color: Color;   pos: VEC;
        FOR i: ValueAndChroma IN [-(values + chromata)..0) DO
            IF (variant[i] = NIL) THEN color ← IF ip THEN constantGray ELSE state.background
            ELSE color ← IF ip THEN ColorFromLAB [variant[i]] ELSE
                    state.colors[ColorMapIndex[0, h, i]];
            pos ← [p.x + variantColorPos[i].x, p.y + variantColorPos[i].y];
            context.SetColor [OutlineColor [h, i, color]];  DrawRectangle [context, pos, FALSE];
            context.SetColor [color];  DrawRectangle [context, pos, TRUE]

```
        ENDLOOP;
    IF (variant[0] = NIL) THEN color ← IF ip THEN constantGray ELSE state.background
    ELSE color ← IF ip THEN ColorFromLAB [variant[0]] ELSE state.colors[ColorMapIndex[0,
                 h, 0]];
    contextSetColor [OutlineColor [h, 0, color]];
    IF (h = centerHue) THEN DrawOctagon [context, p, FALSE] ELSE DrawHexagon
                 [context, p, FALSE];
    contextSetColor [color];
    IF (h = centerHue) THEN DrawOctagon [context, p, TRUE] ELSE DrawHexagon [context,
                 p, TRUE];
    FOR i: ValueAndChroma IN (0 .. chromata + values] DO
        IF (variant[i] = NIL) THEN color ← IF ip THEN constantGray ELSE state.background
        ELSE color ← IF ip THEN ColorFromLAB [variant[i]] ELSE
                 state.colors[ColorMapIndex[0, h, i]];
        pos ← [p.x + variantColorPos[i].x, p.y + variantColorPos[i].y];
        contextSetColor [OutlineColor [h, i, color]]; DrawRectangle [context, pos, FALSE];
        contextSetColor [color];   DrawRectangle [context, pos, TRUE]
        ENDLOOP
    END;    -- DrawHueVariants DrawVideoHueVariants: PROC [h: Hue, p: VEC] ~ BEGIN
    color: Color;
    IF (palette.colors[h][0] = NIL) THEN color ← IF ip THEN constantGray ELSE
                 state.background
    ELSE color ← IF ip THEN ColorFromLAB [palette.colors[h][0]] ELSE
                 state.colors[ColorMapIndex[0, h, 0]];
    contextSetColor [color];
    IF (h = centerHue) THEN DrawOctagon [context, p, FALSE] ELSE DrawHexagon
                 [context, p, FALSE]
    END;    -- DrawVideoHueVariants IF (palette = NIL) THEN ImportantMessage ["No palette"]
ELSE BEGIN
    IF video THEN FOR i: Hue IN Hue DO DrawVideoHueVariants [i, keyColorPos[i]]
        ENDLOOP
    ELSE BEGIN
        IF (Proto[state].selection # NIL) THEN selected ←
                 palette.colors[Proto[state].selection.hue][Proto[state].selection.variant];
        WITH changes SELECT FROM
            c: ChangeListProto => FOR l: ChangeListProto ← c, l.rest WHILE l # NIL DO
                DrawHueVariants [l.first, keyColorPos[l.first]]
                ENDLOOP;
            ENDCASE => FOR i: Hue IN Hue DO DrawHueVariants [i, keyColorPos[i]]
                ENDLOOP
        END
    END
END;    -- DrawPalette
```

*Measures are in millimeters. Numbers are such that hitting is fast.*
```
    washHeight: INT ~ 30;   washWidth: INT ~ 90;
    washItemWidth: REAL ~ Float [washWidth] / Float [washItems];
``` rectHeight: INT ← 20;    rectWidth, rectSpacing: INT ← 10;

DrawList: PROC [context: Context, state: State, ip: BOOL ← FALSE, changes: REF ANY] ~ BEGIN
    count: CARDINAL ← 0;    palette: CL ~ Digi[state].palette;
    IF (palette = NIL) THEN ImportantMessage ["No palette"]
    ELSE BEGIN
        rect: Rectangle ← [x: 0, y: 0, w: washItemWidth, h: washHeight];
        column, line: CARDINAL;  hint: ATOM;
        WITH changes SELECT FROM
            a: ATOM => hint ← a;
            ENDCASE => hint ← NIL;
        IF (hint = $none) THEN RETURN;
        IF (hint # $wash) THEN FOR colors: CL ← palette, colors.rest WHILE colors # NIL DO
            column ← count MOD 5;  line ← 1 + (count / 5);    count ← count.SUCC;
            IF (colors.first = NIL) THEN context.SetColor [IF ip THEN constantGray ELSE
                    state.background]
            ELSE BEGIN
                IF ip THEN context.SetColor [ColorFromLAB [colors.first]]
                ELSE context.SetColor [state.colors[UnstructuredColorMapIndex[0, count]]]
            END;
            context.MaskRectangle [ [x: column * (rectWidth + rectSpacing),
                    y: - line * (rectHeight + rectSpacing),
                    w: rectWidth, h: rectHeight]
        ENDLOOP;
        IF (Digi[state].wash # NIL) AND (hint # $list) THEN FOR i: INT IN [0 .. washItems) DO
            context.SetColor [Digi[state].washCache[i]];
            rect.x ← i * rect.w;         context.MaskRectangle [rect]
            ENDLOOP
        END
    END;    -- DrawList DrawEverything: PROC [context: Context, state: State, ip, clear: BOOL ← FALSE, changes: REF
        ANY ← NIL] ~ BEGIN
    *Draws everything. Window for scroll bars is not updated in the case of Interpress production.*
    context.ScaleT [state.scale];        context.TranslateT [state.translation];
    IF NOT ip THEN state.window ← ImagerBackdoor.GetBounds [context]
    ELSE BEGIN
        context.SetPriorityImportant [TRUE];
        state.window ← state.boundingBox;        context.TranslateT [[10, 45]]
        END;
    context.ClipRectangle [state.window];
    context.SetStrokeJoint [bevel];     context.SetStrokeEnd [square];
    context.SetStrokeWidth [outlineSize];
    IF state.abort↑ THEN {state.abort↑ ← FALSE;         RETURN};
    IF clear THEN BEGIN
        context.SetColor [IF ip THEN constantGray ELSE state.background];
            context.MaskRectangle [state.window]
        END;
    IF ip THEN BEGIN
        context.SetFont [ImagerFont.Scale [boldFace, state.titleSize]];

```
contextSetXY [state.titlePosition]; contextSetColor [black];
contextShowRope [state.name]
END;
WITH state.paletteAndSel SELECT FROM
    proto: ProtoPaletteData => DrawPalette [context, state, ip, changes];
    digi: DigitalPaletteData => DrawList [context, state, ip, changes];
    ENDCASE => NULL
END;  -- DrawEverything
```

Viewers & Class Set-up

```
ViewerFlavor: TYPE ~ ViewerClasses.ViewerFlavor;
wheel: ViewerFlavor ~ $ColorWheel;
list: ViewerFlavor ~ $ColorList;
MenuLine: TYPE ~ ViewerClasses.MenuLine;

InitializeViewerClass: PROC ~ BEGIN
    Initializes and registers the viewer classes.
    wheelClass: ViewerClasses.ViewerClass ← NEW [ViewerClasses.ViewerClassRec];
    listClass: ViewerClasses.ViewerClass ← NEW [ViewerClasses.ViewerClassRec];
    wheelMenu: Menus.Menu ~ Menus.CreateMenu [2];
    listMenu: Menus.Menu ~ Menus.CreateMenu [1];
    abortButton: MenuEntry ~ Menus.CreateEntry [name: "Abort",
            proc: Abort,
            guarded: TRUE];
    zoomButton: MenuEntry ~ Menus.CreateEntry [name: "Zoom",
            proc: ZoomIn,
            documentation: "Left: in, right: out"];
    saveButton: MenuEntry ~ Menus.CreateEntry [name: "Save",
            proc: Housekeeping,
            clientData: $save,
            documentation: "Save palette"];
    listDirButton: MenuEntry ~ Menus.CreateEntry [name: "List",
            proc: Housekeeping,
            clientData: $list,
            guarded: FALSE,
            documentation: "List palettes"];
    renameButton: MenuEntry ~ Menus.CreateEntry [name: "Rename",
            proc: Housekeeping,
            clientData: $rename,
            guarded: FALSE,
            documentation: "Rename palette"];
    resetButton: MenuEntry ~ Menus.CreateEntry [name: "Reset",
            proc: Housekeeping,
            clientData: $reset,
            guarded: TRUE,
            documentation: "Reset transformation, SHIFT: Undo all edits"];
    historyButton: MenuEntry ~ Menus.CreateEntry [name: "History",
            proc: Housekeeping,
```

```
        documentation: "Left: undo, right: redo",
        clientData: $history];
ipButton: MenuEntry ~ Menus.CreateEntry [name: "Hardcopy",
        proc: DoInterpress,
        documentation: "Generate Interpress master of palette",
        guarded: FALSE];
verboseButton: MenuEntry ~ Menus.CreateEntry [name: "Verbose",
        proc: Housekeeping,
        clientData: $verbose,
        documentation: "Explain commands",
        guarded: FALSE];
explainButton: MenuEntry ~ Menus.CreateEntry [name: "Explain",
        proc: Housekeeping,
        clientData: $explain,
        documentation: "Explain tool use",
        guarded: FALSE];
grabButton: MenuEntry ~ Menus.CreateEntry [name: "Grab",
        proc: Housekeeping,
        clientData: $grabSelection,
        documentation: "Grab last color selection",
        guarded: FALSE];
harmoniesButton: MenuEntry ~ Menus.CreateEntry [name: "Harmonies",
        proc: AddHue,
        clientData: $harmonies,
        documentation: "Add analoguous harmonies"];
complementButton: MenuEntry ~ Menus.CreateEntry [name: "Complement(s)",
        proc: AddHue,
        clientData: $complement,
        documentation: "Left: triadic, middle: direct complement"];
rotationButton: MenuEntry ~ Menus.CreateEntry [name: "ShiftHue",
        proc: RotateHue,
        documentation: "Rotate Palette colder left or right"];
valueButton: MenuEntry ~ Menus.CreateEntry [name: "MoreValues",
        proc: Values,
        documentation: "Add values to selected color"];
chromaButton: MenuEntry ~ Menus.CreateEntry [name: "MoreChromata",
        proc: Chromata,
        documentation: "Add chromata to selected color"];

Menus.AppendMenuEntry [wheelMenu, abortButton, 0];
Menus.AppendMenuEntry [wheelMenu, resetButton, 0];
Menus.AppendMenuEntry [wheelMenu, zoomButton, 0];
Menus.AppendMenuEntry [wheelMenu, renameButton, 0];
Menus.AppendMenuEntry [wheelMenu, listDirButton, 0];
Menus.AppendMenuEntry [wheelMenu, saveButton, 0];
Menus.AppendMenuEntry [wheelMenu, historyButton, 0];
Menus.AppendMenuEntry [wheelMenu, ipButton, 0];
Menus.AppendMenuEntry [wheelMenu, verboseButton, 0];
Menus.AppendMenuEntry [wheelMenu, explainButton, 0];
Menus.AppendMenuEntry [wheelMenu, rotationButton, 1];
Menus.AppendMenuEntry [wheelMenu, harmoniesButton, 1];
```

Menus.AppendMenuEntry [wheelMenu, complementButton, 1];
Menus.AppendMenuEntry [wheelMenu, valueButton, 1];
Menus.AppendMenuEntry [wheelMenu, chromaButton, 1];

Menus.AppendMenuEntry [listMenu, Menus.CopyEntry [abortButton], 0];
Menus.AppendMenuEntry [listMenu, Menus.CopyEntry [resetButton], 0];
Menus.AppendMenuEntry [listMenu, Menus.CopyEntry [zoomButton], 0];
Menus.AppendMenuEntry [listMenu, Menus.CopyEntry [renameButton], 0];
Menus.AppendMenuEntry [listMenu, Menus.CopyEntry [listDirButton], 0];
Menus.AppendMenuEntry [listMenu, Menus.CopyEntry [saveButton], 0];
Menus.AppendMenuEntry [listMenu, Menus.CopyEntry [ipButton], 0];
Menus.AppendMenuEntry [listMenu, Menus.CopyEntry [verboseButton], 0];
Menus.AppendMenuEntry [listMenu, Menus.CopyEntry [grabButton], 0];

BEGIN OPEN wheelClass:
    flavor ← wheel;
    notify ← UserEvent;
    paint ← Paint;
    destroy ← Destroy;
    save ← SaveViewer;
    scroll ← VerticalTranslation;
    hscroll ← HorizontalTranslation;
    menu ← wheelMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 5];
    cursor ← crossHairsCircle
    END;

BEGIN OPEN listClass:
    flavor ← list;
    notify ← UserEvent;
    paint ← Paint;
    destroy ← Destroy;
    save ← SaveViewer;
    scroll ← VerticalTranslation;
    hscroll ← HorizontalTranslation;
    menu ← listMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 6];
    cursor ← crossHairsCircle
    END;

ViewerOps.RegisterViewerClass [wheel, wheelClass];
ViewerOps.RegisterViewerClass [list, listClass]
END;   -- InitializeViewerClass InitializeViewer: PROC [colonna: Column, state: State, keyColor: ATOM] RETURNS [viewer:
        Viewer] ~ BEGIN
    *If the key color is empty then a digital palette is assumed, otherwise a proto-palette.*
    paletteViewer, historyViewer: ViewerClasses.ViewerRec;
    class: ATOM ~ IF (keyColor = emptyAtom) THEN list ELSE wheel;

IF (colonna = color) AND (NOT WindowManager.colorDisplayOn) THEN colonna ← left;

```
BEGIN OPEN paletteViewer:
    label ← state.name;
    name ← IF (keyColor = emptyAtom) THEN state.name ELSE state.name.Cat [" (",
            Atom.GetPName [keyColor], ")"];
    column ← colonna;       iconic ← TRUE;
    scrollable ← TRUE;      hscrollable ← TRUE;      guardDestroy ← TRUE;
    data ← state
    END;
BEGIN OPEN historyViewer:
    label ← paletteViewer.label.Concat [" history"];
    name ← paletteViewer.name.Concat [" history"];
    column ← right; iconic ← TRUE;   data ← state
    END;
viewer ← ViewerOps.CreateViewer [class: paletteViewer];
ViewerOps.EstablishViewerPosition [viewer, viewer.wx, viewer.wy, viewer.ww, viewer.wh];
[] ← Terminal.SetColorCursorPresentation [Terminal.Current[], onesAreBlack];
state.historyViewer ← TypeScript.Create [historyViewer, FALSE];
ViewerOps.PaintViewer [state.historyViewer, all];
LoadPalette [state, keyColor];      paletteViewer.file ← PaletteIO.DatabaseInfo[].name
END;    -- InitializeViewer PutHistoryLine: PROC [state: State, rope: ROPE, italicize: BOOL ← FALSE] ~ BEGIN
    ENABLE {TypeScriptDestroyed => GOTO again};
    IF italicize THEN TypeScript.ChangeLooks [state.historyViewer, 'i];
    TypeScript.PutRope [state.historyViewer, rope.Concat["\n"]];
    IF italicize THEN TypeScript.ChangeLooks [state.historyViewer, ' ];
    EXITS
        again => BEGIN
            historyViewer: ViewerClasses.ViewerRec;
            BEGIN OPEN historyViewer:
                label ← name ← state.name.Concat [" history"];
                column ← right;  iconic ← FALSE;  data ← state
                END;
            state.historyViewer ← TypeScript.Create [historyViewer, TRUE];
            IF italicize THEN TypeScript.ChangeLooks [state.historyViewer, 'i];
            TypeScript.PutRope [state.historyViewer, rope];
            IF italicize THEN TypeScript.ChangeLooks [state.historyViewer, ' ]
            END;
    END;    -- PutHistoryLine GetHistoryLine: PROC [state: State, prompt: ROPE] RETURNS [ROPE] ~ BEGIN
    Returns NIL if the input is aborted.
    ENABLE {TypeScriptDestroyed => GOTO abort};
    buffer: ARRAY (0 .. 200) OF CHAR;  index, length: [0 .. 200] ← 0;
    ch: CHAR ← IO.NUL;
    Fetch: PROC RETURNS [CHAR] ~ {index ← index.SUCC; RETURN [buffer[index]]};
    WHILE TypeScript.CharsAvailable[state.historyViewer] DO
        [] ← TypeScript.GetChar [state.historyViewer]
        ENDLOOP;
    PutHistoryLine [state, prompt];
```

```
WHILE (ch # '\n) DO
    IF state.abort? THEN GOTO abort;
    ch ← TypeScript.GetChar [state.historyViewer];
    SELECT ch FROM
        IO.ESC => BEGIN
            TypeScript.TypeIn [state.historyViewer, state.lastInput];
            TypeScript.PutRope [state.historyViewer, state.lastInput]
        END;
        IO.DEL => GOTO abort;
        '\b => IF index > 0 THEN BEGIN
            index ← index.PRED;
            TypeScript.BackSpace [state.historyViewer]
        END;
        ENDCASE => BEGIN
            index ← index.SUCC;    IF index >= 200 THEN LOOP;    buffer[index] ← ch;
            TypeScript.PutChar [state.historyViewer, ch]
        END;
    ENDLOOP;
    IF (index = 0) THEN RETURN [NIL];
    length ← index - 1;    index ← 0;
    state.lastInput ← Rope.FromProc [length, Fetch, length];    RETURN [state.lastInput];
    EXITS
        abort => BEGIN
            WHILE TypeScript.CharsAvailable[state.historyViewer] DO
                [] ← TypeScript.GetChar [state.historyViewer]
            ENDLOOP;
            RETURN [NIL]
        END
    END;    -- GetHistoryLine SetNewVersion: PROC [v: Viewer, state: State] ~ BEGIN
    Marks a palette edited both in the viewer and in the database.
    errorDesc: PaletteIO.ErrorDesc;
    BEGIN
        ENABLE BEGIN
            PaletteIO.Error => {errorDesc ← [error.code, error.explanation]; GOTO
                databaseError};
        END;
        ViewerOps.SetNewVersion [v];    PaletteIO.MarkEdited [state.name];
        EXITS
            databaseError => IF errorDesc.code # SnoSuchPalette THEN BEGIN
                PutHistoryLine [state, errorDesc.explanation];
                ImportantMessage [errorDesc.explanation]
            END
    END
END;    -- SetNewVersion ResetNewVersion: PROC [v: Viewer] ~ BEGIN
    Does t': converse operation of ViewerOps.SetNewVersion. Assume the class is correct.
    v.newVersion ← FALSE;
```

ViewerForkers.ForkPaint [viewer: v, hint: caption, clearClient: FALSE, tryShortCuts: TRUE]
END; -- *ResetNewVersion*

UserEvent: ViewerClasses.NotifyProc ~ BEGIN
[self: Viewer, input: LIST OF REF ANY]
*Input events from the class TIPTable. Mouse events get passed whenever the mouse is over the viewer, keyboard events get passed if the viewer owns the input focus (see the InputFocus interface). N.B. Called at Process.priorityForeground!*
state: State ~ NARROW [self.data];
xy: TIPUser.TIPScreenCoords ~ NARROW [input.first];
pos: VEC;        invScale: REAL ← 1.0 / state.scale;
cmd: ATOM ~ NARROW [input.rest.first];
pos.x ← xy.mouseX * invScale;    pos.y ← xy.mouseY * invScale;
pos.x ← pos.x - state.translation.x;  pos.y ← pos.y - state.translation.y;
SELECT self.class.flavor FROM
    wheel => TRUSTED {Process.Detach [FORK Hit [state, self, pos, (cmd = $delete) OR
            (cmd = $deleteLeft) OR (cmd = $deleteRight)]]};
    list => TRUSTED {Process.Detach [FORK HitList [state, self, pos, cmd]]};
    ENDCASE => NULL
END; -- *UserEvent*

Menu Commands

Paint: ViewerClasses.PaintProc ~ BEGIN
[self: Viewer, context: Imager.Context, whatChanged: REF, clear: BOOL] RETURNS [quit: BOOL ← FALSE]
*Called by the window manager when the client should repaint the data on the screen. The context is clipped to the client screen area. whatChanged is just passed from the call to ViewerOps.PaintViewer, but will be NIL when the window manager requires a full repaint after moving a viewer on the screen. clear is a hint that the client background is white, so that the client can paint on the black bits if it so chooses. See comments for paintRectangles bit in the viewer class. Return quit~TRUE to stop without painting children.*
state: State ~ NARROW [self.data];

state.abort↑ ← FALSE;
state.window ← ImagerBackdoor.GetBounds [context];    -- *needed for scroll bars*

IF state.abort↑ THEN {state.abort↑ ← FALSE; RETURN [TRUE]};
Process.CheckForAbort;

context.SetPriorityImportant [FALSE];
IF state.resetPainting THEN BEGIN
    *Important for initialization of caches.*
    state.translation ← [-state.boundingBox.x, -state.boundingBox.y];
    state.scale ← MIN [(state.window.w / state.boundingBox.w), (state.window.h / state.boundingBox.h)];
    state.resetPainting ← FALSE;    clear ← TRUE
    END;
DrawEverything [context: context, state: state, ip: FALSE, clear: clear, changes: whatChanged]
END; -- *Paint*

SaveViewer: ViewerClasses.SaveProc ~ BEGIN
    PROC [self: Viewer, force: BOOL ← FALSE]:
        Requests client to save data structures on the disk. force should only be true when called
        from the emergency backup code on error recovery and requests that the client consider
        overriding monitors or locks that might otherwise prevent saving the data.
    errorDesc: PaletteIO.ErrorDesc;    state: State ← NARROW [self.data, State];
    BEGIN
        ENABLE {PaletteIO.Error => {errorDesc ← error; GOTO fileError}};
        IF NOT self.newVersion THEN RETURN;
        IF trace THEN PutHistoryLine [state, "Saving ..."];
        IF force THEN WITH state.paletteAndSel SELECT FROM
            proto: ProtoPaletteData => proto.palette.lock ← FALSE;
            ENDCASE => NULL;
        WITH state.paletteAndSel SELECT FROM
            proto: ProtoPaletteData => PaletteIO.WriteProtoPalette [state.name,
                    state.comment, proto.palette];
            digi: DigitalPaletteData => PaletteIO.WriteColorList [state.name, state.comment,
                    digi.palette];
            ENDCASE => NULL;
        ResetNewVersion [self];
        EXITS
            fileError => {PutHistoryLine [NARROW [self.data, State], errorDesc.explanation];
                SetNewVersion [self, state]; ImportantMessage [errorDesc.explanation]}
        END
    END; -- SaveViewer VerticalTranslation: ViewerClasses.ScrollProc ~ BEGIN
    [self: Viewer, op: ScrollOp, amount: INTEGER, shift, control: BOOL ← FALSE] RETURNS [top,
        bottom: INTEGER ← LAST[INTEGER]]
    ScrollOp = {query, up, down, thumb}
    Client scrolling and scrolling feedback. If op is 'query' the client should return the *percentage*
    of the scrollable document at the top and bottom of the screen, or default if unknown. If op
    is 'up' or 'down' then amount is *number of pixels* to glitch. If op is 'thumb' then amount is
    *percentage* into document to scroll. The shift and control information reflects the state of the
    shift and control keys during the up, down, and thumb ops and may be interpreted by the
    client as desired.
    state: State ~ NARROW [self.data];
    viewport: [self.cx, cy, cw, ch]

BEGIN OPEN state;
        SELECT op FROM
            query => BEGIN
                A query is performed each time the mouse is on a scroll bar, hence this must be
                faster than a bullet.
                top ← MAX [topSB, 0];    bottom ← MIN [bottomSB, 100];    RETURN
            END;
            up => IF (window.y < boundingBox.y + boundingBox.h) THEN BEGIN
                translation.y ← translation.y + (Float [amount] / Float [self.ch]) * window.h;
                Note that the cached values may exceed the diplayed values to avoid referring to the
                    window when it is moved back into the viewer.
                Note also that topSB and bottomSB cannot be computed trivially from amount.

*because amount is in pixels while I have to return a percentage.*
```
        topSB ← Fix [(window.y + window.h) / (boundingBox.y + boundingBox.h) *
                100.0];
        bottomSB ← topSB + Fix [(window.h / boundingBox.h) * 100.0]
        END;
    down => IF (window.y + window.h > boundingBox.y) THEN BEGIN
        translation.y ← translation.y - (Float [amount] / Float [self.ch]) * window.h;
        topSB ← Fix [(window.y + window.h) / (boundingBox.y + boundingBox.h) *
                100.0];
        bottomSB ← topSB + Fix [(window.h / boundingBox.h) * 100.0]
        END;
    thumb => SELECT TRUE FROM
        shift AND control => ImportantMessage ["Invalid command"];
        shift => BEGIN    -- scale up (window becomes relatively smaller)
            The scroll bar is viewed as a scale from 1 to 10.
            factor: REAL ← 10.0 / Float [amount + 10];        scale ← scale * factor;
            topSB ← Fix [((window.y + window.h) * factor) / (boundingBox.y +
                    boundingBox.h) * 100.0];
            bottomSB ← topSB + Fix [(window.h / boundingBox.h) * 100.0]
            END;
        control => BEGIN          -- reset painting
            resetPainting ← TRUE;
            bottomSB ← rightSB ← 100;        topSB ← leftSB ← 0
            END;
        ENDCASE => BEGIN        -- thumb
            sign: INTEGER ← IF (boundingBox.h > window.h) THEN -1 ELSE 1;
            translation.y ← sign * (boundingBox.y + (boundingBox.h * Float [amount] /
                    100.0));
            topSB ← amount;
            bottomSB ← amount + Fix [(window.h / boundingBox.h) * 100.0]
            END;
        ENDCASE => ERROR;
```
*Trace [amount];*

ViewerOps.PaintViewer [viewer: self, hint: client];    -- op <> query
*Note that the cached values may exceed the displayed values to avoid referring to the window when it is moved back into the viewer.*
```
        top ← MAX [topSB, 0];     bottom ← MIN [bottomSB, 100]
    END    -- OPEN state
    END;    -- VerticalTranslation HorizontalTranslation: ViewerClasses.HScrollProc ← BEGIN
```
*[self: Viewer, op: HScrollOp, amount: INTEGER, shift, control: BOOL ← FALSE] RETURNS*
*[left, right: INTEGER ← LAST[INTEGER]]*
*HScrollOp = {query, left, right, thumb}*
*Client scrolling and scrolling feedback. If op is 'query' the client should return the percentage of the scrollable document at the top and bottom of the screen, or default if unknown. If op is 'up' or 'down' then amount is number of pixels to glitch. If op is 'thumb' then amount is percentage into document to scroll. The shift and control information reflects the state of the shift and control keys during the up, down, and thumb ops and may be interpreted by the*

*client as desired.*
state: State ~ NARROW [self.data];

```
BEGIN OPEN state;
  SELECT op FROM
    query => BEGIN
```
*A query is performed each time the mouse is on a scroll bar, hence this must be faster than a bullet.*
```
      right ← MIN [rightSB, 100];      left ← MAX [leftSB, 0];      RETURN
      END;
    right => IF (window.x < boundingBox.x + boundingBox.w) THEN BEGIN
      translation.x ← translation.x + (Float [amount] / Float [self.cw]) * window.w;
      leftSB ← Fix [((window.x + window.w) / (boundingBox.x + boundingBox.w) *
              100.0];
      rightSB ← leftSB + Fix [(window.w / boundingBox.w) * 100.0]
      END;
    left => IF (window.x + window.w > boundingBox.x) THEN BEGIN
      translation.x ← translation.x - (Float [amount] / Float [self.cw]) * window.w;
      leftSB ← Fix [((window.x + window.w) / (boundingBox.x + boundingBox.w) *
              100.0];
      rightSB ← leftSB + Fix [(window.w / boundingBox.w) * 100.0]
      END;
    thumb => SELECT TRUE FROM
      shift AND control => ImportantMessage ["Invalid command"];
      shift => BEGIN    -- scale down (window becomes relatively larger)
        factor: REAL ~ Float [amount + 10] / 10.0;       scale ← scale * factor;
        leftSB ← Fix [((window.x + window.w) * factor) / (boundingBox.x +
                boundingBox.w) * 100.0];
        rightSB ← leftSB + Fix [(window.w / boundingBox.w) * 100.0]
        END;
      control => BEGIN      -- reset painting
        resetPainting ← TRUE;     bottomSB ← rightSB ← 100;      topSB ← leftSB
                ← 0
        END;
      ENDCASE => BEGIN      -- thumb
        sign: INTEGER ← IF (boundingBox.w > window.w) THEN -1 ELSE 1;
        translation.x ← sign * (boundingBox.x + (boundingBox.w * Float [amount] /
                100.0));
        leftSB ← amount;
        rightSB ← amount + Fix [(window.w / boundingBox.w) * 100.0]
        END;
    ENDCASE => ERROR;
```

*Trace [amount]:*

ViewerOps.PaintViewer [viewer: self, hint: client];   -- *op <> query*
*Note that the cached values may exceed the diplayed values to avoid referring to the window when it is moved back into the viewer.*
```
    right ← MIN [rightSB, 100];       left ← MAX [leftSB, 0]
  END    -- OPEN state
END;    -- HorizontalTranslation
```

Destroy: ViewerClasses.DestroyProc ~ BEGIN
   *Called when the viewer has been destroyed for some reason.*
   state: State ← NARROW [self.data];
   PaletteIO.UnmarkEdited [state.name ! PaletteIO.Error => {CONTINUE}];
   TypeScriptDestroy [state.historyViewer]; DisposeSubMap [state.subMap];
   FOR sl: LIST OF State ← allStates, sl.rest WHILE sl # NIL DO
      IF (sl.first = state) THEN sl.first ← NIL
      ENDLOOP;
   state ← NIL;     lastViewer ← NIL;     stateCount ← stateCount.PRED;
   IF (stateCount = 0) THEN ImagerColorMap.UnRegister [colorMapNotifier]
   END;  -- *Destroy*

Abort: Menus.ClickProc ~ BEGIN
   *[parent: REF ANY, clientData: REF ANY ← NIL, mouseButton: MouseButton ← red, shift, control: BOOL ← FALSE]*
   IF NOT ISTYPE [parent, Viewer] THEN ImportantMessage ["Implementation error (wrong
         viewer type)"]
   ELSE BEGIN
      state: State ~ NARROW [NARROW [parent, Viewer].data];
      IF state.verbose THEN PutHistoryLine [state, "Abort painting"];
      state.abort↑ ← TRUE
      END
   END;  -- *Abort*

ZoomIn: Menus.ClickProc ~ BEGIN
   *[parent: REF ANY, clientData: REF ANY ← NIL, mouseButton: MouseButton ← red, shift, control: BOOL ← FALSE]*
   IF NOT ISTYPE [parent, Viewer] THEN ImportantMessage ["Implementation error (wrong
         viewer type)"]
   ELSE BEGIN
      v: Viewer ~ NARROW [parent];
      state: State ~ NARROW [v.data];
      IF state.verbose THEN PutHistoryLine [state, "Red: zoom in by 50%; blue: zoom out"];
      BEGIN OPEN state:
         scale ← SELECT mouseButton FROM
               red => scale * 1.5,
               blue => scale / 1.5,
               ENDCASE => IF control THEN scale * 3 ELSE scale;
         IF control AND (mouseButton = yellow) THEN
            translation ← [translation.x - swatchSize * 3, translation.y - swatchSize * 3.2];
         ViewerOps.PaintViewer [viewer: v, hint: client];
         topSB ← Fix [(window.y + window.h) / (boundingBox.y + boundingBox.h) *
               100.0];
         bottomSB ← topSB + Fix [(window.h / boundingBox.h) * 100.0];
         leftSB ← Fix [(window.x + window.w) / (boundingBox.x + boundingBox.w) *
               100.0];
         rightSB ← leftSB + Fix [(window.w / boundingBox.w) * 100.0]
         END
      END
   END;  -- *ZoomIn*

Housekeeping: Menus.ClickProc ~ BEGIN
    [parent: REF ANY, clientData: REF ANY + NIL, mouseButton: MouseButton + red, shift,
    control: BOOL + FALSE].  MouseButton: TYPE = {red, yellow, blue}
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];
        WITH clientData SELECT FROM
            a: ATOM => SELECT a FROM
                $save => ViewerOps.SaveViewer [v];
                $verbose => state.verbose + speak + NOT state.verbose;
                $explain => BEGIN
                    lang: ROPE ~ SELECT mouseButton FROM red => "English", yellow =>
                            "Italiano", ENDCASE => "Deutsch";
                    name: ROPE ~ lastWDir.Cat ["ProtoPalette-", lang, ".Tioga"];
                    IF state.verbose THEN PutHistoryLine [state, "Red: explain tool; yellow:
                            spiega l'utensile; blue: erkläre das Werkzeug"];
                    PutHistory ... [state, RopeFile.Create [name: name, raw: FALSE ! FS.Error
                            => {PutHistoryLine [state, Rope.Concat ["Could not find help file
                            ", name]]; CONTINUE}], TRUE];
                    PutHistoryLine [state, state.comment];
                    PutHistoryLine [state, "Red/left: English; yellow/middle: Italiano;
                            blue/right: Deutsch"]
                END;
                $history => BEGIN
                    changed: BOOL + TRUE;  c: CARDINAL + state.history.index;
                    protoPalette: Palette;    -- immutably referenced by state.paletteAndSel
                    WITH state.paletteAndSel SELECT FROM
                        proto: ProtoPaletteData => protoPalette + proto.palette;
                        ENDCASE => RETURN;
                    IF state.verbose THEN PutHistoryLine [state, "Red/left: redo; blue/right:
                            undo"];
                    SELECT mouseButton FROM
                        red => c + c.SUCC MOD (historySize-1);
                        blue => c + IF (c > 0) THEN c.PRED ELSE historySize-1;
                        ENDCASE => RETURN;
                    IF (state.history.entry[c] # NIL) THEN state.history.index + c ELSE changed +
                            FALSE;
                    protoPalette + state.history.entry[state.history.index];
                    IF changed THEN ViewerOps.PaintViewer [viewer: v, hint: client]
                END;
                $rename => BEGIN
                    oldName: ROPE ~ state.name;
                    ImportantMessage ["Type new name in typescript"];
                    IF state.verbose THEN PutHistoryLine [state, "Rename the current palette. An
                            old palette with the same name is not overwritten"];
                    IF state.historyViewer.iconic THEN ViewerOps.OpenIcon
                            [state.historyViewer];
                    v.label + state.name + GetHistoryLine [state, "Type new name"];
                    IF (PaletteIO.PaletteInfo [state.name].type # NIL) THEN BEGIN

*This is not correct. It should be possible to overwrite a deleted palette.*
PutHistoryLine [state, "A palette with such a name already exists."];
ImportantMessage ["A palette with such a name already exists."]
    END
  ELSE BEGIN
    IF NOT state.name.Equal [oldName] THEN BEGIN
      PaletteIO.UnmarkEdited [oldName];
      v.name ← IF (v.class.flavor = list) THEN state.name ELSE
        state.name.Cat [" (", Atom.GetPName
        [Proto[state].palette.keyColor], ")"];
      state.historyViewer.name ← v.name.Concat [" history"];
      state.historyViewer.label ← v.label.Concat [" history"];
      ViewerOps.PaintViewer [viewer: v, hint: caption, clearClient: FALSE];
      ViewerOps.PaintViewer [viewer: state.historyViewer, hint: caption]
    END
  END
END;
Sreset => BEGIN
  state.resetPainting ← TRUE;
  state.bottomSB ← state.rightSB ← 100;       state.topSB ← state.leftSB ← 0;
  IF state.verbose THEN PutHistoryLine [state, "Reset viewing transformation;
    SHIFT: reset palette"];
  IF shift THEN BEGIN
    key: ATOM ~ IF (v.class.flavor = wheel) THEN
      Proto[state].palette.keyColor ELSE emptyAtom;
    LoadPalette [state, key];   ResetNewVersion [v];
    v.file ← PaletteIO.DatabaseInfo[].name;   TypeScriptReset
      [state.historyViewer]
  END;
  ViewerOps.PaintViewer [viewer: v, hint: client]
END;
Slist => BEGIN
  dbname: ROPE; palettes: INT;
  char: CHAR ~ IF (v.class.flavor = wheel) THEN 'P ELSE 'D;
  IF state.verbose THEN PutHistoryLine [state, "List palettes editable with this
    tool. SHIFT: list all palettes in database"];
  [dbname, palettes] ← PaletteIO.DatabaseInfo [];
  PutHistoryLine [state, PaletteIO.ListDirectory [IF shift THEN ' ELSE char]];
  PutHistoryLine [state, IO.PutFR ["Database: %g, palettes: %g", IO.rope
    [dbname], IO.int [palettes]]]
END;
SgrabSelection => BEGIN
  IF (v.class.flavor = list) THEN BEGIN
    state.paletteAndSel ← AddToList [GetLastSelection[], Digi[state], state];
    SetNewVersion [v, state];
    ViewerOps.PaintViewer [viewer: v, hint: client, clearClient: FALSE,
      whatChanged: Slist]
  END
END;
ENDCASE => ImportantMessage ["Implementation error (wrong housekeeping

```
            class)"];
        ENDCASE => ImportantMessage ["Implementation error (wrong clientData type)"]
    END
END;  -- Housekeeping RotateHue: Menus.ClickProc ~ BEGIN
    [parent: REF ANY, clientData: REF ANY <- NIL, mouseButton: MouseButton <- red, shift,
    control: BOOL <- FALSE]
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];
        data: ProtoPaletteData <- Proto[state];
        SetNewVersion [v, state];
        state.history.index <- state.history.index.SUCC MOD historySize;
        state.history.entry[state.history.index] <- data.palette;
        IF state.verbose THEN PutHistoryLine [state, "Red: rotate positive; blue: rotate
                negative"];
        SELECT mouseButton FROM
            red => data.palette <- ProtoPalette.RotatePositive [data.palette];
            yellow => NULL;
            blue => data.palette <- ProtoPalette.RotateNegative [data.palette];
            ENDCASE => NULL;
        FOR i: Hue IN Hue DO
            FOR j: ValueAndChroma IN ValueAndChroma DO NoteNewColor [state, i, j]
                ENDLOOP;
            ENDLOOP;
        PutHistoryLine [state, Rope.Concat ["New center color: ", LABToLCHRope
                [data.palette.colors[centerHue][0]]]];
        IF (NOT Is8bit []) THEN ViewerOps.PaintViewer [viewer: v, hint: client, clearClient:
                FALSE]
        END
END;  -- RotateHue AddHue: Menus.ClickProc ~ BEGIN
    [parent: REF ANY, clientData: REF ANY <- NIL, mouseButton: MouseButton <- red, shift,
    control: BOOL <- FALSE].  MouseButton: TYPE = {red, yellow, blue}
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];
        data: ProtoPaletteData <- Proto[state];    changes: ChangeListProto <- NIL;
        WITH clientData SELECT FROM
            a: ATOM => BEGIN
                SetNewVersion [v, state];
                state.history.index <- state.history.index.SUCC MOD historySize;
                state.history.entry[state.history.index] <- data.palette;
                SELECT a FROM
                    $harmonies => BEGIN
                        IF state.verbose THEN PutHistoryLine [state, "Add an analoguous
```

```
                    harmony: CTRL: delete it"];
        data.palette ← IF control THEN ProtoPalette.DeleteAnaloguousHarmony
                    [data.palette]
        ELSE ProtoPalette.MakeAnaloguousHarmony [data.palette];
        FOR i: analoguousHarmonies IN analoguousHarmonies DO
            NoteNewColor [state, i, 0]
            ENDLOOP;
        changes ← LIST [-2, -1, 0, 1, 2];
        END;
    $complement => BEGIN
        IF state.verbose THEN PutHistoryLine [state, "Red: add direct
                    complement; yellow: add triadic complements; CTRL: delete
                    them\n\t(The complements are mutually exclusive)"];
        changes ← LIST [directComplement, leftTriadicComplement,
                    rightTriadicComplement];
        SELECT mouseButton FROM
            red => BEGIN
                data.palette ← IF control THEN
                        ProtoPalette.DeleteDirectComplement [data.palette]
                    ELSE ProtoPalette.MakeDirectComplement [data.palette];
                NoteNewColor [state, directComplement, 0];
                data.palette ← ProtoPalette.DeleteTriadicComplements
                        [data.palette]
                END;
            yellow => BEGIN
                data.palette ← IF control THEN
                        ProtoPalette.DeleteTriadicComplements [data.palette]
                    ELSE ProtoPalette.MakeTriadicComplements [data.palette];
                NoteNewColor [state, leftTriadicComplement, 0];
                NoteNewColor [state, rightTriadicComplement, 0];
                data.palette ← ProtoPalette.DeleteDirectComplement [data.palette]
                END;
            blue => IF shift THEN BEGIN
                data.palette ← IF control THEN
                        ProtoPalette.DeleteDirectComplement [data.palette]
                    ELSE ProtoPalette.MakeDirectComplement [data.palette];
                data.palette ← IF control THEN
                        ProtoPalette.DeleteTriadicComplements [data.palette]
                    ELSE ProtoPalette.MakeTriadicComplements [data.palette];
                NoteNewColor [state, leftTriadicComplement, 0];
                NoteNewColor [state, directComplement, 0];
                NoteNewColor [state, rightTriadicComplement, 0]
                END;
            ENDCASE => NULL
        END;
    ENDCASE => ImportantMessage ["Implementation error (wrong hue addition
            class)"]
    END;
ENDCASE => ImportantMessage ["Implementation error (wrong clientData type)"];
ViewerOps.PaintViewer [viewer: v, hint: client, clearClient: FALSE, whatChanged:
```

```
                    changes]
            END
    END;   -- AddHue

Values: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];    hue: Hue;
        data: ProtoPaletteData ← Proto[state];
        IF (data.selection = NIL) THEN {Message ["No selection"];    RETURN};
        IF (data.selection.variant # 0) THEN {Message ["Already an atomic color"];
                RETURN};
        SetNewVersion [v, state]; hue ← data.selection.hue;
        state.history.index ← state.history.index.SUCC MOD historySize;
        state.history.entry[state.history.index] ← ProtoPalette.CopyPalette [data.palette];
        IF state.verbose THEN PutHistoryLine [state, "add 2 aequidistant high and 2 aequidistant
                low values; CTRL: delete them"];
        data.palette.colors[hue] ← IF control THEN ProtoPalette.RestrictValue [data.palette,
                data.palette.colors[hue]]
            ELSE ProtoPalette.VaryValue [data.palette, data.palette.colors[hue]];
        FOR i: ValueAndChroma IN [-(values + chromata) .. -chromata) DO NoteNewColor
                [state, hue, i] ENDLOOP;
        FOR i: ValueAndChroma IN (chromata .. chromata + values] DO NoteNewColor [state,
                hue, i] ENDLOOP;
        IF trace THEN BEGIN
            PutHistoryLine [state, "New values:"];
            FOR i: ValueAndChroma IN [-(values + chromata) .. -chromata) DO
                color: LAB ~ data.palette.colors[hue][i];
                IF (color # NIL) THEN PutHistoryLine [state, LABToLCHRope [color]]
                ENDLOOP;
            IF (data.palette.colors[hue][0] # NIL) THEN PutHistoryLine [state, LABToLCHRope
                    [data.palette.colors[hue][0]]];
            FOR i: ValueAndChroma IN (chromata .. chromata + values] DO
                color: LAB ~ data.palette.colors[hue][i];
                IF (color # NIL) THEN PutHistoryLine [state, LABToLCHRope [color]]
                ENDLOOP
            END;
        ViewerOps.PaintViewer [viewer: v, hint: client, clearClient: FALSE]
        END
    END;   -- Values Chromata: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
```

```
v: Viewer ~ NARROW [parent];    state: State ~ NARROW [v.data];    hue: Hue;
data: ProtoPaletteData ← Proto[state];
IF (data.selection = NIL) THEN {Message ["No selection"];  RETURN};
IF (data.selection.variant # 0) THEN {Message ["Already an atomic color"];
        RETURN};
SetNewVersion [v, state]; hue ← data.selection.hue;
state.history.index ← state.history.index.SUCC MOD historySize;
state.history.entry[state.history.index] ← ProtoPalette.CopyPalette [data.palette];
IF state.verbose THEN PutHistoryLine [state, "add 2 aequidistant vivid and 2
        aequidistant dull chromata; CTRL: delete them"];
data.palette.colors[hue] ← IF control THEN ProtoPalette.RestrictChroma [data.palette,
        data.palette.colors[hue]]
    ELSE ProtoPalette.VaryChroma [data.palette, data.palette.colors[hue]];
FOR i: ValueAndChroma IN [-chromata .. chromata] DO NoteNewColor [state, hue, i]
    ENDLOOP;
IF trace THEN BEGIN
    PutHistoryLine [state, "New chromata:"];
    FOR i: ValueAndChroma IN [-chromata .. chromata] DO
        color: LAB ~ data.palette.colors[hue][i];
        IF (color # NIL) THEN PutHistoryLine [state, LABToLCHRope [color]]
        ENDLOOP
    END;
ViewerOps.PaintViewer [viewer: v, hint: client, clearClient: FALSE]
END
END;  -- Chromata DoInterpress: Menus.ClickProc ~ BEGIN
    [parent: REF ANY, clientData: REF ANY ← NIL, mouseButton: MouseButton ← red, shift,
    control: BOOL ← FALSE]
    Produces an Interpress master.
    v: Viewer ~ NARROW [parent];    state: State ~ NARROW [v.data];
    lc: Context;    -- local context
    DoIt: PROC ~ {DrawEverything [lc, state, TRUE, TRUE]};
    DrawToIP: PROC [context: Imager.Context] ~ {lc ← context; context.DoSave [DoIt]};
    IF NOT ISTYPE [parent, Viewer] THEN ImportantMessage ["Implementation error (wrong
            viewer type)"]
    ELSE SELECT mouseButton FROM
        red => BEGIN
            master: ImagerInterpress.Ref;
            masterName: ROPE ~ IO.PutFR1 ["[]<>Temp>ProtoPalette>%g.Interpress",
                    IO.rope [state.name]];
            master ← ImagerInterpress.Create [masterName];
            master.DeclareColorOperator [labLinear]; master.DeclareFont [boldFace];
            master.DoPage [action: DrawToIP,
                    scale: ((fieldWidth / 1000.0) / state.boundingBox.w / state.scale)];
            master.Close [];
            ImportantMessage [masterName.Cat [" created"]];
            PutHistoryLine [state, Rope.Concat ["\nIPPreView ", masterName]]
            END;
        yellow => NULL;
```

```
    blue => NULL;
    ENDCASE => ERROR
END;  -- DoInterpress
```

Mouse Commands

```
Hit: PROC [state: State, v: Viewer, pos: VEC, delete: BOOL] ~ BEGIN
    Hit the current mouse position and store the target in the state.
    data: ProtoPaletteData ← Proto[state];        selectedColor: LAB;
    colors: Harmony ~ data.palette.colors;        prevSel: SelectionProto ~ data.selection;
    left: REAL ~ pos.x - swatchSize / 2.0;        right: REAL ~ pos.x + swatchSize / 2.0;
    bottom: REAL ~ pos.y - swatchSize / 2.0;      top: REAL ~ pos.y + swatchSize / 2.0;
    changes: ChangeListProto ← NIL;
    IF (prevSel # NIL) THEN changes ← CONS [prevSel.hue, changes];
    data.selection ← NIL;
    IF state.verbose THEN PutHistoryLine [state, "Selected color can be grabbed by Gargoyle; if
                there is a ColorTool, it shows the color\n\tCTRL deletes the color"];
    FOR i: Hue IN Hue DO
        FOR j: ValueAndChroma IN ValueAndChroma DO
            xy: VEC;
            xy.x ← keyColorPos[i].x + variantColorPos[j].x;
            xy.y ← keyColorPos[i].y + variantColorPos[j].y;
            IF (colors[i][j] # NIL) AND (xy.x > left) AND (xy.x < right) AND (xy.y > bottom) AND
                    (xy.y < top) THEN {data.selection ← NEW [SelectionProtoRep ← [i, j]];
                    EXIT}
        ENDLOOP
    ENDLOOP;
    IF (prevSel = NIL) AND (data.selection = NIL) THEN RETURN;
    IF (data.selection = NIL) THEN BEGIN
        ViewerOps.PaintViewer [viewer: v, hint: client, clearClient: FALSE, whatChanged:
                changes];
        RETURN
    END;
    IF delete THEN BEGIN
        state.history.index ← state.history.index.SUCC MOD historySize;
        state.history.entry[state.history.index] ← data.palette;
        data.palette ← ProtoPalette.CopyPalette [data.palette];
        data.palette.colors[data.selection.hue][data.selection.variant] ← NIL;
        data.selection ← NIL;     selectedColor ← NEW [CIELAB ← [25, 0, 0]];
        SetNewVersion [v, state]
        END
    ELSE BEGIN
        name: ROPE;
        selectedColor ← colors[data.selection.hue][data.selection.variant];
        changes ← CONS [data.selection.hue, changes];
        name ← ColorName [selectedColor];    Message [name];
        PutHistoryLine [state, Rope.Cat [LABToLCHRope
                [data.palette.colors[data.selection.hue][data.selection.variant]], " = ", name]];
        TRUSTED {Process.Detach [FORK SpeakMessage [name]]}
```

```
        END;
    TransferSelectedColor [state, ToRGB [selectedColor]];
    ViewerOps.PaintViewer [viewer: v, hint: client, clearClient: FALSE, whatChanged: changes]
    END;    -- Hit HitList: PROC [state: State, v: Viewer, pos: VEC, cmd: ATOM] ~ BEGIN
    Hit the current mouse position and store the target in the state. If the selected color is in the
    wash, its index is nrEntries - L
    data: DigitalPaletteData ← Digi[state];    doWash, deletable: BOOL ← FALSE;
    colors: CL ~ data.palette;   prevSel: SelectionDigital ~ data.selection;
    selectedColor: LAB ← NIL;        name: ROPE;    changes: ATOM ← $none;
    IF state.verbose THEN PutHistoryLine [state, "Left: left side of wash; right: right side of
            wash; middle: add to palette\nMiddle-selected color can be grabbed by
            Gargoyle; if there is a ColorTool, it shows the color\n\tCTRL middle deletes the
            color"];
    IF (pos.y >= 0) THEN BEGIN
        IF (cmd = $selectMiddle) AND (data.wash # NIL) AND (pos.y <= washHeight) AND
                (pos.x >= 0) AND (pos.x < washWidth) THEN BEGIN
            A color in the wash has been selected. Add it to the palette and transfer it.
            SetNewVersion [v, state];
            IF (data.selection = NIL) THEN data.selection ← NEW [SelectionDigitalRep];
            data.selection.middle ← selectedColor ← data.wash[Round[pos.x/washItemWidth]];
            data ← AddToList [selectedColor, data, state];    changes ← $list;
            SetNewVersion [v, state]
            END    -- else no hit
        END
    ELSE BEGIN
        IF (pos.x >= 0) AND (pos.x <= washWidth) THEN BEGIN
            x: INT ← Fix [pos.x / 10];   y: INT ← - Fix [pos.y / 10];
            IF (x MOD 2 = 0) AND (y MOD 3 # 0) THEN BEGIN
                index: NAT ~ (x/2 + 1) + (y - 1)/3 * 5;
                IF (data.selection = NIL) THEN data.selection ← NEW [SelectionDigitalRep];
                selectedColor ← IthListElt [data, index];
                IF (selectedColor # NIL) THEN BEGIN
                    data.selection.ch ← index;
                    SELECT cmd FROM
                        $selectMiddle => data.selection.middle ← selectedColor;
                        $delete, $deleteLeft => BEGIN
                            data.selection.middle ← NIL;    deletable ← TRUE;
                            SetNewVersion [v, state];   changes ← $list
                            END;
                        $selectLeft => BEGIN
                            data.selection.left ← selectedColor; data.selection.middle ← NIL;
                            doWash ← TRUE;        changes ← $wash
                            END;
                        $selectRight => BEGIN
                            data.selection.right ← selectedColor; data.selection.middle ← NIL;
                            doWash ← TRUE;        changes ← $wash
                            END;
                        $deleteRight => ImportantMessage ["Use left button to delete"];
```

```
                    ENDCASE => ERROR
                END
            END   -- else no hit
        END   -- else no hit
    END;
    IF (selectedColor = NIL) THEN RETURN;
    IF doWash AND (data.selection.left # NIL) AND (data.selection.right # NIL) THEN BEGIN
        delta: CIELAB;   sel: SelectionDigital ~ data.selection;
        IF (data.wash = NIL) THEN data.wash ← NEW [WashRep];
        delta.lStar ← sel.right.lStar - sel.left.lStar;
        delta.aStar ← sel.right.aStar - sel.left.aStar;
        delta.bStar ← sel.right.bStar - sel.left.bStar;
        FOR i: INTEGER IN [0 .. washItems) DO
            t: REAL ~ Float [i] / Float [washItems-1];
            data.wash[i] ← NEW [CIELAB];
            data.wash[i].lStar ← sel.left.lStar + t * delta.lStar;
            data.wash[i].aStar ← sel.left.aStar + t * delta.aStar;
            data.wash[i].bStar ← sel.left.bStar + t * delta.bStar;
            data.washCache[i] ← ColorFromLAB [data.wash[i]]
        ENDLOOP
    END;
    name ← ColorName [selectedColor];
    IF deletable THEN BEGIN
        index: NAT ← 1;
        FOR l: CL ← data.palette.l.rest WHILE (l # NIL) DO
            IF (index = data.selection.ch) THEN {l.first ← NIL;   EXIT};
            index ← index.SUCC
        ENDLOOP
    END
    ELSE BEGIN
        Message [name];
        PutHistoryLine [state, Rope.Cat [LABToLCHRope [selectedColor], " = ", name]];
        TRUSTED {Process.Detach [FORK SpeakMessage [name]]}
    END;
    TransferSelectedColor [state, ToRGB [selectedColor]];
    ViewerOps.PaintViewer [viewer: v, hint: client, clearClient: FALSE, whatChanged: changes]
    END;   -- HitList
```

Utilities

```
IthListElt: PROC [palette: DigitalPaletteData, i: NAT] RETURNS [LAB] ~ BEGIN
    Returns the one relative i-th element of the list
    count: CARDINAL ← 1;
    IF (i < 1) OR (i > palette.power) THEN RETURN [NIL];
    FOR list: CL ← palette.palette.list.rest WHILE (list # NIL) DO
        IF (count = i) THEN RETURN [list.first];
        count ← count.SUCC
    ENDLOOP;
    RETURN [NIL]
```

```
                ENDCASE => ERROR
            END
        END    -- else no hit
    END        -- else no hit
END;
IF (selectedColor = NIL) THEN RETURN;
IF doWash AND (data.selection.left # NIL) AND (data.selection.right # NIL) THEN BEGIN
    delta: CIELAB;   sel: SelectionDigital ~ data.selection;
    IF (data.wash = NIL) THEN data.wash + NEW [WashRep];
    delta.lStar + sel.right.lStar - sel.left.lStar;
    delta.aStar + sel.right.aStar - sel.left.aStar;
    delta.bStar + sel.right.bStar - sel.left.bStar;
    FOR i: INTEGER IN [0 .. washItems) DO
        t: REAL ~ Float [i] / Float [washItems-1];
        data.wash[i] + NEW [CIELAB];
        data.wash[i].lStar + sel.left.lStar + t * delta.lStar;
        data.wash[i].aStar + sel.left.aStar + t * delta.aStar;
        data.wash[i].bStar + sel.left.bStar + t * delta.bStar;
        data.washCache[i] + ColorFromLAB [data.wash[i]]
    ENDLOOP
END;
name + ColorName [selectedColor];
IF deletable THEN BEGIN
    index: NAT + 1;
    FOR l: CL + data.palette, l.rest WHILE (l # NIL) DO
        IF (index = data.selection.ch) THEN {l.first + NIL;   EXIT};
        index + index.SUCC
    ENDLOOP
END
ELSE BEGIN
    Message [name];
    PutHistoryLine [state, Rope.Cat [LABToLCHRope [selectedColor], " = ", name]];
    TRUSTED {Process.Detach [FORK SpeakMessage [name]]}
END;
TransferSelectedColor [state, ToRGB [selectedColor]];
ViewerOps.PaintViewer [viewer: v, hint: client, clearClient: FALSE, whatChanged: changes]
END;   -- HitList
```

Utilities

```
IthListElt: PROC [palette: DigitalPaletteData, i: NAT] RETURNS [LAB] ~ BEGIN
    Returns the one relative i-th element of the list
    count: CARDINAL + 1;
    IF (i < 1) OR (i > palette.power) THEN RETURN [NIL];
    FOR list: CL + palette.palette, list.rest WHILE (list # NIL) DO
        IF (count = i) THEN RETURN [list.first];
        count + count.SUCC
    ENDLOOP;
    RETURN [NIL]
```

END;   -- IthListElt

WDir: PROC RETURNS [wDir: ROPE] ~ BEGIN
   *Guarantees that the working directory is not the root.*
   wDir ← FSExtras.GetWDir [];
   IF wDir.Equal ["[]<>"] AND (NOT lastWDir.IsEmpty) THEN wDir ← lastWDir;
   IF wDir.Equal ["[]<>"] THEN wDir ← "[]<>Temp>MetaPalette>"
   END;   -- WDir Message: PROC [msg: ROPE] ~ BEGIN
   *Writes a message in the Message Window at the top of the LF screen.*
   MessageWindow.Clear [];        MessageWindow.Append [msg]
   END;   -- Message ImportantMessage: PROC [msg: ROPE] ~ BEGIN
   *Writes a message in the Message Window at the top of the LF screen and makes it blink.*
   Message [msg];   MessageWindow.Blink []
   END.   -- ImportantMessage SpeakMessage: PROC [msg: ROPE] ~ BEGIN
   *Speaks the message if Finch is loaded. The ra parameter is the speaking rate in words per minute. 120 < ra < 350; default 180.*
   status: FinchSynthesizer.NB;
   ctrl: ROPE ~ "∎P0;0z;ra230;nb∎\\";
   IF speak THEN status ← FinchSynthesizer.SpeakText [ctrl.Concat[msg] !
       RuntimeError.UnboundProcedure => CONTINUE]
   END;   -- SpeakMessage

Initializations

InitKeyColorPos: PROC ~ BEGIN
   FOR i: Hue IN Hue DO
      keyColorPos[i] ← SELECT i FROM
         -3 => [-4*swatchSize, -4*swatchSize],
         -2 => [8*swatchSize, 8*swatchSize],
         -1 => [4*swatchSize, 4*swatchSize],
         -0 => [0, 0],
         1 => [-4*swatchSize, 4*swatchSize],
         2 => [-8*swatchSize, 8*swatchSize],
         3 => [4*swatchSize, -4*swatchSize],
         4 => [0, -8*swatchSize],
         ENDCASE => [0, 0]
      ENDLOOP
   END;   -- InitKeyColorPos InitVariantColorPos: PROC ~ BEGIN
   FOR i: ValueAndChroma IN [-(values+chromata) .. -chromata) DO
      variantColorPos[i] ← [0, Float [i+chromata] * swatchSize2]
      ENDLOOP;

```
FOR i: ValueAndChroma IN [-chromata .. 0) DO
    variantColorPos[i] ← [Float [i] * swatchSize2, 0]
    ENDLOOP;
variantColorPos[0] ← [0, 0];
FOR i: ValueAndChroma IN (0 .. chromata] DO
    variantColorPos[i] ← [Float [i] * swatchSize2, 0]
    ENDLOOP;
FOR i: ValueAndChroma IN (chromata .. chromata + values] DO
    variantColorPos[i] ← [0, Float [i - chromata] * swatchSize2]
    ENDLOOP
END;    -- InitVariantColorPos protoDoc: ROPE ← "is an editor for functional color palettes. Parameters: Palette name, Key
        color.\nMouse buttons: left: select, CTRL left: delete.\nRelated commands:
        DigitalPalette, NewFieldWidth, PaletteTo8Bit; and ListPalettes,
        AddPaletteComment, AddReferencePalettes, PaletteGC.";

digProc: ROPE ← "is an editor for functional color palettes. Parameter: Palette name.\nMouse
        buttons: left/right: select left/right color for wash, middle: select, CTRL left:
        delete.\nRelated commands: ProtoPalette, NewFieldWidth, PaletteTo8Bit; and
        ListPalettes, AddPaletteComment, AddReferencePalettes, PaletteGC.";

ProtoCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    keyColor: ATOM ← Atom.MakeAtom [CommandTool.NextArgument [cmd]];
    IF name.IsEmpty THEN name ← "Arlecchino";
    IF name.IsEmpty THEN BEGIN
        msg ← "Specify a palette name (use ListPalettes to list existing palettes)."; result ←
            $failure
        END
    ELSE BEGIN
        IF (keyColor = emptyAtom) THEN keyColor ← $default;
        lastWDir ← cmd.command.Substr [0, FS.ExpandName[cmd.command].cp.base.start-1];
        msg ← "Mouse buttons: left: select, CTRL left: delete.";
        IF ProtoPalette.ValidKeyColor [keyColor] THEN lastViewer ← CreateViewer [name,
            keyColor]
        ELSE {result ← $failure;   msg ← "No such key color."}
        END
    END;    -- ProtoCmd DigiCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    IF name.IsEmpty THEN BEGIN
        msg ← "Specify a palette name (use ListPalettes to list existing palettes)."; result ←
            $failure
        END
    ELSE BEGIN
        msg ← "Mouse buttons: left/right: select left/right color for wash, middle: select, CTRL
```

```
        left: delete.";
    lastWDir ← cmd.command.Substr [0, FS.ExpandName[cmd.command].cp.base.start-1];
    lastViewer ← CreateViewer [name, emptyAtom]
    END
END;  -- DigiCmd FieldWidth: Commander.CommandProc ~ BEGIN
    width: ROPE ← CommandTool.NextArgument [cmd];
    fieldWidth ← Convert.RealFromRope [width ! Convert.Error => {fieldWidth ← 155.3452;
        CONTINUE}];
    msg ← IO.PutFR1 ["Field width = %g mm.", IO.real [fieldWidth]]
END;  -- FieldWidth To8BitCmd: Commander.CommandProc ~ BEGIN
    NoteDisplayChangedTo8Bit [NIL]
END:  -- To8BitCmd VideoCmd: Commander.CommandProc ~ BEGIN
    video ← NOT video;     InitSwatches
END:  -- VideoCmd
```

Main body

*UserProfile.CallWhenProfileChanges [PaletteNameMgr]:*

```
InitializeViewerClass;   InitKeyColorPos;         InitVariantColorPos;
InitSwatches;   InitSubMaps;

ImagerColorMap.Register [colorMapNotifier];

Commander.Register [key: "ProtoPalette", proc: ProtoCmd, doc: protoDoc];
Commander.Register [key: "DigitalPalette", proc: DigiCmd, doc: digiDoc];
Commander.Register [key: "PaletteTo8Bit", proc: To8BitCmd,
        doc: "notices that the display device changed to 8-bit color."];
Commander.Register [key: "NewFieldWidth", proc: FieldWidth,
        doc: "sets the width of the field in mm for Interpress masters."];
Commander.Register [key: "VideoHack", proc: VideoCmd,
        doc: "does a hack for doing Abekas frames for the ProtoPalette."]

END.  -- ProtopaletteCommanderImpl
```

What is claimed:

1. An interactive system for creating a modified color palette composed of a plurality of palette colors, the interactive system comprising,
a memory device for storing data;
input means for receiving operation signals from an operator;
at least one color palette data structure including at least two colorimetrically measured colors composing a color palette; each colorimetrically measured color being defined by a set of coordinates for the colorimetrically measured color in a perceptually uniform color space; the at least one color palette data structure being stored in the memory device;
color palette display means including a display device for displaying thereon a color mixing region, for displaying therein a plurality of mixed colors, and a color palette region, for displaying therein the plurality of palette colors composing the modified color palette, in response to the operation signals from the input means; each of the palette colors of the modified color palette being defined by the set of coordinates for the palette color in the perceptually uniform color space;
color mixing means for selecting, in response to the operation signals, two selected mixing colors from the palette colors displayed in the color palette region, and for generating the plurality of mixed colors from the two selected mixing colors; the two selected mixing colors and the plurality of mixed colors being displayed in the color mixing region by the color palette display means; each selected mixing color and each mixed color being defined by the set of coordinates for the selected mixing color and the mixed color in the perceptually uniform color space;

wherein the color mixing means generates the plurality of mixed colors from the two selected mixing colors by successively varying the coordinates of the two selected mixing colors in the perceptually uniform color space by a coordinate change quantity beginning with the coordinates of one selected mixing color and ending with the coordinates of the other selected mixing color;

color palette adding means, responsive to the operation signals from the input means, for selecting one of the mixed colors displayed in the color mixing region, and for adding the mixed color to the palette colors of the modified color palette; the mixed color added to the modified color palette being displayed in the color palette region by the color palette display means;

colro palette deletion means for selecting and deleting one of the palette colors from the modified color palette displayed in the color palette region, in response to the operation signals from the input means; the deleted palette color being removed from the color palette region; and modified color palette memory means, cooperatively associated with the color palette display means, for storing in the memory device the modified color palette displayed in the color palette region, in response to the operation signals received from the input means.

2. The interactive system for modifying a color palette according to claim 1 wherein the coordinate change quantity is a uniformly applied, linear quantity defined according to a fixed number of mixed colors to be displayed in the color mixing region by the color palette display means.

3. The interactive system of claim 1 further including conversion means, the conversion means including a color correction transformation computed from a colorimetrically measured color gamut of the display device; the conversion means using the color correction transformation to convert the coordinates of the at least two colorimetrically measured colors of the color palette data structure, the plurality of palette colors composing the modified color palette, the selected mixing colors, and the plurality of mixed colors into device dependent color signals for display on the display device.

4. A method for interactively producing a color palette composed of a plurality of palette colors, the method comprising the steps of:

(a) storing in a memory device at least one color palette data structure including at least two colorimetrically measured colors composing a color palette; each colorimetrically measured color being defined by a set of coordinates for the colorimetrically measured color in a perceptually uniform color space;

(b) selecting the at least one reference color palette data structure for modification;

(c) displaying on a display device having a display screen, in a color palette region of the screen, at least two colorimetrically measured colors of the color palette selected in step (b); the colorimetrically measured colors of the color palette being initially included in the plurality of palette colors composing the modified color palette; each of the palette colors of the modified color palette being defined by the set of coordinates for the palette color in the perceptually uniform color space;

(d) selecting two palette colors from the color palette region of the display screen as selected mixing colors and displaying the selected mixing colors in a color mixing region of the screen;

(e) generating a plurality of mixed colors from the two selected mixing colors by successively varying the coordinates of the two selected mixing colors in the perceptually uniform color space by a coordinate change quantity beginning with the coordinates of one selected mixing color and ending with the coordinates of the other selected mixing color; each mixed color being defined by the set of coordinates for said mixed color in the perceptually uniform color space;

(f) displaying the plurality of mixed colors in the color mixing region;

(g) selecting one of the plurality of mixed colors from the color mixing region and adding the selected mixed color to the modified color palette;

(h) displaying the selected mixed color in the color palette region of the display screen; and (i) storing in the memory device the palette colors in the modified color palette displayed in the color palette region of the display screen.

5. The method for interactively producing a modified color palette according to claim 4 wherein the coordinate change quantity is a uniformly applied, linear quantity defined according to a fixed number of mixed colors to be displayed in the color mixing region.

6. The method of claim 4 further including, prior to displaying in steps (c), (d), (f) and (h), the step of converting each of the coordinates of the at least two colorimetrically measured colors of the reference color palette, the plurality of palette colors composing the modified color palette, the selected mixing colors, and the plurality of mixed colors into device dependent color signals for display on the display device; the converting step using a color correction transformation computed from a colorimetrically measured color gamut of the color display device.

* * * * *

UNITED STATES PATENT AND TRADEMARK OFFICE
CERTIFICATE OF CORRECTION

PATENT NO. : 5,254,978
DATED : October 19, 1993
INVENTOR(S) : Giordano B. Beretta It is certified that error appears in the above-identified patent and that said Letters Patent is hereby corrected as shown below:

In column 16, line 34 and line 35, "a range of" should read --an interval scale of up to--.

The computer source code in columns 127 - 222 of Appendix A are duplicates of the computer source code printed in columns 33 - 126. The computer source code in columns 127 - 222 should be deleted to avoid misinterpretation of the patent subject matter. Appendix A with the computer source code ends at the end of column 126.

Signed and Sealed this

Twenty-second Day of November, 1994

Attest:

BRUCE LEHMAN

Attesting Officer

Commissioner of Patents and Trademarks